United States Patent
Brown et al.

(10) Patent No.: US 7,199,924 B1
(45) Date of Patent: Apr. 3, 2007

(54) APPARATUS AND METHOD FOR SPECTRAL-BEAM COMBINING OF HIGH-POWER FIBER LASERS

(75) Inventors: Andrew J. W. Brown, Brier, WA (US); Eric C. Honea, Seattle, WA (US); Thomas H. Loftus, Seattle, WA (US); Roy D. Mead, Edmonds, WA (US); Charles E. Hamilton, Kenmore, WA (US); Anping Liu, Big Flats, NY (US); Charles A. Lemaire, Apple Valley, MN (US)

(73) Assignee: Aculight Corporation, Bothell, WA (US)

( * ) Notice: Subject to any disclaimer, the term of this patent is extended or adjusted under 35 U.S.C. 154(b) by 0 days.

(21) Appl. No.: 11/342,336

(22) Filed: Jan. 26, 2006

Related U.S. Application Data

(60) Provisional application No. 60/703,824, filed on Jul. 29, 2005, provisional application No. 60/647,747, filed on Jan. 26, 2005.

(51) Int. Cl.
  *H04J 14/02* (2006.01)
  *G02B 27/64* (2006.01)
(52) U.S. Cl. ..................... 359/556; 398/87
(58) Field of Classification Search .............. 359/556; 398/87
  See application file for complete search history.

(56) References Cited

U.S. PATENT DOCUMENTS

| | | | |
|---|---|---|---|
| 3,728,117 A | 4/1973 | Heidenhain et al. | |
| 4,313,648 A | 2/1982 | Yano et al. | |
| 4,367,040 A * | 1/1983 | Goto | 356/44 |
| 4,895,790 A | 1/1990 | Swanson et al. | |
| 5,319,668 A * | 6/1994 | Luecke | 372/107 |
| 5,379,310 A * | 1/1995 | Papen et al. | 372/23 |
| 5,440,416 A * | 8/1995 | Cohen et al. | 398/82 |
| 5,526,155 A * | 6/1996 | Knox et al. | 398/87 |
| 5,608,826 A * | 3/1997 | Boord et al. | 385/37 |
| 5,818,630 A | 10/1998 | Fermann et al. | |
| 5,907,436 A | 5/1999 | Perry et al. | |
| 5,974,060 A * | 10/1999 | Byren et al. | 372/19 |
| 6,023,361 A * | 2/2000 | Ford et al. | 398/135 |
| 6,028,879 A * | 2/2000 | Ershov | 372/57 |

(Continued)

OTHER PUBLICATIONS

Augst, S. J., et al., "Wavelength beam combining of ytterbium fiber lasers", *Opt. Lett.*, vol. 28, (2003), 331-333.

(Continued)

*Primary Examiner*—Deandra M. Hughes
(74) *Attorney, Agent, or Firm*—Charles A. Lemaire; Lemaire Patent Law Firm, P.L.L.C.

(57) ABSTRACT

Apparatus and method for spectral-beam combining light from a plurality of high-power fiber lasers that, in some embodiments, use two substantially identical diffraction gratings in a parallel, mutually compensating configuration to combine a plurality of separate parallel input beams each having a slightly different successively higher wavelength into a single output beam of high quality. In other embodiments, a single diffraction grating is used to combine a plurality of different wavelengths, wherein the input laser beams are obtained from very narrow linewidth sources to reduce chromatic dispersion. In some embodiments, diagnostics and adjustments of wavelengths and/or positions and angles are made dynamically in real time to maintain the combination of the plurality input beams into a single high-quality output beam.

23 Claims, 24 Drawing Sheets

U.S. PATENT DOCUMENTS

| | | | |
|---|---|---|---|
| 6,097,863 | A | 8/2000 | Chowdhury |
| 6,192,062 | B1 | 2/2001 | Sanchez-Rubio et al. |
| 6,208,679 | B1 | 3/2001 | Sanchez-Rubio et al. |
| 6,212,310 | B1 | 4/2001 | Waarts et al. |
| 6,275,623 | B1 * | 8/2001 | Brophy et al. ............... 385/14 |
| 6,339,662 | B1 * | 1/2002 | Koteles et al. ............... 385/24 |
| 6,381,008 | B1 * | 4/2002 | Branagh et al. ............... 356/72 |
| 6,381,388 | B1 * | 4/2002 | Epworth et al. ............... 385/37 |
| 6,496,301 | B1 | 12/2002 | Koplow et al. |
| 6,665,471 | B1 * | 12/2003 | Farmer et al. ............... 385/37 |
| 6,754,006 | B2 | 6/2004 | Barton et al. |
| 6,765,724 | B1 * | 7/2004 | Kramer ............... 359/566 |
| 6,819,871 | B1 * | 11/2004 | Baldwin et al. ............... 398/85 |
| 6,822,796 | B2 | 11/2004 | Takada et al. |
| 6,865,344 | B1 * | 3/2005 | Johnson et al. ............... 398/77 |
| 6,882,431 | B2 | 4/2005 | Teich et al. |
| 6,914,916 | B2 * | 7/2005 | Pezeshki et al. ............... 372/15 |
| 6,937,795 | B2 * | 8/2005 | Squires et al. ............... 385/37 |
| 6,950,692 | B2 | 9/2005 | Gelikonov et al. |
| 6,952,510 | B1 * | 10/2005 | Karlsen et al. ............... 385/37 |
| 6,958,859 | B2 | 10/2005 | Hoose et al. |
| 6,996,343 | B2 * | 2/2006 | Neilson ............... 398/84 |
| 2002/0181856 | A1 * | 12/2002 | Sappey et al. ............... 385/24 |
| 2004/0114852 | A1 * | 6/2004 | Brown ............... 385/14 |

OTHER PUBLICATIONS

Cooper, L. J., "High-power Yb-doped multicore ribbon fiber laser", *Optics Letters* vol. 30, No. 21, (Nov. 1, 2005), 2906-2908.

Fan, T. Y., "Laser Beam Combining for High-Power, High-Radiance Sources", *IEEE Journal of Selected Topics in Quantum Electronics*, vol. 11 (2005), 567-577.

Hehl, Karl, et al., "High-efficiency dielectric reflection gratings: design, fabrication, and analysis", *Appl. Opt.*, vol. 38, (1999), 6257-6271.

Liu, F., et al., "Cost-effective wavelength selectable light source using DFB fibre laser array", *Electronics Letters* vol. 36, No. 7, (Mar. 30, 2000), 620-621.

Liu, A., et al., "Spectral beam combining of high power fiber lasers", *Proceedings of SPIE*, vol. 5335, (2004), 81-88.

Perry, M. D., et al., "High-efficiency multilayer dielectric diffraction gratings", *Opt. Lett.*, vol. 20, (1995), 940-942.

* cited by examiner

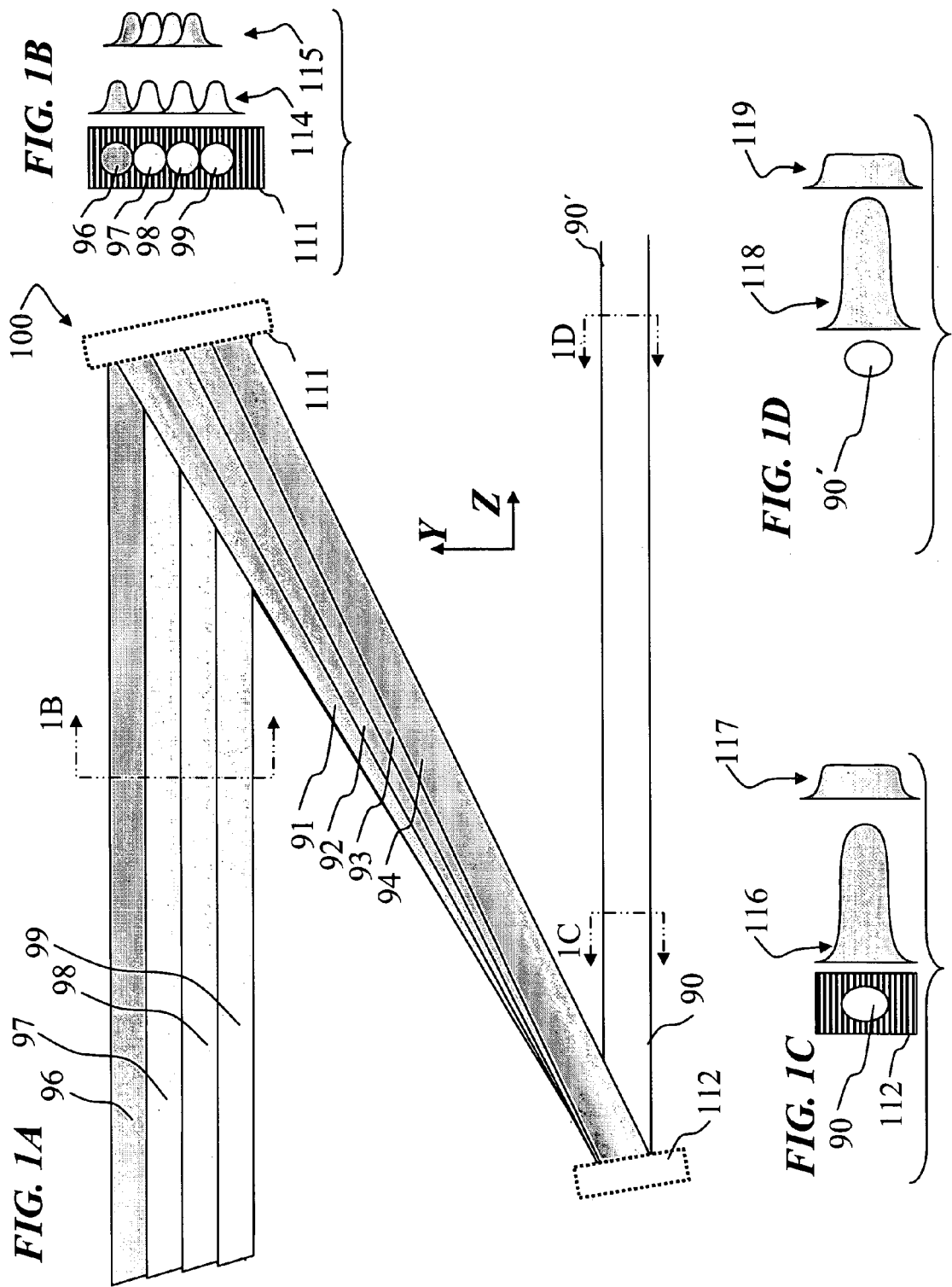

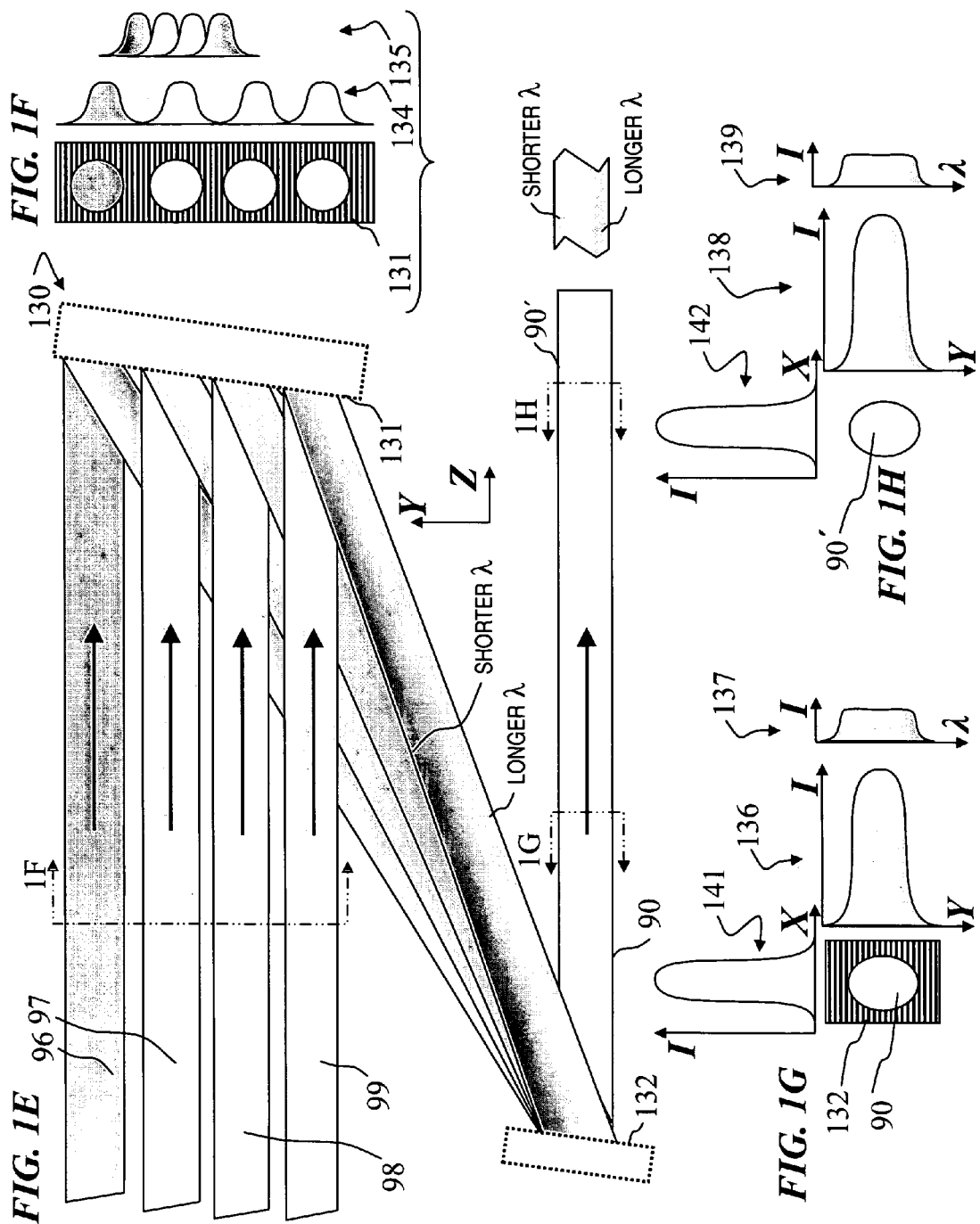

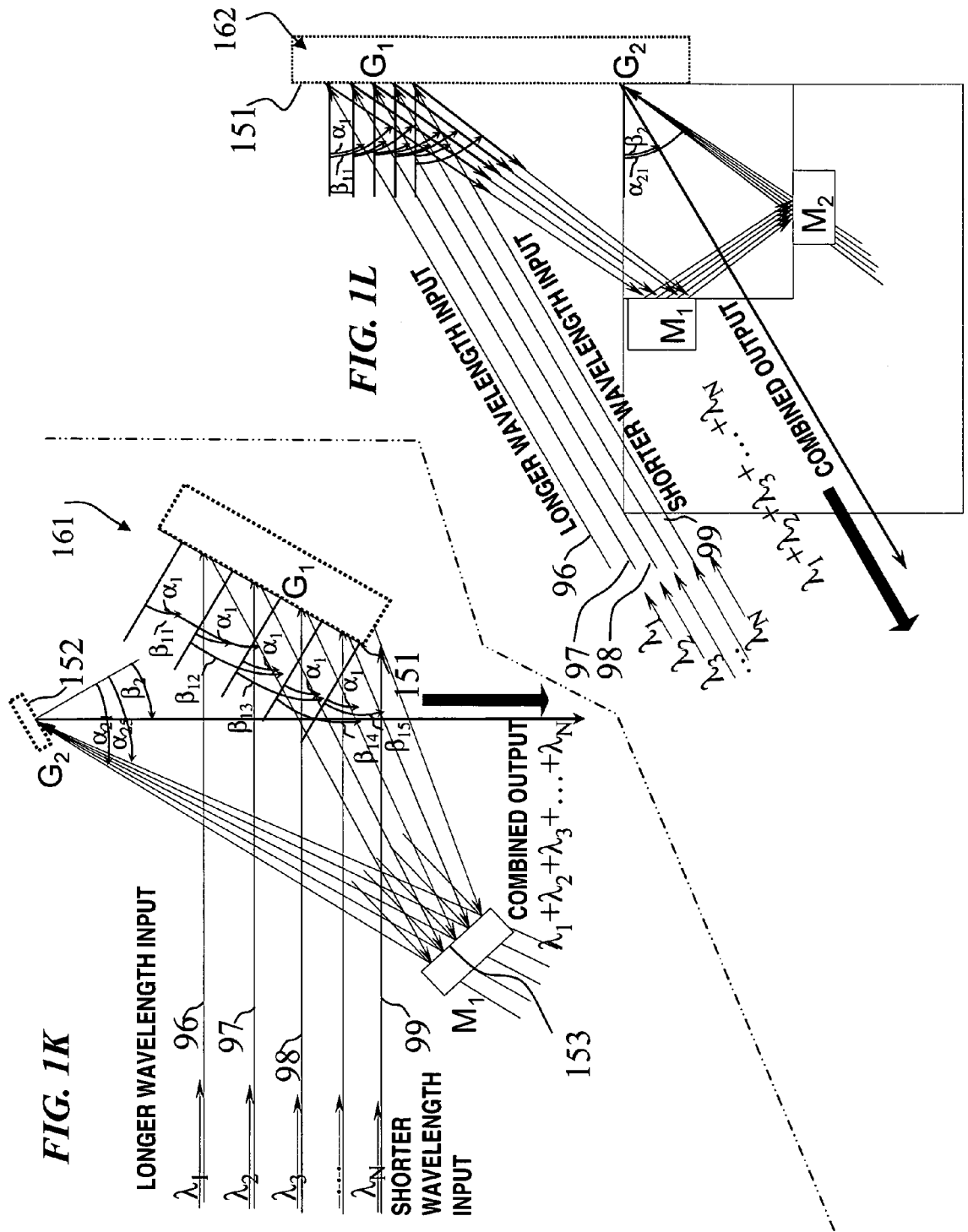

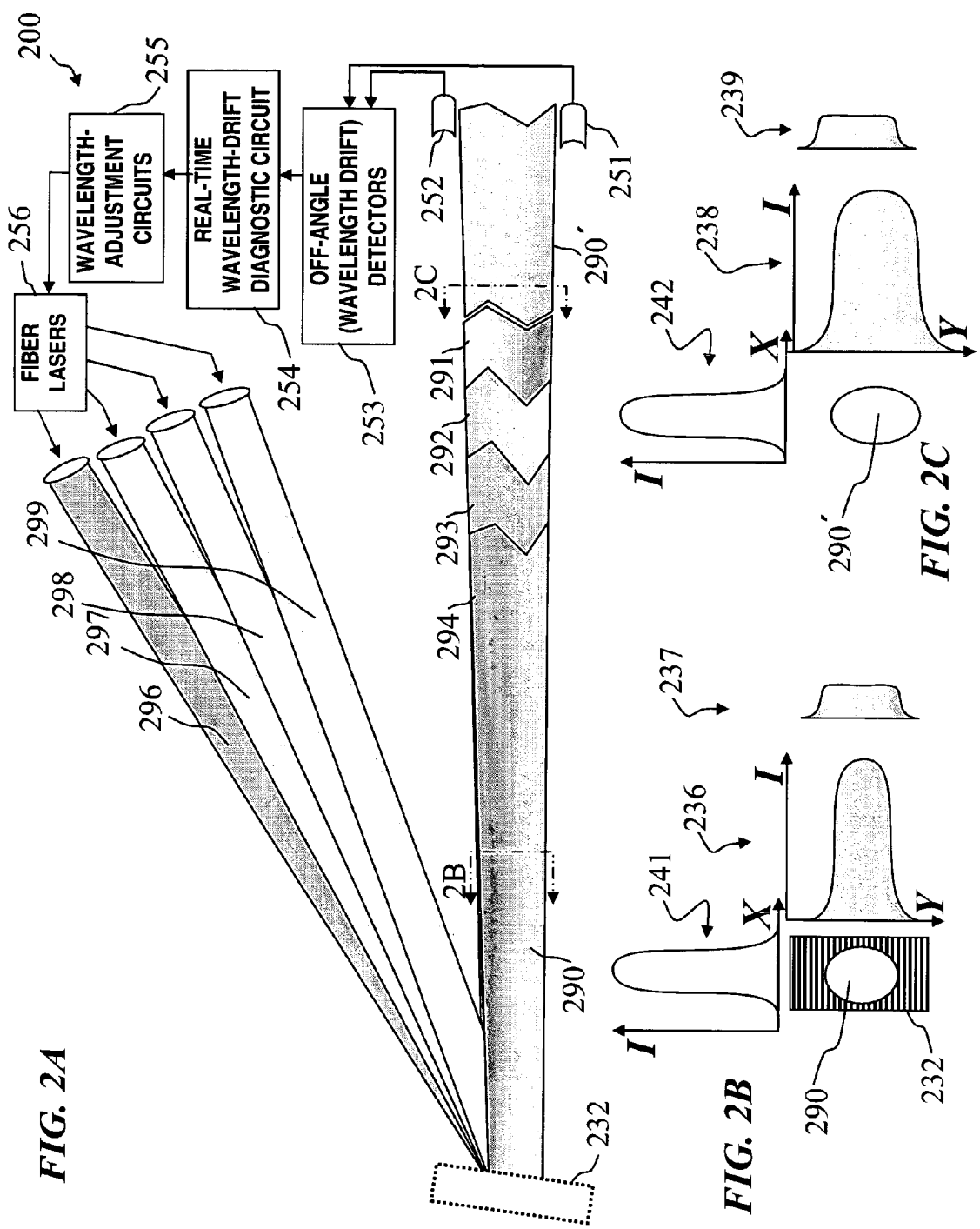

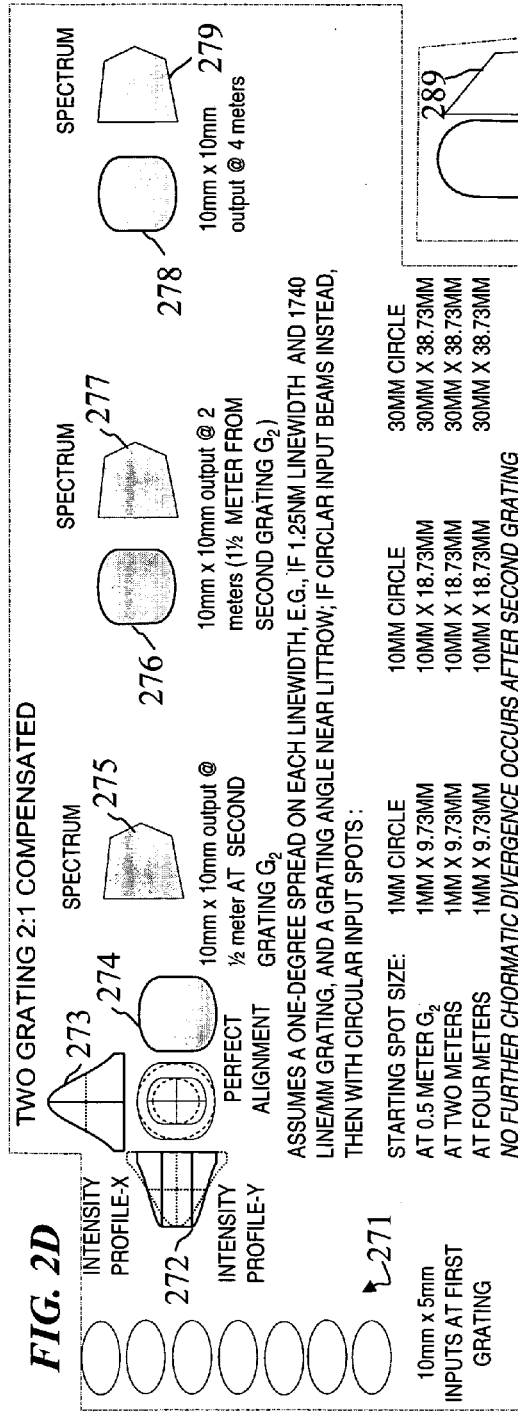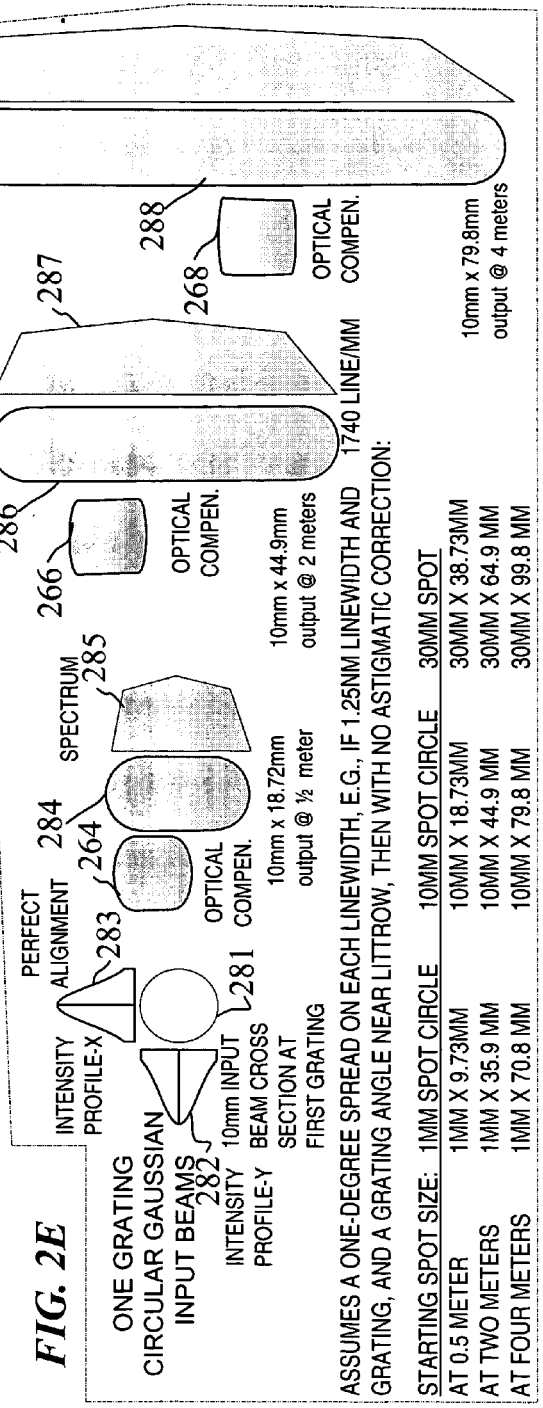

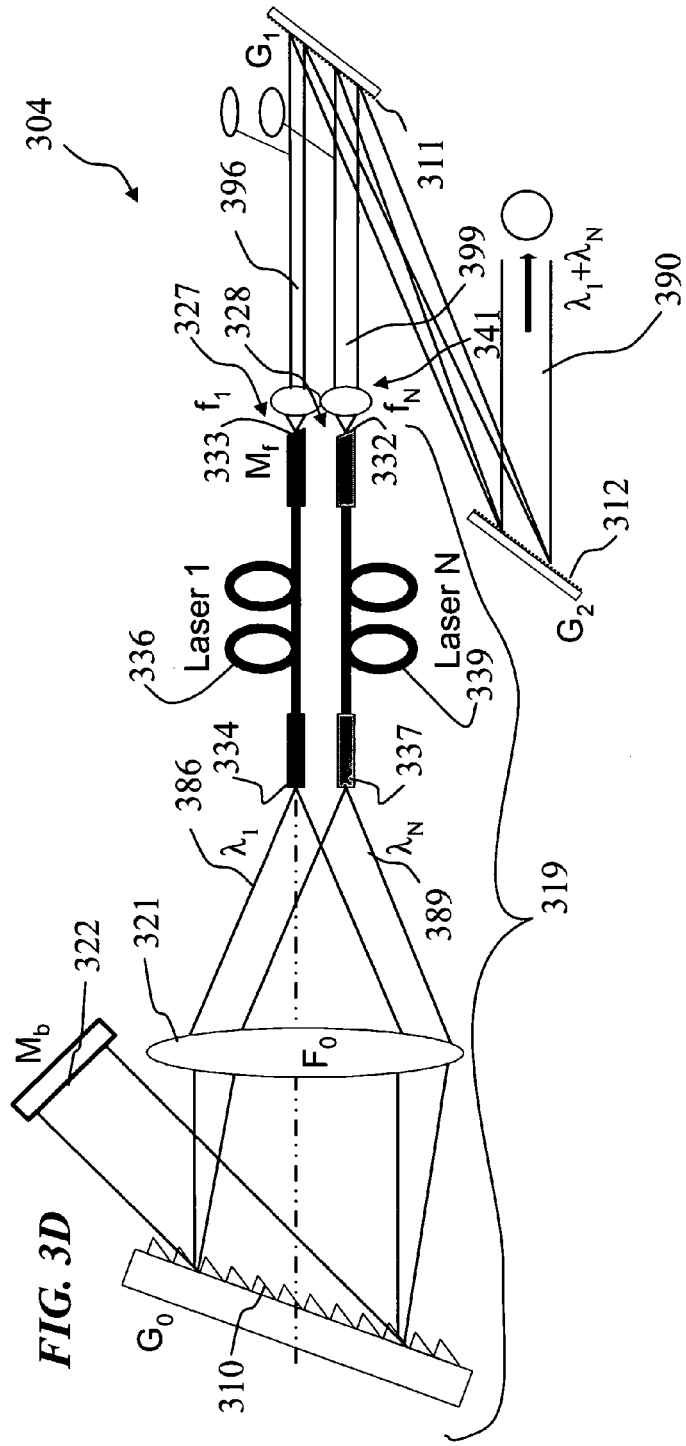
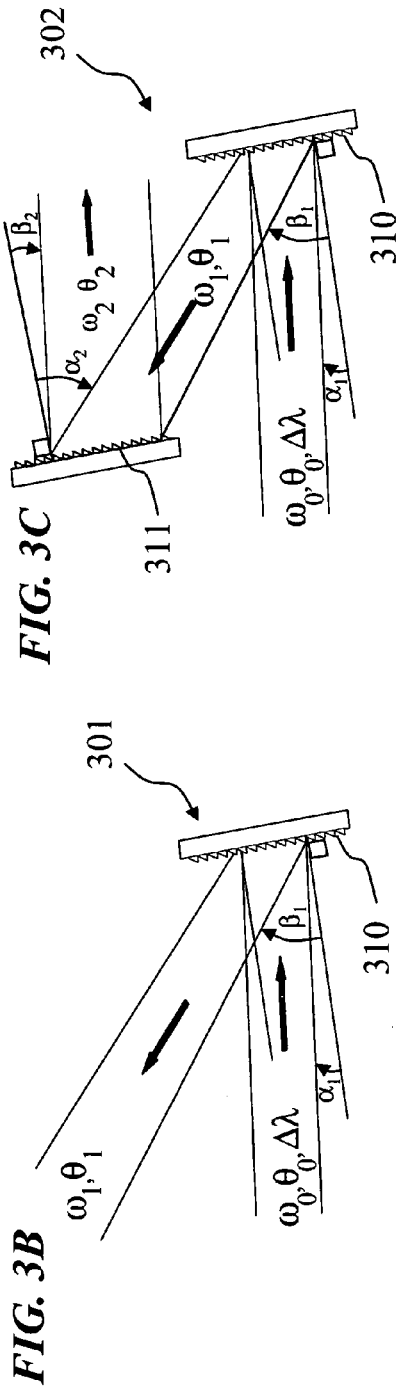
FIG. 3C
FIG. 3B
FIG. 3D

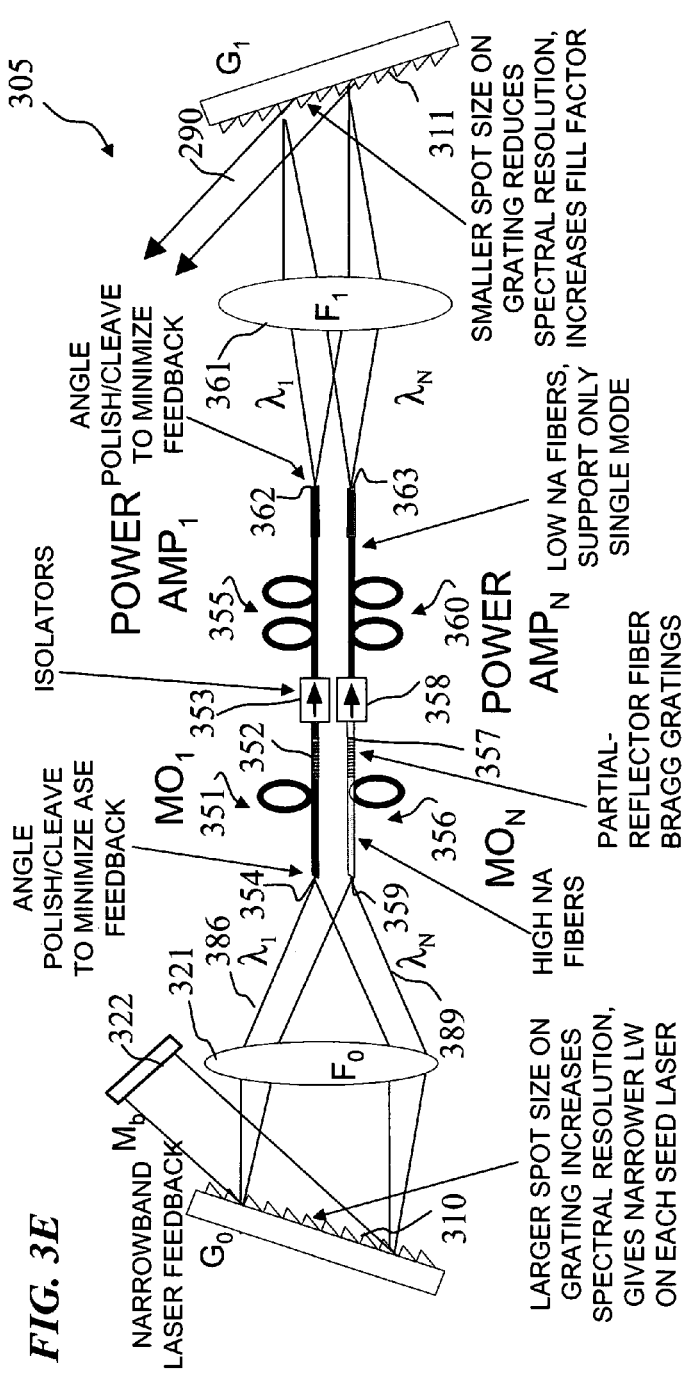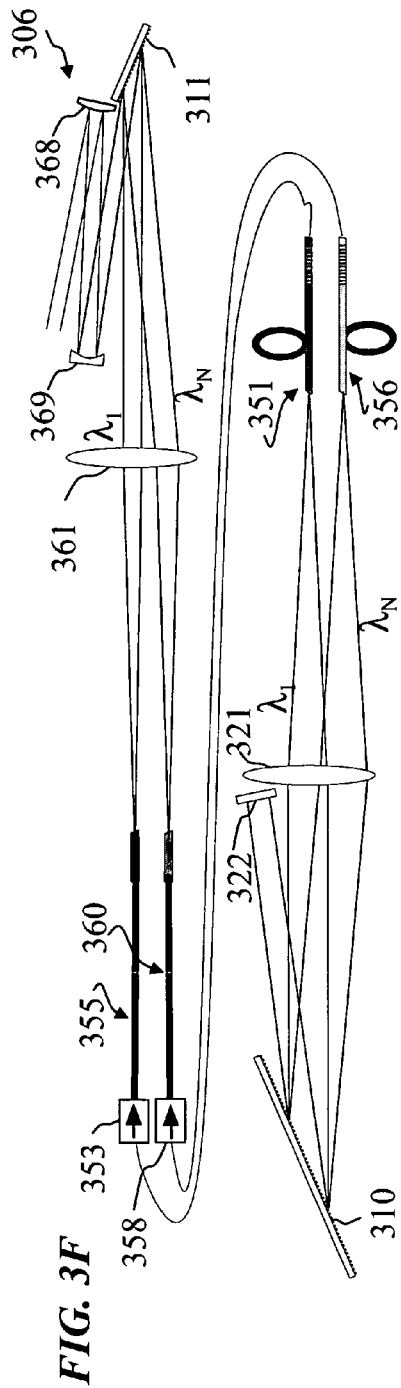
FIG. 3E
FIG. 3F

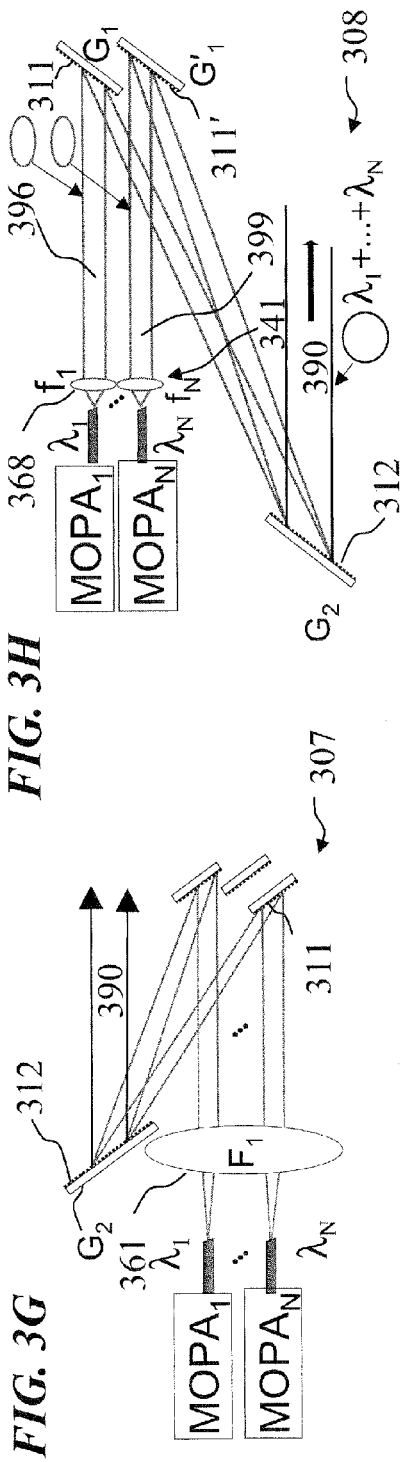

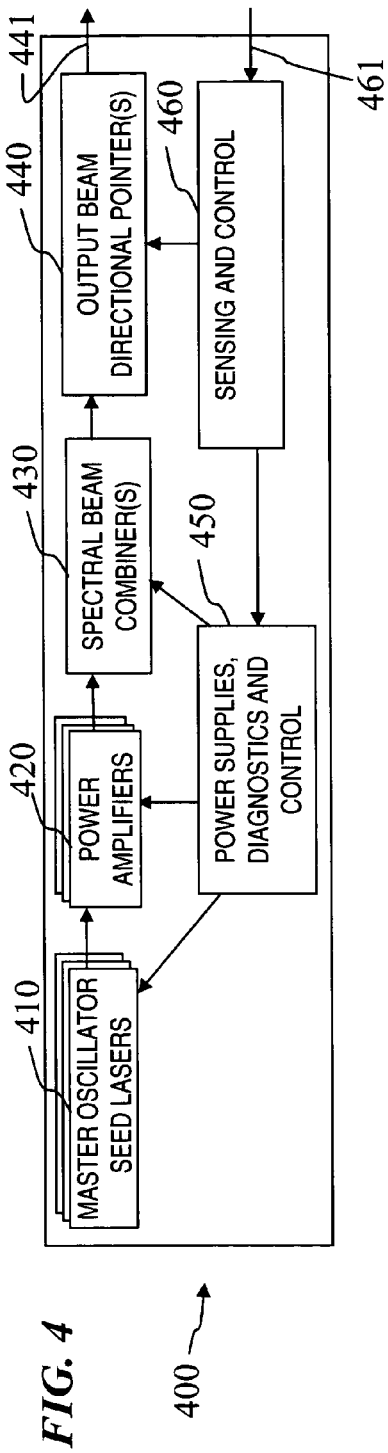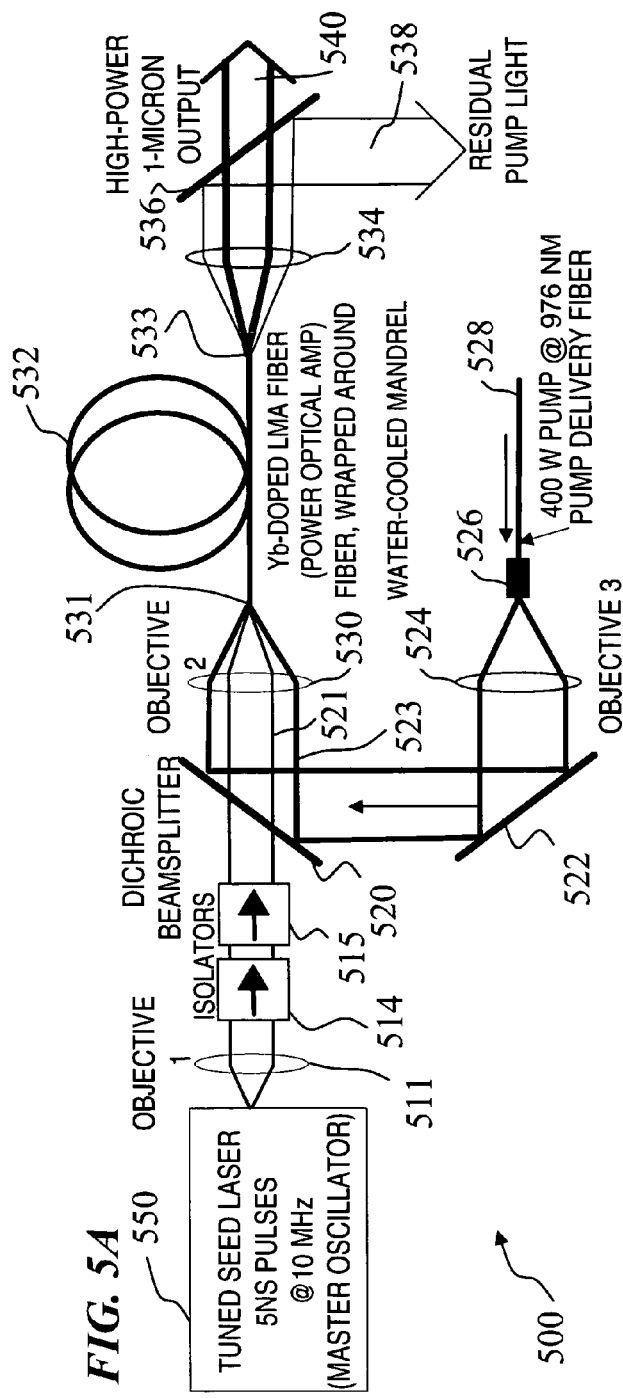

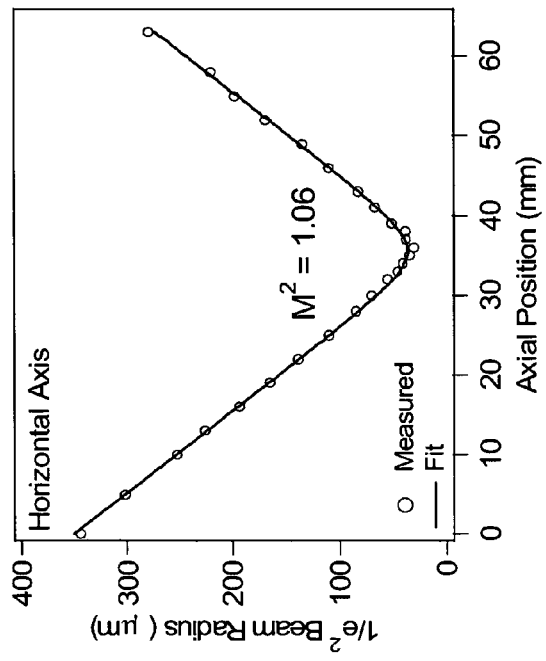
FIG. 6D
FIG. 6E
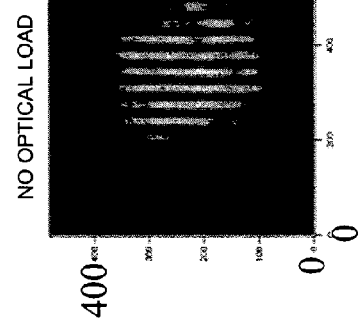
FIG. 6F
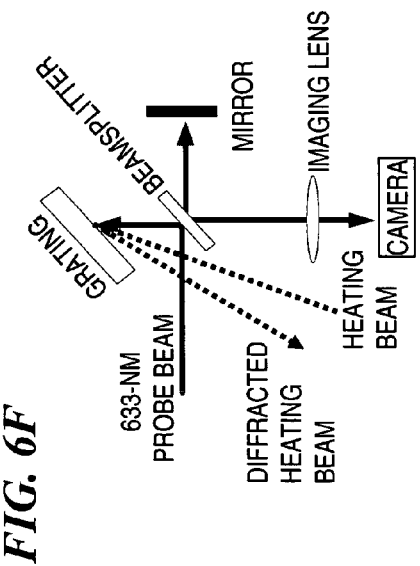
FIG. 6G
FIG. 6H

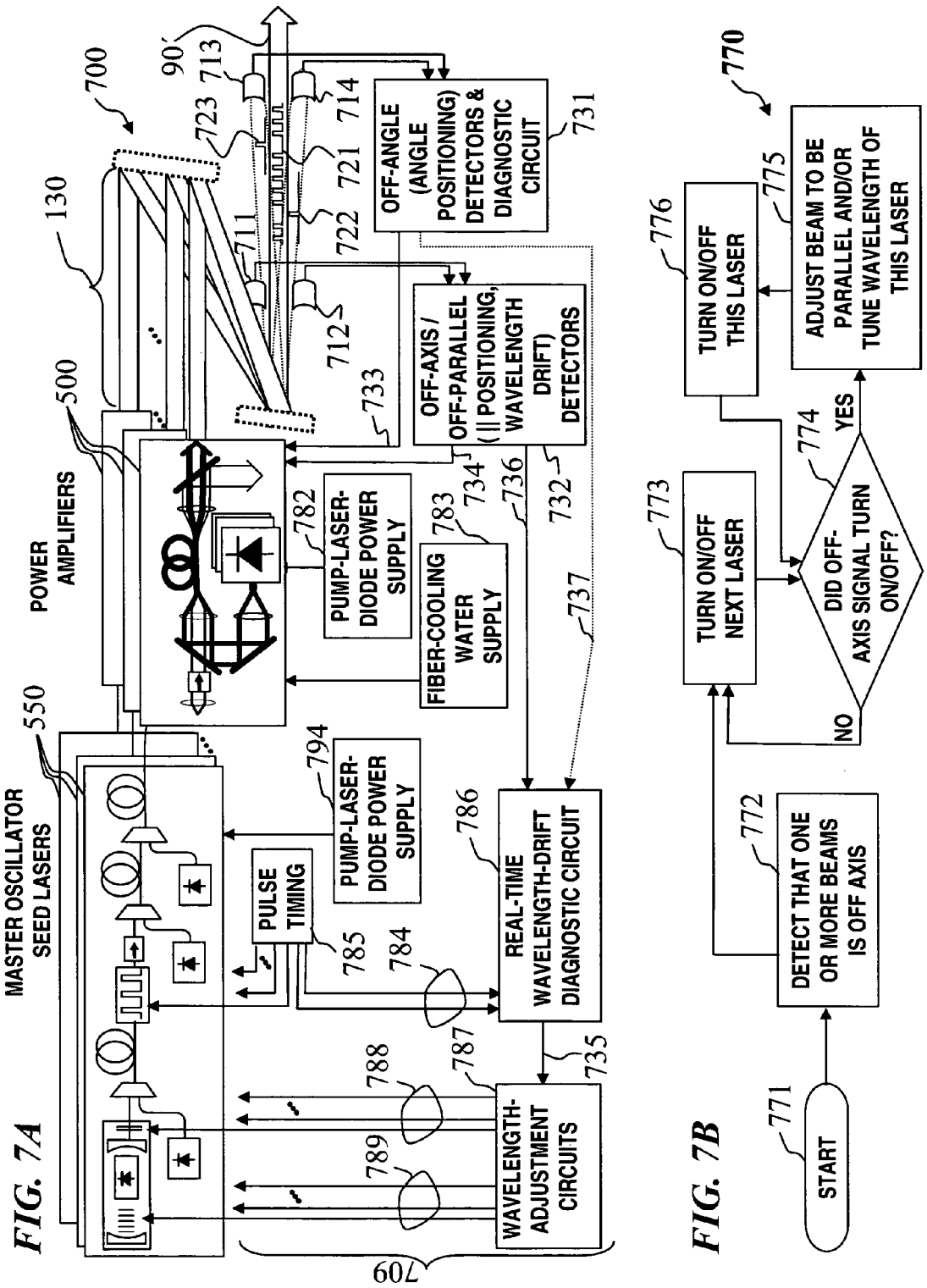

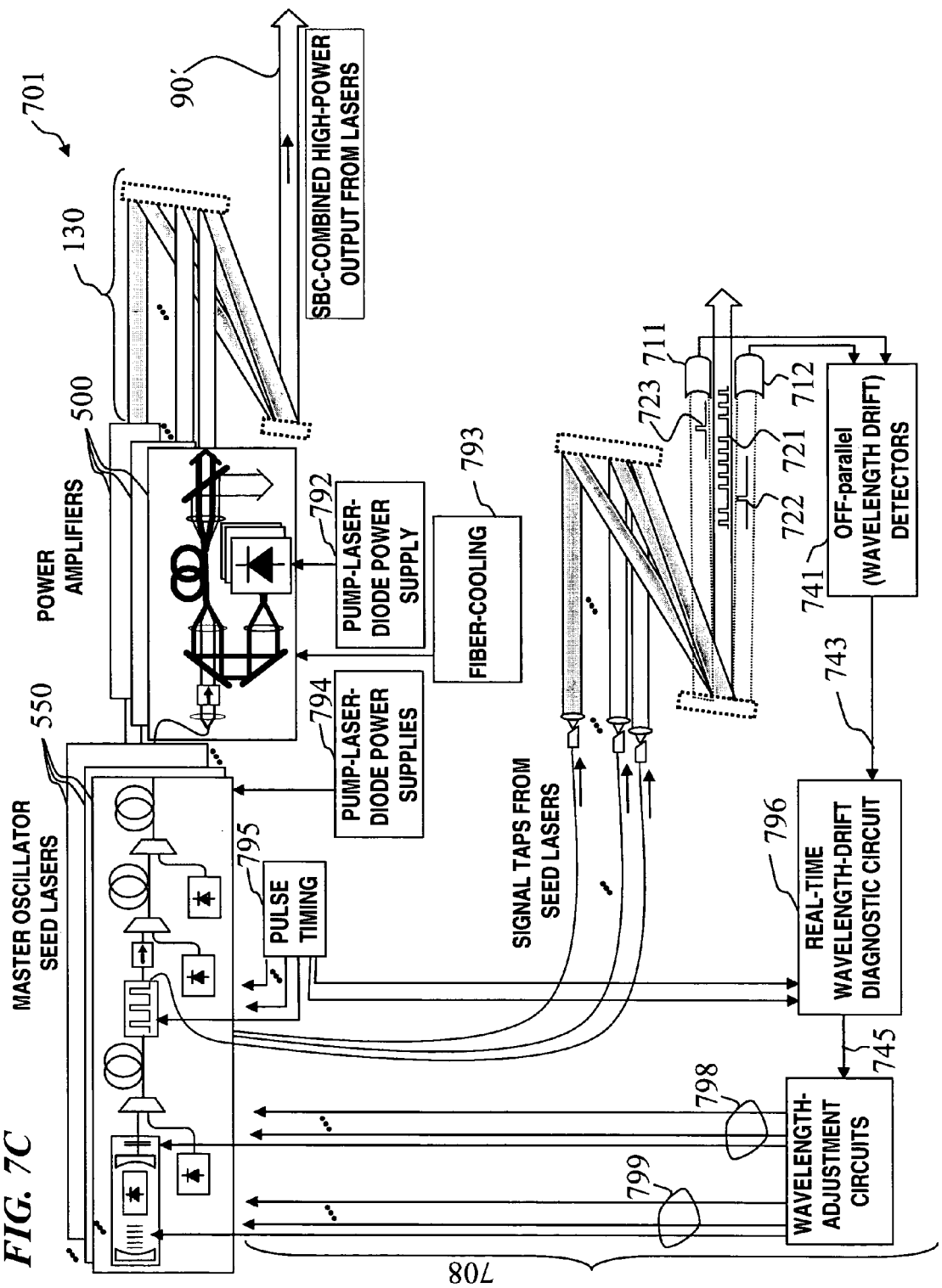

APPARATUS AND METHOD FOR SPECTRAL-BEAM COMBINING OF HIGH-POWER FIBER LASERS

CROSS-REFERENCE TO RELATED APPLICATIONS

This invention claims benefit of U.S. Provisional Patent Application 60/647,747 filed on Jan. 26, 2005, titled "SPECTRAL BEAM COMBINING OF HIGH POWER FIBER LASERS", and U.S. Provisional Patent Application 60/703,824 filed on Jul. 29, 2005, titled "PERIODIC FIBER TO SUPPRESS NONLINEAR EFFECTS IN RARE-EARTH-DOPED FIBER AMPLIFIERS AND LASERS" which are each hereby incorporated by reference in entirety.

STATEMENT REGARDING FEDERALLY SPONSORED RESEARCH OR DEVELOPMENT

This work was supported by the U.S. Air Force under contract F29601-98-D-0190 and by the U.S. Navy under contract N00178-04-C-3045. The U.S. Government has a paid-up license in this invention and the right in limited circumstances to require the patent owner to license others on reasonable terms as provided for by the terms of these contracts.

FIELD OF THE INVENTION

The invention relates generally to high-power optical amplifiers and lasers and more particularly to methods and apparatus for combining the outputs of a plurality of optical fibers into a single beam of excellent beam quality, as measured by beam-waist size and dispersion angle.

BACKGROUND OF THE INVENTION

The broad gain bandwidth of conventional fiber-laser systems allows for operation over a wide range of wavelengths, or even tunable operation. For the simplest fiber laser system with cavity mirrors having reflectivity across a broad range of wavelengths, the output wavelength can be very broad and can vary with pump power, fiber length, and/or other parameters. The power that can be generated from fiber lasers and fiber-laser amplifiers can often be limited by nonlinear optical effects in the gain and/or delivery fibers used in the system.

It is desirable to produce high peak and average powers from fiber lasers and amplifiers. Stimulated Brillouin scattering (SBS) and other nonlinear effects such as self-phase modulation (SPM), four-wave mixing (FWM), and stimulated Raman scattering (SRS) are the main effects limiting the output power and pulse energy of a fiber amplifier or laser. To suppress these effects in a fiber amplifier/laser, it is desirable to use a rare-earth-doped (RE-doped) fiber with a large core. The large core provides two benefits: Spreading the light over a larger core decreases the intensity driving the nonlinear processes, and increasing the core/cladding diameter ratio increases pump absorption, enabling the shortening of the fiber to further reduce nonlinearities. When good beam quality is required, however, increasing the core diameter of the fiber requires that the fiber numerical aperture (NA) be decreased, in order that higher-order modes cannot propagate in the fiber. Using relatively large-core, low-NA fibers with mode-filtering techniques has been demonstrated to achieve good beam quality, but there are practical disadvantages to the use of such fibers. Fibers with very low values of NA exhibit large bending losses, even for relatively large-radius bends. With fibers having the lowest NA, the fiber must be kept quite straight, otherwise the optical amplifier and/or laser has very low efficiency as the bending loss becomes too high. Since a typical laser oscillator or amplifier might require on the order of a meter or more of gain fiber, the inability to coil the fiber has precluded compact packaging of the fiber-laser system.

Stimulated Brillouin scattering (SBS) is a well-known phenomenon that can lead to power limitations or even the destruction of a high-power fiber-laser system due to sporadic or unstable feedback, self-lasing, pulse compression and/or signal amplification.

Even when a fiber amplifier or fiber laser is designed to compensate for the above effects, there will be a limit on the maximum power that can be obtained from a single fiber when scaling to larger fiber sizes and/or lengths, pump powers, and the like.

U.S. Pat. No. 6,192,062 to Sanchez-Rubio et al. entitled "Beam combining of diode laser array elements for high brightness and power" and U.S. Pat. No. 6,208,679 to Sanchez-Rubio et al. entitled "High-power multi-wavelength external cavity laser describe the fundamental techniques of spectral beam combining, and both are incorporated herein by reference.

In some embodiments, the gratings used for spectral-beam combining are "blazed," i.e., formed with V-grooves having sidewall angles that are asymmetrical with respect to a vector normal to the overall surface of the grating. U.S. Pat. No. 3,728,117 to Heidenhain et al. entitled Optical Diffraction Grid" (incorporated herein by reference) describes one method for making blazed gratings having asymmetric grooves. U.S. Pat. No. 3,728,117 to Heidenhain et al. entitled "Optical Diffraction Grid" (incorporated herein by reference) describes a method for making blazed gratings having asymmetric grooves. U.S. Pat. No. 4,895,790 to Swanson et al. entitled "High-efficiency, multilevel, diffractive optical elements" (incorporated herein by reference) describes a method for making blazed gratings having asymmetric grooves using binary photolithography to create stepped profiles. U.S. Pat. No. 6,097,863, titled "Diffraction Grating with Reduced Polarization Sensitivity" issued Aug. 1, 2000 to Chowdhury (incorporated herein by reference) describes a reflective diffraction grating with reduced polarization sensitivity for dispersing the signals. The Chowdhury grating includes facets that are oriented for reducing efficiency variations within a transmission bandwidth and that are shaped for reducing differences between the diffraction efficiencies in two orthogonal directions of differentiation. U.S. Pat. No. 4,313,648 entitled "Patterned Multi-Layer Structure and Manufacturing Method" issued Feb. 2, 1982 to Yano et al. (incorporated herein by reference) describes a manufacturing method for a patterned (striped) multi-layer article.

U.S. Pat. No. 6,822,796 to Takada et al. entitled "Diffractive optical element" (incorporated herein by reference) describes a method for making blazed gratings having asymmetric grooves with dielectric coatings. U.S. Pat. No. 6,958,859 to Hoose et al. entitled "Grating device with high diffraction efficiency" (incorporated herein by reference) describes a method for making blazed gratings having dielectric coatings.

U.S. Pat. No. 5,907,436 entitled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

U.S. Pat. No. 6,212,310 entitled "High power fiber gain media system achieved through power scaling via multiplexing" issued 3 Apr. 2001 to Waarts et al., and is incorporated herein by reference. This patent describes certain methods of power scaling by multiplexing multiple fiber gain sources with different wavelengths, pulsing or polarization modes of operation is achieved through multiplex combining of the multiple fiber gain sources to provide high power outputs, such as ranging from tens of watts to hundreds of watts, provided on a single mode or multimode fiber. One method described by Waarts et al. is similar to that shown in the present invention shown in FIG. 2A, described below, where a plurality of input laser beams of differing wavelengths are directed at different angles to a diffraction grating, which diffracts the beams into a single output beam, however, this output beam necessarily has a wavelength linewidth-dependent chromatic divergence introduced by the grating. The present invention includes many distinguishing features not in Waarts et al.

There is a need for improved laser systems, particularly fiber lasers and/or fiber optical amplifiers, wherein the optical outputs from a plurality of fibers and/or other lasers are combined into a single beam.

BRIEF SUMMARY OF THE INVENTION

In some embodiments, the invention provides methods and apparatus for spectral-beam combining the optical output from a plurality of high-power fiber lasers in a manner that provides improved or superior output beam quality.

In some embodiments, the present invention uses two parallel gratings to combine the optical outputs from a plurality of optical fibers, each having a successively higher, slightly different peak wavelength. In some embodiments, the output beams from the plurality of fibers are focussed into a row of parallel collimated input beams that impinge on the first grating of the pair and are each diffracted at a plurality of successively higher slightly different angles that all impinge on the second grating of the pair at a common overlapped area, whereupon they all diffract into a single combined output beam having higher power and higher quality (e.g., a small waist and small divergence), as compared to conventional devices.

In some embodiments, two substantially identical diffraction gratings are used in a parallel, mutually compensating configuration, where each beam is first diffracted by the first grating at wavelength-dependent angles to combine a plurality of separate parallel input beams each having a slightly different successively higher wavelength into an area on the second grating, which diffracts the combined beams into a single output beam, while simultaneously introducing a compensating dispersion that removes the angular dispersion within each beam that was introduced by the first grating. That is, the chromatic dispersion introduced to each individual beam by the first grating is needed in order to have the different-wavelength beams combine into a single beam, but the chromatic angular dispersion introduced within each individual beam is then removed by the second grating. In other embodiments, a single diffraction grating is used to combine a plurality of different wavelengths, wherein the input laser beams are obtained from very narrow linewidth sources to reduce chromatic angular dispersion (also called herein simply "chromatic dispersion"). In some embodiments, these very narrow linewidth sources are pulsed (e.g., 5-ns pulses, in some embodiments) to prevent SBS waves from building up. In some embodiments, diagnostics and adjustments of wavelengths and/or positions and angles are made dynamically in real time to maintain the combination of the plurality input beams into a single high-quality output beam.

Some embodiments of the present invention provide a method that includes providing a first laser beam and a second laser beam; introducing a first chromatic angular dispersion into the first laser beam; introducing a second chromatic angular dispersion into the second laser beam; introducing a third chromatic angular dispersion into the first laser beam, wherein the third chromatic angular dispersion compensates for the first chromatic angular dispersion; introducing a fourth chromatic angular dispersion into the second laser beam, wherein the fourth chromatic angular dispersion compensates for the second chromatic angular dispersion; and combining the first and second laser beams into a single output beam.

In some embodiments, the introducing of the first chromatic angular dispersion includes diffracting the first laser beam with a first diffractive element, and the introducing of the second chromatic angular dispersion includes diffracting the second laser beam with the first diffractive element, and the introducing of the third chromatic angular dispersion includes diffracting the first laser beam with a second diffractive element, and the introducing of the fourth chromatic angular dispersion includes diffracting the second laser beam with the second diffractive element, introducing the compensating chromatic angular dispersions to each respective one of the plurality of diffracted laser beams. In some embodiments, the first diffractive element and the second diffractive element have the same diffractive pattern. In some embodiments, the second diffractive element is positioned so a diffractive surface of the second diffractive element is parallel to a corresponding diffractive surface of the first diffractive element.

Some embodiments of the present invention provide an apparatus that includes a first diffractive element and a second diffractive element, and a source of a plurality of light beams directed to a plurality of locations on the first diffractive element, wherein the second diffractive element is positioned relative to the first diffractive element such that the plurality of light beams diffracted from the plurality of locations on the first diffractive element are directed to a single location on the second diffractive element and are diffracted by the second element into a single combined beam.

Some embodiments of the present invention provide a method that includes providing a plurality of laser beams including a first laser beam and a second laser beam, spectrally combining the plurality of laser beams into a single output beam, wavelength tuning the first fiber to generate the first laser beam at the first wavelength, wavelength tuning the second fiber to generate the second laser beam at the second wavelength, detecting that one of the laser beams has become misaligned relative to the single combined beam, determining that the first laser beam is the misaligned one, and adjusting the wavelength tuning of the first fiber in order that the first laser beam is aligned relative to the single combined beam.

Some embodiments provide an apparatus that includes an output diffractive element, and a source of a plurality of substantially monochromatic light beams directed from different angles to a single location on the output diffractive element, wherein the output diffractive element spectrally combines the plurality of light beams into a single beam, and wherein the plurality of light beams includes a first light beam having a first central wavelength and a second light beam having a second central wavelength, a first adjustment apparatus configured to set an adjustable characteristic of the first light beam, a second adjustment apparatus configured to set an adjustable characteristic of the second light beam, a detector configured to detect whether one of the light beams has become misaligned relative to the single combined beam, a diagnoser configured to determine whether the first light beam is the misaligned one and if so, to control the first adjustment apparatus to adjust the adjustable characteristic of the first light beam in order that the first light beam becomes aligned relative to the single combined beam.

BRIEF DESCRIPTION OF THE FIGURES

FIG. 1A is a schematic plan view of a spectral-beam combiner 100 with wavelength-dispersion compensation.

FIG. 1B is an input-end view of grating 111 with spatial-intensity graphs and wavelength-spectrum graphs of the input laser beams.

FIG. 1C is an output-end view of grating 112 with a spatial-intensity graph and wavelength-spectrum graph of the combined output laser beam.

FIG. 1D is an output-end view of output beam 90' at a distance with a spatial-intensity graph and wavelength-spectrum graph of the combined output laser beam.

FIG. 1E is a schematic plan view of a spectral-beam combiner 130 with wavelength-dispersion compensation.

FIG. 1F is an input-end view of grating 131 with spatial-intensity graphs and wavelength-spectrum graphs of the input laser beams.

FIG. 1G is an output-end view of grating 132 with a spatial-intensity graph and wavelength-spectrum graph of the combined output laser beam.

FIG. 1H is an output-end view of output beam 90' at a distance with a spatial-intensity graph and wavelength-spectrum graph of the combined output laser beam.

FIG. 1K is a schematic plan view of a spectral beam combiner 161 with wavelength-dispersion compensation using non-parallel gratings.

FIG. 1L is a schematic plan view of a spectral beam combiner 162 with wavelength-dispersion compensation using a single grating twice and three mirrors.

FIG. 2A is a schematic plan view of a spectral-beam combiner 200 without wavelength-dispersion compensation.

FIG. 2B is a schematic output-end view of grating 232 with a spatial-intensity graph and wavelength-spectrum graph of the combined output laser beam.

FIG. 2C is a schematic output-end view of output beam 290' at a distance with a spatial-intensity graph and wavelength-spectrum graph of the combined output laser beam.

FIG. 2D is a schematic representation of intensity cross sections of input and output beams at a various distances with a spatial-intensity graph and wavelength-spectrum graph of the combined output laser beam of a two-grating system of some embodiments.

FIG. 2E is a schematic representation of intensity cross sections of input and output beams at a various distances with a spatial-intensity graph and wavelength-spectrum graph of the combined output laser beam of a one-grating system of some embodiments.

FIG. 3B is a schematic plan view of an exemplary diffraction grating system 301.

FIG. 3C is a schematic plan view of a spectral-beam-combiner system 302 with wavelength-dispersion compensation.

FIG. 3D is a schematic plan view of a spectral-beam-combiner laser system 304 with wavelength-dispersion compensation.

FIG. 3E is a schematic plan view of a MOPA spectral-beam-combiner laser system 305.

FIG. 3F is a schematic plan view of a MOPA spectral-beam-combiner laser system 306.

FIG. 3G is a schematic plan view of a MOPA spectral-beam-combiner laser system 307 with wavelength-dispersion compensation.

FIG. 3H is a schematic plan view of a MOPA spectral-beam-combiner laser system 308 with wavelength-dispersion compensation.

FIG. 3I is a schematic plan view of a spectral-beam-combiner laser system 330 with wavelength-dispersion compensation.

FIG. 4 is a schematic block diagram of a spectral-beam-combiner (SBC) laser system 400.

FIG. 5A is a schematic plan view of an optical power-amplifier system 500 for use in an SBC system.

FIG. 6D is a graph of representative $M^2$ measurements along the horizontal-direction transverse beam axis of the 1-micron signal, collected at an amplified average power of 100 W.

FIG. 6E is a graph of representative $M^2$ measurements along the vertical-direction transverse beam axis of the same 1-micron signal.

FIG. 6F is a schematic diagram of the basic test setup to test the power-handling capabilities of a diffraction grating.

FIG. 6G shows an interferogram recorded when the heating beam is off.

FIG. 6H shows an interferogram recorded when the heating beam peak irradiance on the grating surface is 1.5 kW/cm$^2$.

FIG. 7A is a schematic plan view of a spectral-beam-combiner laser system 700 with wavelength-dispersion compensation.

FIG. 7B is a flowchart of a real-time diagnostic and adjustment process.

FIG. 7C is a schematic plan view of a spectral-beam-combiner laser system 701 with wavelength-dispersion compensation.

DETAILED DESCRIPTION OF THE INVENTION

Figure 1I:
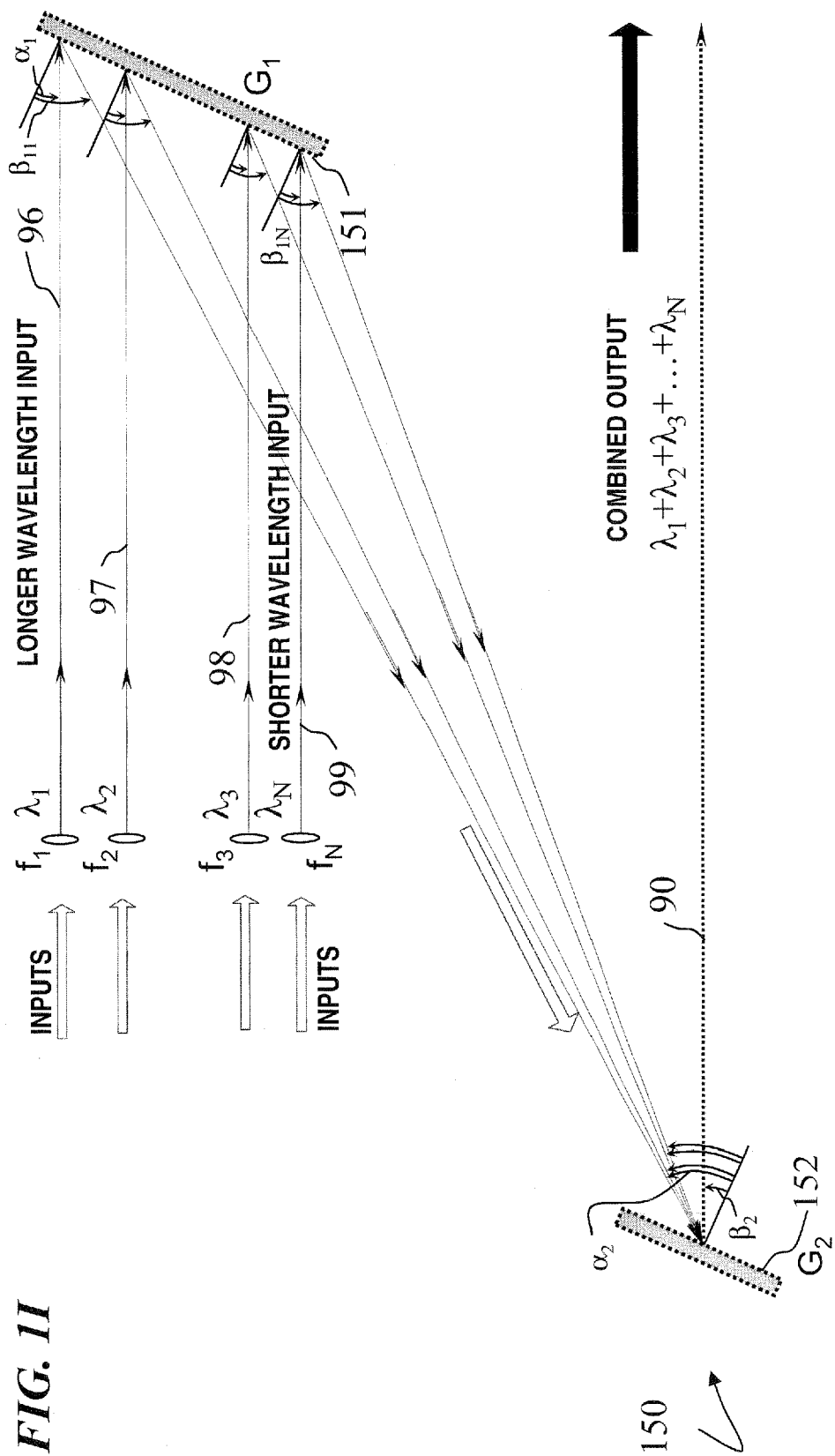
FIG. 1I is a schematic plan view of a spectral beam combiner 150 with wavelength-dispersion compensation.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from its use in the context of the description.

Stimulated Brillouin Scattering (SBS) can lead to power limitations or even the destruction of a high-power fiber-laser system due to sporadic or unstable feedback, self-lasing, pulse compression and/or signal amplification.

One way to generate output with more controlled attributes is to use a master-oscillator power-amplifier (MOPA) architecture. In some embodiments, the low-power oscillator is optimized to generate a laser seed signal having the appropriate characteristics, such as controlled linewidth and wavelength, and the seed signal is input to that power amplifier, which is used to increase the output power and/or pulse energy to much higher levels.

Recent advances in high-power fiber lasers have shown that fiber lasers are one of the most efficient solid-state lasers that have the capability to generate kW-order output power with very good beam quality. The process to scale up the output power of a single-fiber laser to a higher power level faces significant challenges since nonlinear effects, thermal loading, fiber damage, as well as the required pump power and brightness of pump laser diodes (LDs) will limit the maximum output power. Several approaches have been demonstrated to scale up output power by combining multiple lasers. Multi-core phase-locked fiber lasers that use the evanescent coupling between multiple cores of a fiber to achieve coherent combining significantly reduce nonlinear processes within the fiber core. The laser configuration is simple and robust, but the maximum power is still limited by available pump power and brightness of LDs as is the case in the single-fiber system. Coherent beam combining of multiple fiber lasers using the master-oscillator power-amplifier (MOPA) configuration solves the power limitation, but the system is very complicated and must solve phase-control, optical-alignment and stability issues.

Spectral beam combination (SBC) is a very promising means to permit scaling of fiber lasers to extremely high output powers and has achieved more than 5 watts of output power. In these demonstrations, multiple fiber lasers that operate at slightly different wavelengths have been multiplexed by a diffraction grating. The beam quality and brightness can match or exceed that achievable with coherent beam combining. Construction of reliable, functional laser systems is much more practical with SBC than with coherent beam combining because, while coherent beam combining requires precise phase control to a small fraction of a wave, spectral beam combining requires only modest bandwidth and wavelength control of the individual sources.

In some embodiments, the present invention uses high-efficiency gratings having multilayer dielectric layers provided by Lawrence Livermore National Laboratory (which is operated by the Regents of the University of California). In some embodiments, such gratings can be made according to U.S. Pat. No. 5,907,436 entitled "Multilayer dielectric diffraction gratings" issued May 25, 1999 to Perry et al., (incorporated herein by reference), which is assigned to the Regents of the University of California (Oakland, Calif.). This patent describes the design and fabrication of dielectric grating structures with high diffraction efficiency. The gratings have a multilayer structure of alternating index dielectric materials, with a grating structure on top of the multilayer, and obtain a diffraction grating of adjustable diffraction efficiency (up to 90% or more, and, in some embodiments, 95% or more), and variable optical bandwidth.

In some embodiments, the present invention uses high-efficiency gratings having multilayer dielectric layers provided by General Atomics (San Diego, Calif.). In some embodiments, such gratings can be made according to U.S. Pat. No. 6,754,006 entitled "Hybrid metallic-dielectric grating" issued Jun. 22, 2004 to Barton et al. (incorporated herein by reference) is assigned to General Atomics (San Diego, Calif.). This patent describes a diffraction grating having a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

In some embodiments, the diffraction grating is a dielectric grating chosen to provide minimal heat absorption, low coefficient-of-thermal-expansion, and/or high coefficient-of-thermal-conductivity, in order to reduce thermal distortion of the diffracted beams. In some embodiments, the dielectric grating is blazed (e.g., the angles of the sidewalls are formed at angles parallel and perpendicular to the beam direction) in order to increase the diffractive efficiency. In some embodiments, the gratings have different diffraction efficiencies for different polarizations, and the input beams are polarized in a direction relative to the grating that maximizes the diffractive efficiency of the grating.

FIG. 1A is a schematic plan view of a spectral-beam combiner 100 with wavelength-dispersion compensation. In some embodiments, a plurality of input beams 96, 97, 98, . . . 99, each having a different wavelength, are collimated into parallel beams and impinge on a first diffraction grating 111, and each diffracts at a different angle towards a single spot on a second diffraction grating 112, and there each diffracts at a different complementary angle into a single output beam 90. In some embodiments, each of the input laser beams 96–99 has a different central wavelength around 1060 nm, and each has an inherent spectral linewidth (e.g., about 0.7 nm full-width half-maximum (FWHM), in some embodiments), so, for example, a laser beam 96 with a wavelength centered at 1060 nm would extend from 1059.65 nm to 1060.35 nm FWHM. Because the grating 111 diffracts light at angles that are wavelength dependent, the portion of the exemplary laser beam 96 around 1059.65 nm (the shorter-wavelength portion of the linewidth centered at 1060 nm) would diffract at a smaller angle from the normal vector of grating 111 ending at the upper portion of intermediate beam 91, while the portion of the exemplary laser beam 96 around 1060.35 nm (the longer-wavelength portion of the linewidth centered at 1060 nm) would diffract at a larger angle from the normal vector of grating 111 ending at the lower portion of intermediate beam 91. This is referred to herein as "chromatic angular dispersion" or simply "chromatic dispersion." In some embodiments, both grating 111 and grating 112 have grating lines or grooves having substantially the same spacing, and grating 111 and grating 112 are oriented parallel to one another in order that the chromatic dispersion introduced by grating 111 is exactly negated by an opposite chromatic dispersion introduced by grating 112. Thus, output beam 90 has virtually no chromatic dispersion introduced by gratings 111 and 112, but has much of the combined power and intensity of the input beams in a single diffraction-limited beam as shown by the spatial intensity graph 116. In some embodiments, the input beams are on one side of the vector normal to the surface of grating 111, and the output beams are on the other side of a vector that is normal to the surface of grating 111. In other embodiments, the input and output beams are both on the same side of the vector normal to the surface of grating 111.

FIG. 1B is an input-end view (along section line 1B of FIG. 1A) of grating 111 shown next to spatial-intensity graphs 114 and wavelength-spectrum graphs 115 of the plurality of input laser beams. In some embodiments, laser beam 96 intersects grating 111 at the top represented by the upper lump in spatial-intensity graphs 114, with successively shorter wavelength beams 97, 98, 99 intersecting grating 111 at successively lower spots. In some embodiments, as shown in wavelength-spectrum graphs 115, the center wavelengths and linewidths of the plurality of laser beams 96–99 are selected to slightly overlap, in order that combined spectrum 117 (see FIG. 1C), representing the sum of the input spectrums 115, is substantially continuous over the wavelengths selected.

FIG. 1C is an output-end view (along section line 1C of FIG. 1A) of grating 112 and output beam 90 shown next to a spatial-intensity graph 116 (representing the intensity cross section of beam 90 in the Y direction) and wavelength-spectrum graph 117 of the combined output laser beam.

FIG. 1D is an output-end view of output beam 90' at a distance with a spatial-intensity graph and wavelength-spectrum graph of the combined output laser beam. Because of the chromatic-compensation qualities of the plurality of gratings, output beam 90' (shown next to a spatial-intensity graph 118 (representing the intensity cross section of beam 90 in the Y direction) and wavelength-spectrum graph 119 of the combined output laser beam, which, in some embodiments, has an improved beam quality $M^2$) does not have the chromatic angular dispersion (wavelength-dependent spreading in the Y direction) exhibited by a spectral beam combiner using only a single grating.

FIG. 1E is a schematic plan view of a spectral-beam combiner (SBC) 130 with wavelength-dispersion compensation. SBC 130 is similar to spectral-beam combiner 100 of FIG. 1A, except that here, the input and output beams are both on the same side of the vector normal to the surface of grating 131. In some embodiments, a plurality of input beams 96, 97, 98, . . . 99, each having a different wavelength, are collimated into spaced-apart parallel beams and impinge on a first diffraction grating 131, and each diffracts at a different angle towards a single spot on a second diffraction grating 132, and there each diffracts at a different complementary angle into a single output beam 90. In some embodiments, the spacings between each of the beams 96–99 and the spacings between gratings 131 and 132 are adjusted so that all of the beams come together at one spot on grating 132. In some embodiments, the beam sizes are enlarged to an extent (e.g., to ten or more millimeters diameter) that provides a sufficiently low power density, in order to reduce heat deformation of grating 132. The operation of system 130 is substantially similar to that of system 100 of FIG. 1A. Thus, output beam 90 has virtually no chromatic dispersion introduced by gratings 131 and 132, but has much of the combined power and intensity of the input beams in a single diffraction-limited beam as shown by the spatial intensity graph 136. In some embodiments, the input and output beams are both on the same side of the vector normal to the surface of grating 131. In other embodiments, the input beams are on one side of the vector normal to the surface of grating 131, and the output beams are on the other side of the vector normal to the surface of grating 131, as shown in FIG. 1A.

FIG. 1F is an input-end view (along section line 1F of FIG. 1E) of grating 131 shown next to spatial-intensity graphs 134 and wavelength-spectrum graphs 135 of the plurality of input laser beams. In some embodiments, laser beam 96 intersects grating 131 at the top represented by the upper lump in spatial-intensity graphs 134, with successively shorter wavelength beams 97, 98, 99 intersecting grating 131 at successively lower spots. In some embodiments, as shown in wavelength-spectrum graphs 135, laser beam 96 has the longest wavelength, and the center wavelengths and linewidths of the plurality of laser beams 96–99 are selected to slightly overlap, in order that combined spectrum 137 (see FIG. 1G), representing the sum of the input spectrums 135, is substantially continuous over the wavelengths selected.

FIG. 1G is an output-end view (along section line 1G of FIG. 1E) showing a face of grating 132 and an end-on view of output beam 90, shown next to a spatial-intensity graph 136 (representing the intensity cross section of beam 90 in the Y direction), a spatial-intensity graph 141 (representing the intensity cross section of beam 90 in the X direction) and wavelength-spectrum graph 137 of the combined output laser beam.

FIG. 1H is an output-end view of output beam 90' at a distance with a spatial-intensity graph and wavelength-spectrum graph of the combined output laser beam. Because of the chromatic-compensation qualities of the plurality of gratings, output beam 90' (shown next to a spatial-intensity graph 138 (representing the intensity cross section of beam 90' in the Y direction), a spatial-intensity graph 142 (representing the intensity cross section of beam 90' in the X direction) and wavelength-spectrum graph 139 of the combined output laser beam, which, in some embodiments, has an improved beam quality $M^2$) does not have the chromatic dispersion (wavelength-dependent spreading in the Y direction) that is exhibited by a spectral beam combiner using only a single grating (e.g., see FIG. 2A).

FIG. 1I is a schematic plan view of a spectral beam combiner 150 with wavelength-dispersion compensation using a plurality of gratings (e.g., 151 and 152). In some embodiments, each grating is made using conventional methods for making single gratings, for example, such as described in U.S. Pat. No. 3,728,117 to Heidenhain et al., U.S. Pat. No. 4,895,790 to Swanson et al., U.S. Pat. No. 6,822,796 to Takada et al., and/or U.S. Pat. No. 6,958,859 to Hoose et al. (each of which are incorporated herein by reference). In some embodiments, asymmetric grooves in gratings $G_1$ 151 and $G_2$ 152 are dielectric coated, and have a groove profile and periodicity spacing selected to maximize the efficiency of diffracting the most power into a single-order mode (i.e., the order that goes in the direction of the second grating) and to minimize the power absorbed by the gratings, in order to minimize heat distortion of the grating and to maximize output power and intensity. In some embodiments, every input beam 96, 97, 98, . . . 99 impinges into the first grating $G_1$ 151 at the same angle $\alpha_1$, but each intermediate beam leaves the first grating $G_1$ 151 at a different angle $\beta_{11}$ . . . $\beta_{1N}$ that depends on the wavelength of that beam, and each intermediate beam converges to a single spot and impinges on the second grating 152 (the surface of which is parallel to the first grating 151 ($G_1$) using the same respective angles $\alpha_{21}$ . . . $\alpha_{1N}$ as the outgoing angles $\beta_{11}$ . . . $\beta_{1N}$ for that wavelength from the first grating 151 ($G_1$), and every beam leaves the second grating at the same outgoing angle $\beta_2$ in a single combined beam that is parallel to the input beams and in the same direction.

Figure 1J:
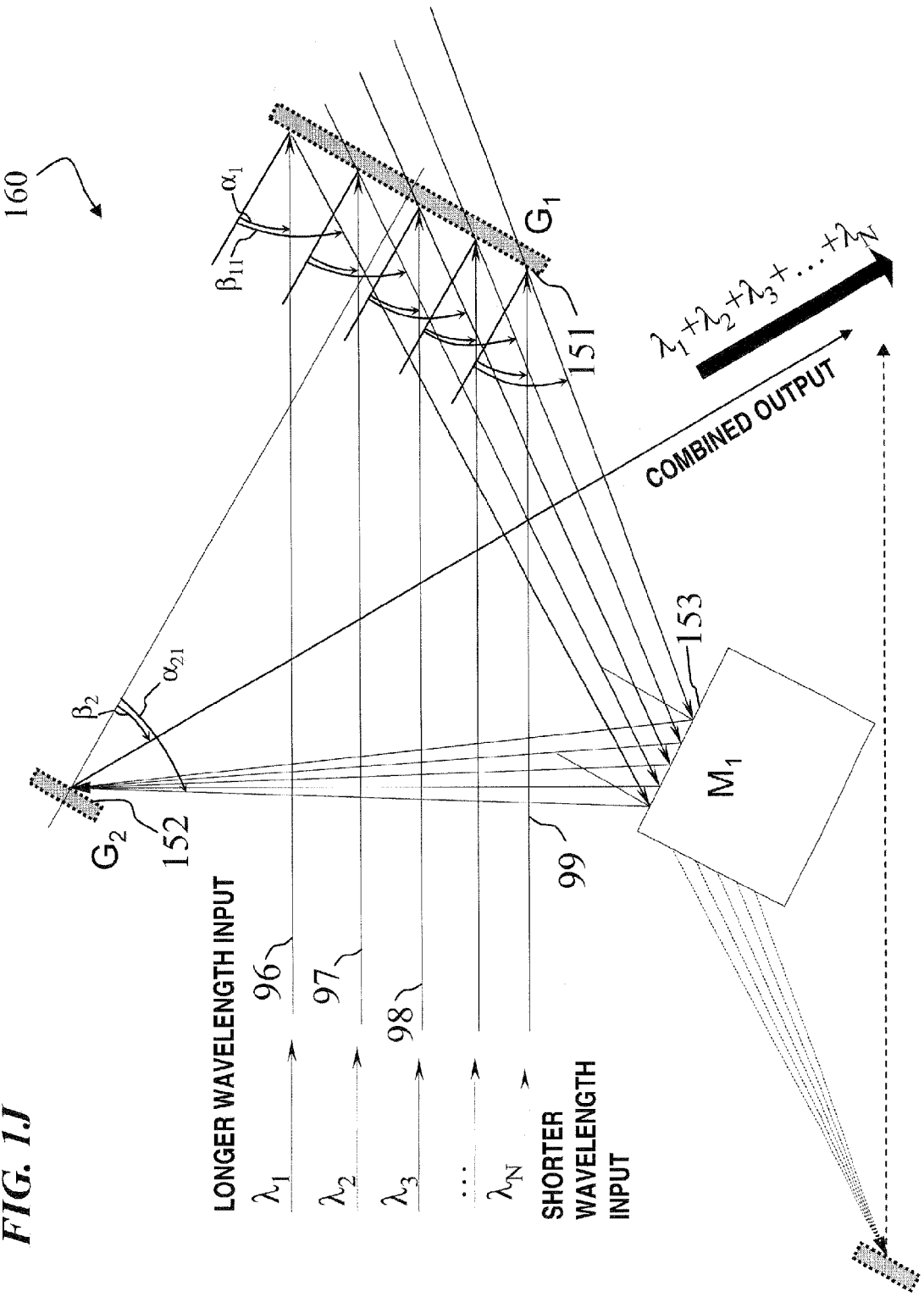
FIG. 1J is a schematic plan view of a spectral beam combiner 160 with wavelength-dispersion compensation using parallel gratings.

FIG. 1J is a schematic plan view of a spectral beam combiner 160 with wavelength-dispersion compensation using parallel gratings. In some embodiments, combiner 160 uses a first grating $G_1$ 151 and a second grating $G_2$ 152 that are again parallel to one another, but between which is a mirror $M_1$ 153 located at a point and angle along the converging spectral lines such that all of the different wavelength monochromatic light beams converge to a single location at second grating $G_2$ 152 at angles that are the complement of the angles at which they would impinge on second grating $G_2$ 152 if in the configuration shown in FIG. 1I described above. That is, in some embodiments, every input beam 96, 97, 98, . . . 99 impinges into the first grating 151 ($G_1$) at the same angle $\alpha_1$, but each intermediate beam leaves the first grating 151 ($G_1$) at a different angle $\beta_{11}$ . . . $\beta_{1N}$ that depends on the wavelength of that beam, and each intermediate beam reflects from mirror $M_1$ and converges to a single spot and impinges on the second grating 152 (the surface of which is parallel to the first grating $G_1$ 151) using the same respective angles from the normal vector from the surface of the grating $\alpha_{21}$ . . . $\alpha_{1N}$ as the outgoing angles $\beta_{11}$ . . . $\beta_{1N}$ for that wavelength from the first grating $G_1$ 151 (but in a complementary angle due to the reflection by mirror $M_1$), and every beam leaves the second grating at the same outgoing angle $\beta_2$ in a single combined beam that is not parallel to the input beams and in the complementary direction as reflected by mirror $M_1$ 153. The combined output leaves the second grating $G_2$ 152 same angle $\beta_2$, but note that the output beam is not parallel to the input beams in combiner 160.

FIG. 1K is a schematic plan view of a spectral beam combiner 161 (similar in concept to FIG. 1J) with wavelength-dispersion compensation using non-parallel gratings. This configuration is similar to that of FIG. 1J, but here the gratings are not parallel, but each of the angles relative to the gratings remain the same as the above wavelength-dispersion compensating configurations, and mirror $M_1$ 153 is located at a point and angle along the converging spectral lines such that all of the different wavelength monochromatic light converges to a single location at second grating $G_2$ 152 at angles that correspond to the angles described above for parallel gratings. In this manner, the combined output beam can be directed at various different output angles by adjusting the location and angles of mirror $M_1$ 153 and second grating $G_2$ 152, but leaving first grating $G_1$ 151 and all the input beams in fixed locations and angles.

FIG. 1L is a schematic plan view of a spectral beam combiner 162 with wavelength-dispersion compensation using a single grating twice and two mirrors. In this configuration, two mirrors (for example, each at right angles to first grating $G_1$ 151 in some embodiments), are used to redirect the converging beams to again impinge on the first grating 151 (at location $G_1$), wherein each intermediate beam impinges on the grating 151 the second time (at location $G_2$, which in some embodiments, is separated from location $G_1$ on the same grating that heat from the output spot $G_2$, does not distort the input location $G_1$ while in other embodiments, location $G_2$ and location $G_2$ are the same area) using the same respective angle $\alpha_{21}$ as the outgoing angle $\beta_{21}$ for that wavelength from the first grating.

Figures 1M, 1N:
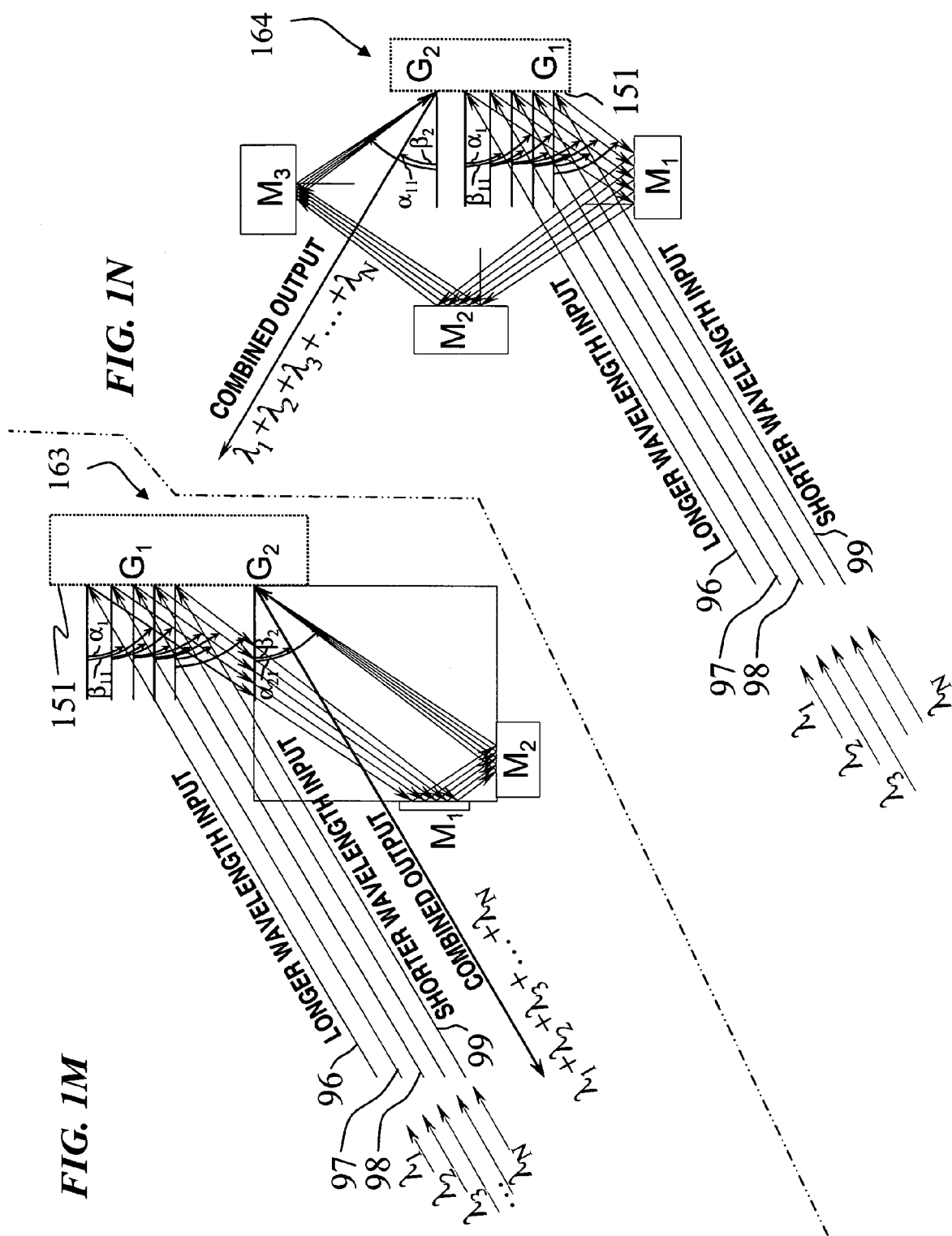
FIG. 1M is a schematic plan view of a spectral beam combiner 162 with wavelength-dispersion compensation using a single grating twice and two mirrors.
FIG. 1N is a schematic plan view of a spectral beam combiner 162 with wavelength-dispersion compensation using a single grating twice and two mirrors.

FIG. 1M is a schematic plan view of a spectral beam combiner 163 with wavelength-dispersion compensation using a single grating twice and two mirrors. Combiner 163 is similar to combiner 162 described above, but with the output beam located on the other side of mirror $M_1$ and closer to the input beams.

FIG. 1N is a schematic plan view of a spectral beam combiner 164 with wavelength-dispersion compensation using a single grating twice and three mirrors. Combiner 164 is similar to combiner 162 described above, but with a third mirror such that the output beam is located on the other side of the input beams and directed out at an angle not parallel to the input beams.

FIG. 2A is a schematic plan view of a spectral-beam combiner 200 without wavelength-dispersion compensation. In some embodiments, each of a plurality of input laser beams 296, 297, 298, . . . 299 are directed to a single spot on grating 232, each coming in at a different angle that is based on the wavelength of the input beam, in order that all the diffracted beams 291, 292, 293, . . . 294 are combined into a single output beam 290. Since only a single grating is used, some amount of chromatic dispersion (wavelength-dependent spreading in the Y direction) is exhibited in the output beam 290.

In some embodiments, active real-time beam centering of each beam is accomplished during system operation by detecting whether the particular beam is parallel but not aligned (i.e., the beam does not hit the single spot on the diffraction grating 232 to which the other beams are directed) into the single output beam 290', for example, using a first detector (not shown, but similar to detector 711 of FIG. 7A and thus closer to grating 232), e.g., one that receives light only if a beam is too high; and a second detector (not shown here, but similar to detector 712 of FIG. 7A and thus closer to grating 232), e.g., one that receives light only if a beam is too low, both of which are connected to an off-center-detection circuit that controls one or more mechanical actuators to move the individual laser 256 or its optics to center the beam on the common spot on grating 232 (see description of FIG. 7A, below). In addition, some embodiments include one or more off-angle-detection sensors 251 and 252 connected through detector circuit 253 to an off-angle (wavelength drift) analysis circuit 254 having outputs that control individual wavelength adjustment circuits 255 (e.g., in some embodiments, these control, for example, the resonant wavelength of the initial seed laser or its output filter) for each laser 256. In some embodiments, circuit 254 has one or more inputs (not shown) that are connected to receive pulse timing information (e.g., from pulse timing circuit for the individual lasers), in order to determine which laser needs its wavelength adjusted. In some embodiments, circuit 254 has outputs (not shown) that are connected to transmit pulse timing information (e.g., to pulse timing circuits for the individual lasers), in order to control pulse timing and/or laser power, in order to determine which laser needs its wavelength adjusted.

Thus, if the wavelength of one of the seed lasers drifts, its output, while remaining centered on grating 232, will also drift off-angle, and real-time diagnostic-and-adjustment circuit 254 detects which laser is off-angle and automatically adjusts its wavelength until its portion of the output beam is again centered in the far-field beam. In some embodiments, off-angle circuit 254 optionally includes an output that controls individual positioners (e.g., in some embodiments, five-degrees-of-freedom positioners that control, for example, X, Y, Z, pitch angle, and yaw angle) for each laser's output (the inputs to SBC grating 232). In some embodiments, a combination of wavelength control and positioning control is used to keep all beams combined, parallel and aligned into the single output beam 290' by iteratively adjusting position of the beam on the grating (using five-degrees-of-freedom positioners) and/or angle (using laser wavelength and/or the five-degrees-of-freedom positioners) on each beam.

In order to reduce the effect of chromatic dispersion in system 200, some embodiments use (for lasers 256) a plurality of MOPA lasers having seed lasers with very narrow linewidths (e.g., less than one nm, in order to reduce wavelength-dependent chromatic dispersion or spreading) and very short pulse durations (e.g., about ten nanoseconds or less (or, in some embodiments, 5 ns or less), in order to prevent SBS build-up of a backward-traveling parasitic beam in the power-amplifier fiber). Fiber lasers operated with narrow spectral bandwidths usually suffer from stimulated Brillouin scattering (SBS). According to the present invention, instead of cw (continuous-wave) lasers, a fiber amplifier system is used, seeded by a pulsed source. Some embodiments use cw diode lasers followed by a lithium niobate Mach-Zehnder amplitude modulator as the pulsed source (seed laser). In other embodiments, a laser diode driven by a pulsed current source can be used if the laser diode can be narrowband under pulsed excitation; for example, by using a DFB (distributed feedback) laser diode. By using pulses at least shorter than about 10 ns, SBS waves are not generated in the gain fiber.

In some embodiments, the SBC 200 of FIG. 2A (which is similar in some ways to FIG. 12 of U.S. Pat. No. 6,212,310 entitled "High power fiber gain media system achieved through power scaling via multiplexing" by Waarts et al., which is incorporated herein by reference) is used in a system 400 as shown in FIG. 4 of the present invention. FIG. 4 shows additional power supplies, pumps, diagnostics and control for the lasers used to obtain input beams 296–299, in order to control wavelengths, alignments and/or timings such that the superimposition/alignment of the beam components of output beam 290 remain aligned (since changes in the wavelengths or beam alignments due to heating of the laser components or heating of grating 232 would otherwise cause the beam components to become misaligned).

FIG. 2B is a schematic output-end view (along section line 2B of FIG. 2A) of grating 232 and output beam 290 shown next to a spatial-intensity graph 236 (representing the intensity cross section of beam 290 in the Y direction, which, in some embodiments, is spread vertically by an amount based on the angles on the incident and diffractive beams relative to the grating 232), a spatial-intensity graph 241 (representing the intensity cross section of beam 90 in the X direction, which, in some embodiments, is not spread by grating 232 other than by aberrations) and wavelength-spectrum graph 237 of the combined output laser beam.

FIG. 2C is a schematic output-end view (along section line 2C of FIG. 2A) of output beam 290' at a distance from grating 232, shown with two spatial-intensity graphs 241 and 236 and wavelength-spectrum graph 237 of the combined output laser beam. Because of the chromatic dispersion qualities of the single grating 232 (which are used to combine the beams), output beam 290' has a certain amount of chromatic dispersion (wavelength-dependent spreading of the beam in the Y direction) inevitably exhibited by a spectral beam combiner using only a single grating. In some embodiments, the amount of such chromatic dispersion is reduced by reducing the linewidth of each input beam. e.g., to about 0.1 nm or less. The essential purpose of the grating is to disperse or diffract different wavelengths at different angles, such that the different lasers, each at a different central wavelength, can be combined by impinging at a common location on the grating and emerging as a single beam, however real-world lasers will have a non-zero linewidth such that the longer-wavelength end of the linewidth from a single laser will diffract at a different angle than the shorter-wavelength end of the linewidth (called "chromatic dispersion" herein). In some embodiments, the individual seed lasers are conditioned to have a very narrow linewidth (e.g., less than 1 nm linewidth on a wavelength of 1000 to 1100 nm), in order to minimize chromatic dispersion.

FIG. 2D is a schematic representation of intensity cross sections of input and output beams at a various distances with a spatial-intensity graph and wavelength-spectrum graph of the combined output laser beam of a two-grating system of some embodiments. A plurality of input laser beams 271 are optically enlarged to a 2:1 width-to-height ratio and to a size sufficient to obtain a small enough power density on the output grating (e.g., less than 1500 W/cm$_2$, in some embodiments) in order to substantially reduce heat distortion and degradation of the output grating. Graph 272 represents a calculated intensity profile (solid curve) in the Y-direction (assuming a flat-top linewidth profile) that is spread by chromatic dispersion by an amount equal to the Y-direction FHWM width of the input beam, such that the output beam has a 1/e$^2$ beam height=beam width (the dotted curve shows a Gaussian curve of a width needed such that the output beam has a FWHM beam height=beam width). As the beam travels further from the grating, the beam cross-sections 276 and 278 and the spectrums 277 and 279 remain substantially unchanged.

FIG. 2E is a schematic representation of intensity cross sections of input and output beams at a various distances with a spatial-intensity graph and wavelength-spectrum graph of the combined output laser beam of a one-grating system of some embodiments. At the single grating, all wavelengths of the input beams are combined to a single Gaussian spot 281 (e.g., having a 10 mm diameter=2ω$_0$) having a Y-direction intensity profile 282 and an X-direction intensity profile 283. The initial beam cross-section ("spot") is shown as 274, and its spectrum is shown as 275. Without astigmatic optical focusing, at various distances Z, the beam cross-section will have spread in the Y-direction by an amount based on the linewidths of the individual input beams (e.g., spots 284, 286 and 288 having a spectrums 285, 287 and 289), but with astigmatic optical focusing or compensation the spots 264, 266 and 288 will result at those distances Z. With narrower linewidths, improved beam quality results in the various amounts of chromatic-dispersion spreading occurring at further distances.

Figure 2F:
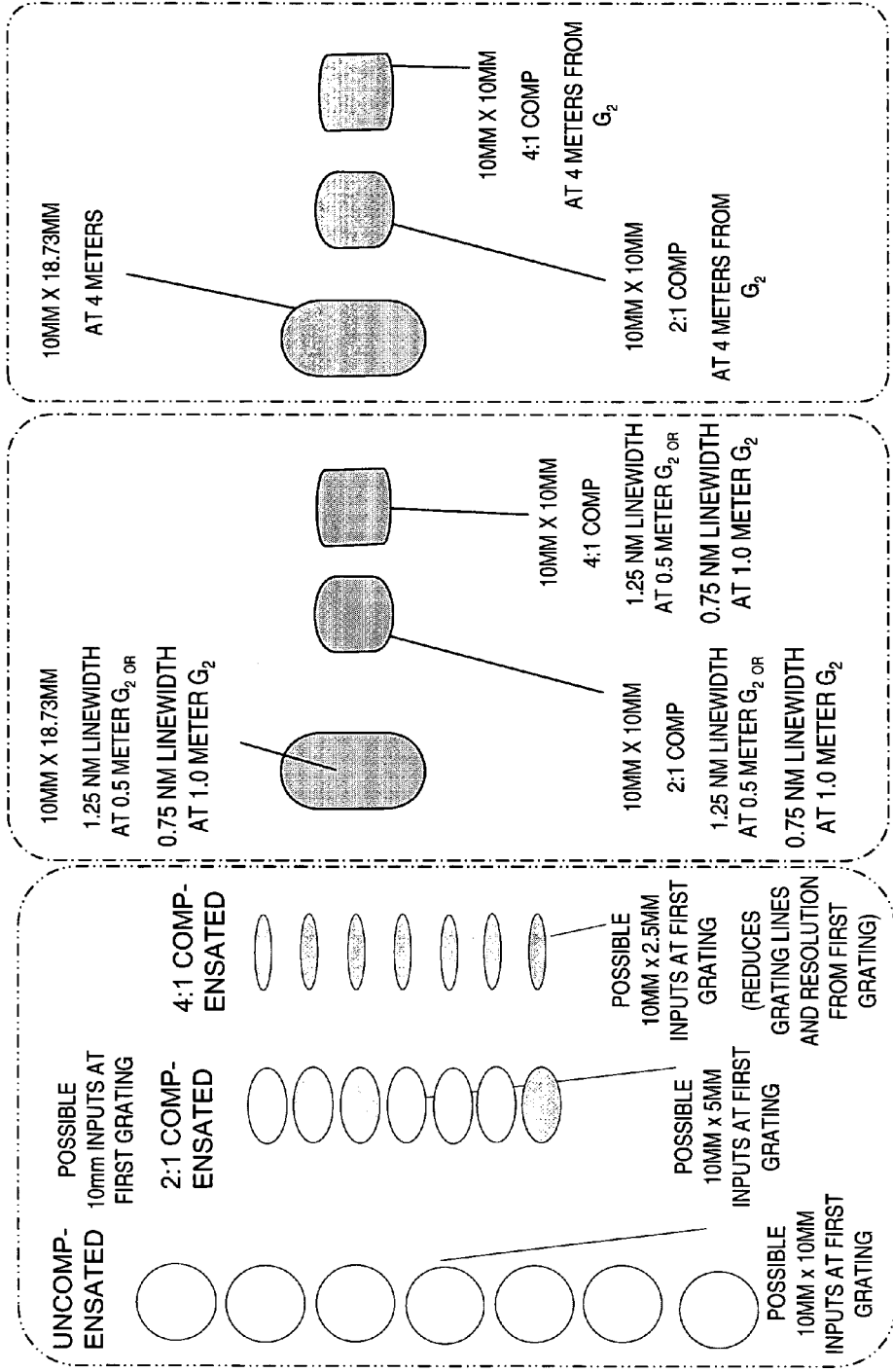
FIG. 2F is a schematic representation of intensity cross sections of input and output beams at a various distances for three different input-beam shapes for a two-grating SBC system of some embodiments.

FIG. 2F is a schematic representation of intensity cross sections of input and output beams at a various distances for three different input-beam shapes for a two-grating SBC system of some embodiments. Three sets of possible input beams are shown: a first set of uncompensated circular beams (e.g., 10 mm by 10 mm), a second set of 2:1 precompensated oval beams (e.g., 10 mm by 5 mm), and a third set of 4:1 precompensated oval beams (e.g., 10 mm by 2.5 mm), with, for example, seven different center wavelengths that are to be SBC combined. At a first grating spacing, for example, the uncompensated circular beams would form an elongated spot (e.g., 10 mm by 18.7 mm), while the precompensated beams would have heights equal to widths (selected as the FWHM dimensions or the 1/e$^2$ dimensions, as desired). As the distance from the second output grating increases, these beam intensity cross sections substantially do not change due to chromatic dispersion since the two-grating configuration stops further chromatic dispersion after the second grating.

Figure 2G:
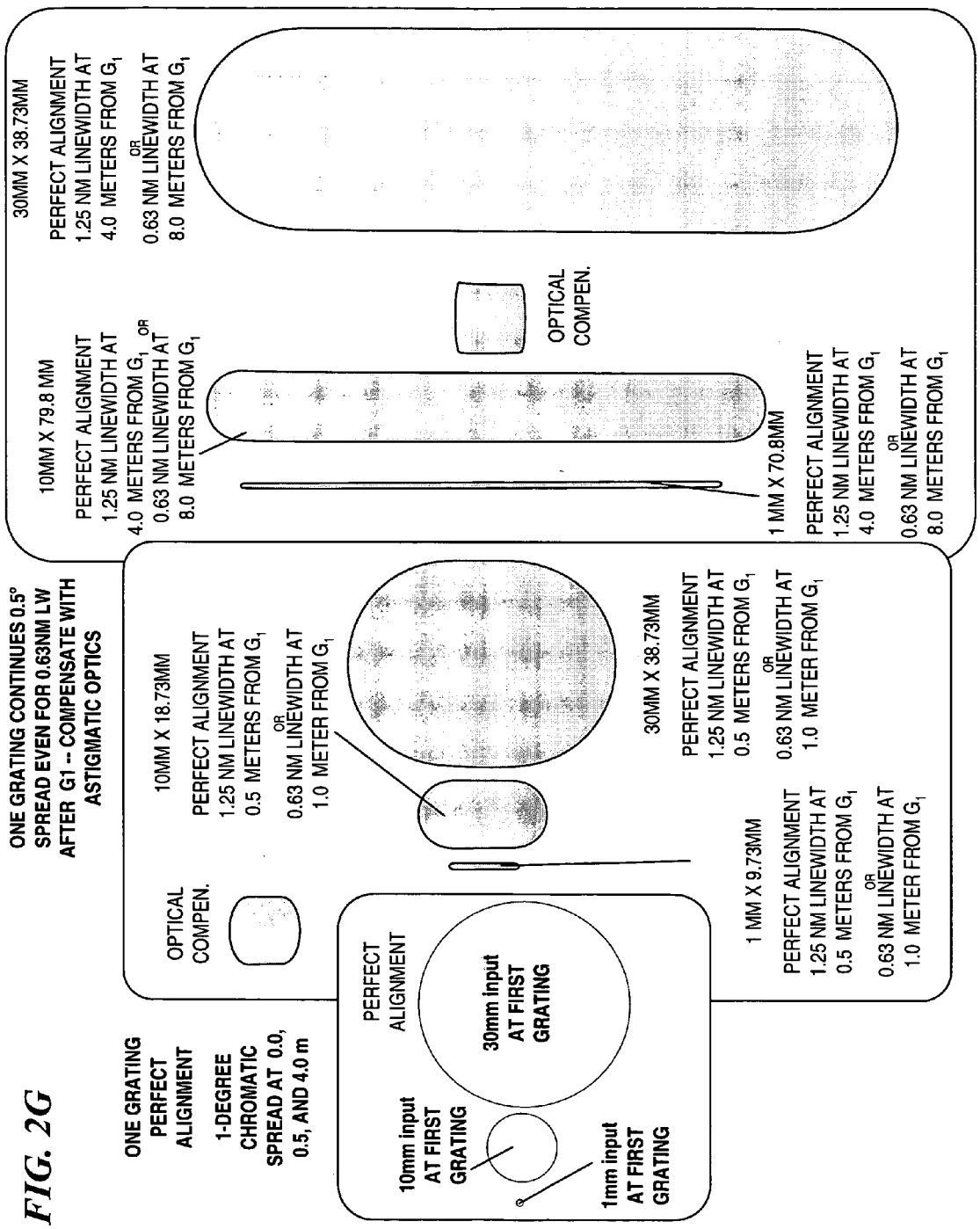
FIG. 2G is a schematic representation of intensity cross sections of input and output beams at a various distances for three different input-beam shapes for a one-grating SBC system of some embodiments.

FIG. 2G is a schematic representation of intensity cross sections of input and output beams at a various distances for three different input-beam shapes for a one-grating SBC system of some embodiments. Three sets of possible input beams are shown: a first set of circular beams (e.g., 1 mm by 1 mm), a second set of circular beams (e.g., 10 mm by 10 mm), and a third set of circular beams (e.g., 30 mm by 30 mm), with, for example, seven different center wavelengths that have been SBC combined at one spot on the single grating (the output grating). At a first distance from the grating, for example, the small circular beams would form an elongated spot with a very bad aspect ratio (e.g., 1 mm by 9.73 mm), while the larger initial beams would have heights closer to widths (e.g., 10 mm by 18.73 mm or 30 mm by 38.73 mm, respectively, selected as the FWHM dimensions or the 1/e$^2$ dimensions, as desired). As the distance from the second output grating increases, these beam intensity cross sections do substantially change due to chromatic dispersion since the one-grating configuration does not further chromatic dispersion after the single grating. In some embodiments, an astigmatic focusing element (such as a cylindrical lens or mirror of an appropriately selected shape, see description of FIG. 3F below) is used to reshape the output beam so its height-to-width ratio stays at about one.

Figure 2H:
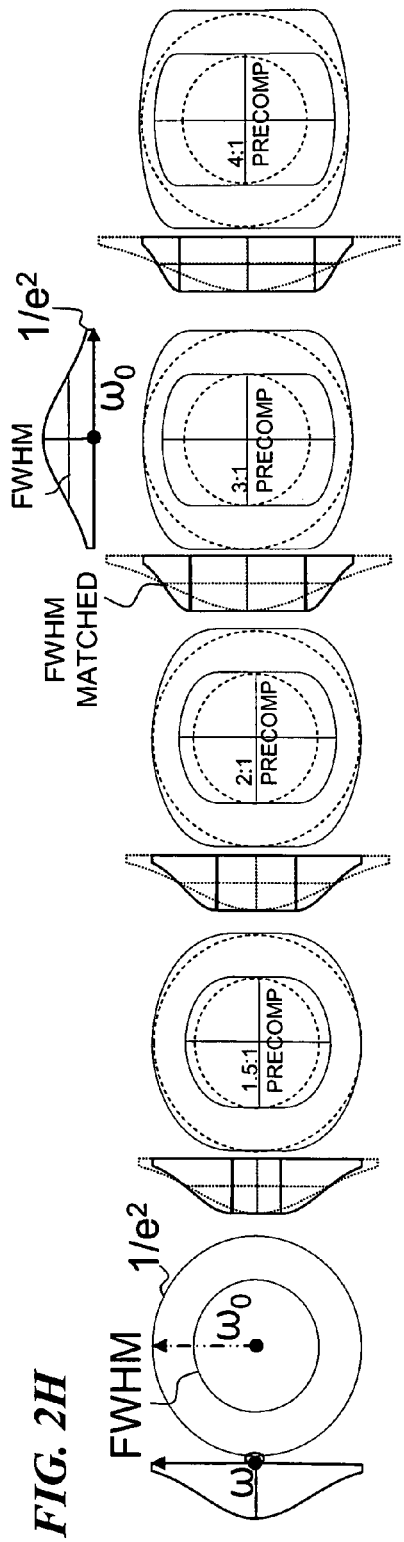
FIG. 2H is a schematic representation of intensity cross sections of output beams for different input-beam shapes for a two-grating SBC system of some embodiments.

FIG. 2H is a schematic representation of intensity cross sections of output beams for different input-beam shapes for a two-grating SBC system of some embodiments. The cross-section intensity profile of a circularly symmetric Gaussian beam is shown at the left, next to a plan view of the same cross-section, showing the full-width half-maximum (FWHM) and 1/e$^2$ circumferences. Next are shown the same graphs for a beam with 1.5:1 precompensation, a beam with 2:1 precompensation, a beam with 3:1 precompensation, and a beam with 4:1 precompensation, each set so its 1/e$^2$ width and its 1/e$^2$ height are approximately equal. Beneath the 1/e$^2$ graphs for the 3:1 precompensation are graphs for 3:1 precompensation where the FWHM width is set equal to the FWHM height.

Figure 3A:
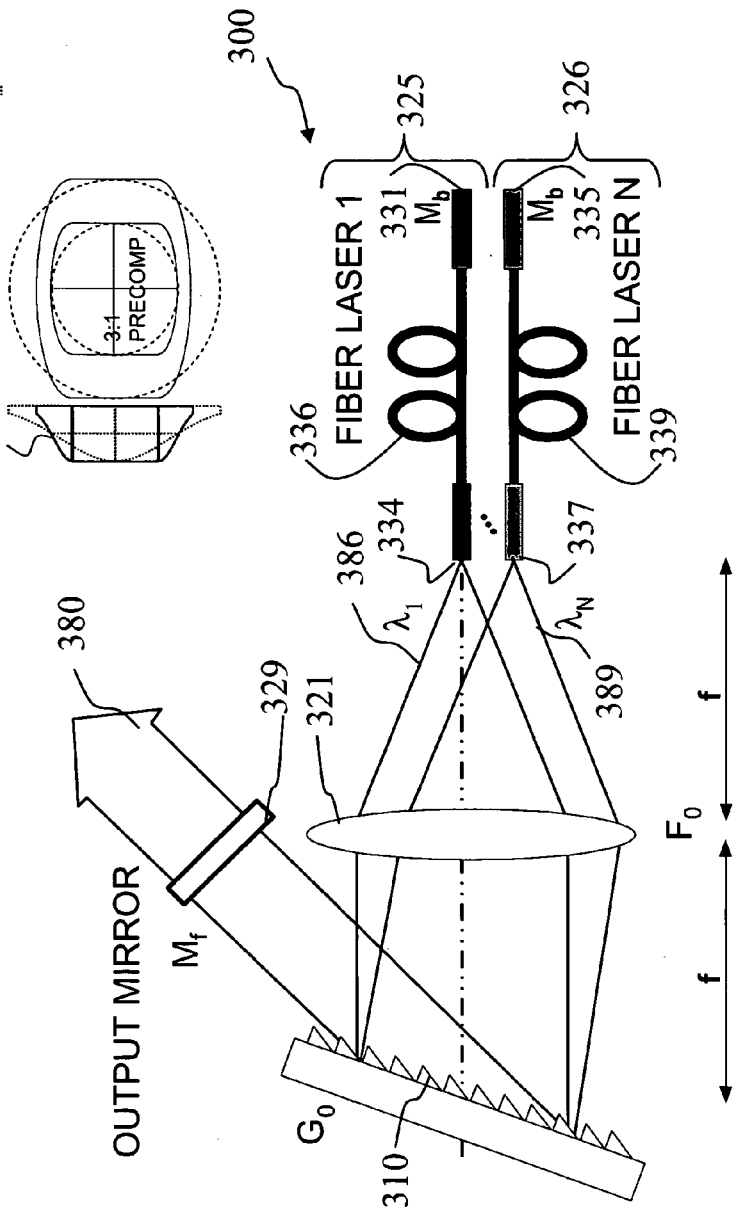
FIG. 3A is a schematic plan view of a spectral-beam-combiner laser system 300.

FIG. 3A is a schematic plan view of an exemplary spectral-beam-combiner laser system 300. In various embodiments, both power oscillator (PO) and master oscillator power amplifier (MOPA) configurations are used to combine the wavelengths from different emitters into a single beam. FIG. 3A shows an exemplary power-oscillator spectral-beam-combined fiber laser system 300 where a partially reflecting output mirror 329 (the output coupler) provides feedback through grating 310 (G$_O$) to the plurality of different fiber lasers 325 through 326 and locks each one to a wavelength that allows for a single output beam 380. In some embodiments, a spatial filter (not shown) is included to prevent crosstalk between channels. Each fiber laser 325–326 receives feedback at a slightly different center wavelength from the output coupler 329 and grating 310 that forces its operation at a unique center wavelength such that its output beam 386–389 spatially overlaps that of the other fiber lasers at grating 310 (G$_O$) and through output coupler 329. The output beam 380 has chromatic dispersion due to the non-zero linewidth of each laser beam and the spread of diffraction angles that linewidth incurs at grating 310 (G$_O$), which acts both to determine each fiber laser's operating wavelengths, and to combine their output beams. FIG. 3E shows fiber MOPAs combined using a similar optical system 305, but with the wavelengths of each respective master oscillator 351 . . . 356 set to overlap the beam from each other fiber amplifier in the far-field of beam 290. In some embodiments, the master oscillators use tunable sources set to the wavelength required for each channel, or an array of fibers or diodes in a power oscillator SBC system similar to that shown in FIG. 3A.

In some embodiments, system 300 includes a plurality of lasers (325, 326, and the like, each operating at a slightly different peak wavelength) that are spectrally combined using grating G$_O$ 310 and output through partial reflector 329. Each fiber laser (325, 326, and the like) of the plurality includes a laser cavity having the fiber laser gain medium (336, 339 and the like) having backside M$_b$ reflector (331, 335, and the like) and signal input/output port (334, 337, and the like), transform lens 321, grating 310, and output coupler (partially transmissive mirror 329), wherein the diffraction angle of the grating 310 determines the operating wavelengths of each fiber laser in the fiber-laser array. For example, the first laser 325 operates at wavelength $\lambda_1$ and the $N^{th}$ laser 326 operates at wavelength $\lambda_N$. In some embodiments, each fiber laser (325, 326, and the like) receives feedback from the output coupler (partially transmissive mirror 329) that forces its operation at a wavelength such that its output beam spatially overlaps the beams of the other fiber lasers (325, 326, and the like) and has a wavelength that is spectrally next to the wavelengths of the lasers to either side. Each fiber laser (325, 326, and the like) has a back-end reflector (e.g., a reflective grating or mirror $M_b$, or other suitable feedback device, designated 331 and 335). Each fiber laser (325, 326, and the like) has a suitable pump mechanism, such as a double-clad fiber pumped by a high-power laser diode stack. The grating 310 acts both to determine the fiber laser operating wavelengths and to combine their output beams into beam 380. In this description, a model that analyzes dependence of laser linewidth on beam quality of an SBC system is given. Based on the model, a novel configuration (having a plurality of gratings) that significantly improves beam quality is discussed. The experimental results have shown that control of fiber-laser linewidth (i.e., making the linewidth very narrow) is one key to achieving high-power single-grating SBC laser systems.

In other embodiments, other types of lasers (such as optically pumped semiconductor lasers (OPSLs), optically pumped photonic-crystal fiber lasers, and the like) are substituted for fiber lasers 325, 326, and the like in system 300 (i.e., while the rest of the apparatus remains substantially the same, the fiber-gain medium 336, 339, and the like are replaced with semiconductor gain media, photonic-crystal fiber gain media, and the like).

In some embodiments, the number of grooves on the grating illuminated by a beam determines the spectral resolving power of the grating:

$$R = \frac{\lambda}{\Delta\lambda} = mN$$

where m is the diffraction order and N is the number of grooves illuminated. For most cases of interest, we use gratings with a single diffraction order, m=−1, and N can be determined from the beam diameter, D and the angle of incidence, α.

$$D = \frac{2\omega}{\cos\alpha} = Nd = \frac{N}{g}$$

where d is the spacing between grooves (in units of length) or g is the groove density. Then the wavelength spread that can be resolved by the grating is $$\frac{\lambda}{\Delta\lambda} = N = \frac{2\omega}{d\cos\alpha} \text{ or } \Delta\lambda = \frac{\lambda d \cos\alpha}{2\omega}$$

For various grating groove densities, examples can be calculated of the beam sizes required to stay below a given irradiance (i.e., to avoid damage) and the corresponding wavelength spread.

$$\text{spot ... width} = \omega = \sqrt{\frac{\cos\alpha}{\pi} \times \frac{\text{POWER}}{\text{POWER/AREA}}} \text{ and}$$

grating ... resolution =

$$\lambda_{n+1} - \lambda_n = \frac{\lambda \cos\alpha}{g \times 2\omega} = \frac{\lambda \cos\alpha}{g \times 2\sqrt{\frac{\cos\alpha}{\pi} \times \frac{\text{POWER}}{\text{POWER/AREA}}}}$$

For many gratings, high efficiency is obtained at angles around the Littrow angle. Therefore for the example below, we assume a single incidence angle equal to the Littrow reflection angle. As example irradiance values, we use 1.5 kW/cm² and 15 kW/cm² for the beam areas on the grating (including the factor for the Littrow angle of incidence), and output powers of 1 and 100 kW. Since the higher irradiance value of 15 kW/cm² is still well below typical damage thresholds of dielectric coatings, we believe this value should be attainable with appropriate selection of the materials used in the dielectric coatings and substrate, along with consideration of grating mounting and cooling configurations for very high power beams.

One of the advantages of high-power fiber lasers over traditional solid-state lasers is that diffraction-limited beam quality can be generated at kW output power levels as the beam quality is determined by the core numeric aperture (NA) and the mode-field diameter and thus is extremely insensitive to the output power. When the output beams of a plurality of fiber lasers with single-mode cores are combined by the SBC, it is desirable for the combined beam to have the same beam quality as the individual lasers if all lasers operate at the resonator-determined linewidth and there is no additional aberrations induced by the optical components. However the linewidth of each laser can be broadened by non-linear processes, such as stimulated Brillouin scattering (SBS) and self-phase-modulation, as well as gain saturation occurring in inhomogeneous gain media. As a result, the majority of high power fiber lasers operating at greater than 100 Watts have linewidths greater than one nm. To understand how the laser linewidth affects the beam quality of the SBC, we have developed a simple model for some embodiments in which the linewidth broadening is taken into account.

FIG. 3B is a schematic plan view of an exemplary diffraction grating system 301 that includes a grating 310. Consider a single-mode Gaussian beam with a linewidth $\Delta\lambda$ incident on diffraction grating 310 as shown in FIG. 3B. Assuming the Rayleigh length of the beam is long enough in the range of interest (in some embodiments, that is true when the beam diameter is more than 10 mm), then the beam quality of the diffracted beam can be described by $$M_1^2 = \frac{\omega_1 \theta_1}{\omega_0 \theta_0} \qquad \text{EQ. (1)}$$

where, $\omega_0$ and $\theta_0$ are the beam waist (radius) and divergence of the incident beam (assumed, in some embodiments, to be a perfect Gaussian) respectively, while $\omega_1$ and $\theta_1$ are the beam waist and divergence of the diffracted beam respectively.

The ratio of the width of a collimated diffracted beam to that of a collimated incident beam is $$\frac{\omega_1}{\omega_0} = \frac{\cos\beta_1}{\cos\alpha_1} \qquad \text{EQ. (2)}$$

Here $\alpha_1$ and $\beta_1$ are the angles of incidence and diffraction, respectively.

Accordingly, the ratio of the divergence of a collimated diffracted beam to that of a collimated incident beam is $$\frac{\theta_1}{\theta_0} = \frac{\cos\alpha_1}{\cos\beta_1} \qquad \text{EQ. (3)}$$

However, equation (3) does not account for angular spread due to the linewidth $\Delta\lambda$ of the beam. To simplify the analysis, assuming a top-flat spectral profile within the linewidth, the full angular width of the diffracted beam induced by linewidth broadening is $$\theta_B = \frac{g\Delta\lambda}{\cos\beta_1} \qquad \text{EQ. (4)}$$

where g is the grating groove density. When this angular spread is included, the diffracted beam divergence becomes $$\theta_1 = \frac{\cos\alpha_1}{\cos\beta_1}\theta_0 + \frac{1}{2}\theta_B \qquad \text{EQ. (5)}$$

and then the beam quality of the diffracted beam can be described by $$M_1^2 = \frac{\theta_1 \cos\beta_1}{\theta_0 \cos\alpha_1} = 1 + \frac{\theta_B}{\theta_0}\frac{\cos\beta_1}{\cos\alpha_1} = 1 + \frac{g\Delta\lambda}{\theta_0 \cos\alpha_1} \qquad \text{EQ. (6)}$$

For the SBC cavity shown in FIG. 3A, if there is no additional linewidth broadening within the system, and the laser operates at a linewidth defined by the cavity resolution:

$$\Delta\lambda = \frac{d}{gf}\cos\alpha_1 \qquad \text{EQ. (7)}$$

where f is the focal length of the collimation lens and d is the fiber mode field diameter. Then Equation (6) becomes $$M_1^2 = \frac{\theta_1 \cos\beta_1}{\theta_0 \cos\alpha_1} = 1 + \frac{d}{2f\theta_0} \approx 2 \qquad \text{EQ. (8)}$$

Equation (8) shows that the beam quality of the SBC laser will become worse than each original laser if the laser linewidth of each laser is equal to the cavity resolution defined by Equation (7). For conventional solid-state laser systems, the laser linewidth is always narrower than the cavity defined linewidth as the gain saturation clamps the lasing linewidth in a homogenous broadening gain media. However, high-power fiber lasers operate in a different regime as both homogenous and inhomogenous broadening contribute to linewidth broadening. Nonlinear processes broaden the linewidth. This is why the majority of high-power fiber lasers produce a broadband output.

FIG. 3C is a schematic plan view of a spectral-beam-combiner system 302 with wavelength-dispersion compensation. To reduce the impact of the linewidth broadening of the single grating of FIG. 3B on the beam quality, some embodiments use a two-grating configuration 302, for example, as shown in FIG. 3C. In some embodiments, the second grating 311 is identical to the first grating 310, and is used to compensate the angular spread of the beam due to linewidth broadening (also called herein "chromatic dispersion") by introducing an equal and opposite angular spread. In terms of the grating equation, it is very easy to understand that the diffracted beam from the second grating must be parallel to the incident beam, i.e., $$\theta_2 = \theta_0;\ \alpha_2 = \beta_1;\ \beta_2 = \alpha_1; \qquad \text{EQ. (9)}$$

The beam size of the diffracted beam after the second grating is thus $$\omega_2 = \frac{\cos\beta_2}{\cos\alpha_2}(\omega_1 + \theta_1 l) \qquad \text{EQ. (10)}$$

where l is the length of optical path between the two gratings. Then the beam quality of the diffracted beam after the second grating is $$(M_2)^2 = \frac{\omega_2 \theta_2}{\omega_0 \theta_0} = 1 + \frac{\theta_0 l}{\omega_0}(M_1)^2 \qquad \text{EQ. (11)}$$

If two gratings are placed very close, then it is possible to simplify equation (11) into $$(M_2)^2 \approx 1 \qquad \text{EQ. (12)}$$

by using $l = \omega_0$, and $\theta_0 \ll 1$.

FIG. 3D is a schematic plan view of a spectral-beam-combiner laser system 304 with wavelength-dispersion compensation based on the two-grating scheme, as used in some embodiments to provide a modified and improved SBC fiber laser system. In some embodiments, system 304 includes three gratings ($G_0$ 310, $G_1$ 311, and $G_2$ 312), a fiber-laser array, cavity mirrors $M_b$ and $M_f$, and one or more transform lenses 321, which together form power oscillator system 319. In some embodiments, system 304 includes a plurality of lasers (327, 328, and the like, each operating at a slightly different peak wavelength) that are spectrally combined using grating $G_0$ 310 (a single grating that is used to set each of the different wavelengths), reflected by highly reflective reflector 322 back to grating 310 that again separated the various wavelengths to their respective laser fibers. In some embodiments, system 304 includes a plurality of active-gain-media optical fibers 336 . . . 339 each capable of lasing across a range of wavelengths, but each forced to lase at one of a plurality of slightly different wavelength $\lambda_1$ 386 . . . $\lambda_N$ 389, respectively, as set by different diffraction angles to grating $G_0$ 310. In some embodiments, the ends 334 . . . 337 of the fibers are laterally spaced such that collimating lens 321 directs each laser beam toward grating 310 at a different successive angle.

Each fiber laser (327, 328, and the like) of the plurality includes a laser cavity having the fiber laser gain medium (336, 339 and the like) having a partially reflecting reflector and output coupler (e.g., front-side mirror) $M_f$(332, 333, and the like) and signal input/output port (334, 337, and the like), transform lens 321, grating 310, and highly reflective mirror 322, wherein the diffraction angle of the grating 310 determines the operating wavelengths of each fiber laser in the fiber-laser array. For example, the first laser 327 operates at wavelength $\lambda_1$ and the $N^{th}$ laser 328 operates at wavelength $\lambda_N$. In some embodiments, each fiber laser (327, 328, and the like) receives wavelength-selective feedback from the backside mirror 322 and grating 310 that forces its operation at a wavelength such that its output beam, after diffraction by gratings 311 and 312, spatially overlaps the beams of the other fiber lasers (327, 328, and the like) to form combined output beam 390, and has a wavelength that is spectrally next to the wavelengths of the lasers to either side. The back mirror $M_b$322 has a very high reflection at all wavelengths of the laser array. The left-side input facets of the fiber array and the grating $G_0$ are located at the back and front focal planes of the lens $F_0$, respectively. With this arrangement, the laser beams from the laser array are collimated and overlapped on the grating 310 ($G_0$). The operation wavelength of each laser is determined by the optical dispersion provided by the grating 310, the lens 321 ($F_0$) and the top-to-bottom spacing of fiber input facets 334 and 337. On the output side, there are two identical gratings $G_1$ and $G_2$ as well as a collimating lens array.

The multiple laser beams from the laser array are collimated by the lens array $f_1$–$f_N$ 341 into substantially parallel beams that illuminate the face of the first grating $G_1$ at the same incident angle. After the diffraction by the grating $G_1$, all the beams have slightly different diffraction angles, since the wavelengths from the laser array are slightly different. As a result, all laser beams can be completely overlapped at a certain position where the grating $G_2$ is located. These overlapped beams are then diffracted by the grating $G_2$ at the same diffraction angle (this can be adjusted by changing the top-to-bottom spacing of each individual right-side end 332–333 of the fiber array, and by changing the distance between gratings 311 and 312). Because the two gratings 311 and 312 ($G_1$ and $G_2$) have the same grating frequency (e.g., line spacings of between about 600 lines per mm to 1800 lines per mm, in some embodiments) and are parallel to each other, the overlapped output beams 390 diffracted by $G_2$ must be parallel to the incident beams 396–399 impinging on the grating $G_1$. The partial-reflection mirror $M_f$ is the output coupler for each fiber laser, and, in some embodiments, is coated on the fiber facet and provides feedback and transmission to each respective one of the laser beams. By this way, many lasers operating at different wavelengths can be combined into one beam without beam-quality reduction.

Further, unlike system 300 of FIG. 3A in which the chromatic dispersion angle of the output beam increases if the linewidths of the individual lasers are broadened (or decreases if the linewidths of the individual lasers are narrowed), the individual lasers 327–328 of FIG. 3D can each have quite broad linewidths and the compensating gratings prevent any increase in chromatic dispersion. Therefore, the device can increase the total laser power by a factor of N if there are N laser gain media in the system, regardless of the linewidths of the input laser beams.

In other embodiments, other types of lasers (such as optically pumped semiconductor lasers (OPSLs), optically pumped photonic-crystal fiber or rod lasers, and the like) are substituted for fiber lasers 327, 328, and the like in system 304 (i.e., while the rest of the apparatus remains substantially the same, the fiber-gain medium 336, 339, and the like are replaced with semiconductor gain media, photonic-crystal fiber or rod gain media, and the like).

With some embodiments of the two-grating approach 304 as shown in FIG. 3D, the beam quality of the combined beam is substantially insensitive to linewidth of the individual input lasers. Therefore, in some embodiments, each laser of system 304 can operate either with narrow linewidths (e.g., using very short pulses to avoid SBS buildup) or at relatively wide linewidths at high power, which also helps avoid the detrimental SBS process that otherwise amplifies a backward-traveling wave, draining pump power and reducing output power and efficiency. In contrast, note that system 300 of FIG. 3A requires, or benefits greatly if the linewidth of each input laser is very narrow, in order that the chromatic dispersion angle for each component of the output beam is minimized.

FIG. 3E is a schematic plan view of a MOPA spectral-beam-combiner laser system 305. In some embodiments, system 305 includes a plurality of master oscillators (MOs) 351 ... 356. MO 351 includes a partial-reflecting diffraction Bragg reflector 352 in one end of a laser fiber, and a facet 354 at the other (left) end, which transmits an expanding beam 386 that is somewhat collimated by lens 321 onto diffraction grating 310, which diffracts the beam at substantially the Littrow angle to mirror 322, where it is reflected back along the identical path in reverse, being focussed and received into facet 354. This laser oscillates at a characteristic wavelength set by the angles at which the beam intersects grating 310 (e.g., a somewhat longer wavelength than that of laser 356, which includes grating 357 and facet 359, but otherwise functions in a similar manner. Master oscillator 351 provides as its output a seed laser signal of a very narrow linewidth through one-way optical isolator 353 into power amplifier 355, which, in some embodiments, is a large-mode-area (LMA) amplifying fiber, PC fiber, PC rod, or the like having a low NA and operating substantially in the fundamental mode (for example, by methods described in U.S. Pat. No. 5,818,630 to Fermann, et al., entitled "Single-mode amplifiers and compressors based on multi-mode fibers", or U.S. Pat. No. 6,496,301, to Koplow, et al., entitled "Helical fiber amplifier", which are incorporated herein by reference, such that only the single mode exits through the end facet 362 of the endcap. In some embodiments, the end facets 354, 359, 362, and 363 are cleaved or polished at an angle chosen to minimize feedback and maximize the emitted light. In a similar manner, master oscillator 356 provides as its output a seed laser signal of a very narrow linewidth through one-way optical isolator 358 into power amplifier 360, which emits its output through facet 363. In some embodiments, a large plurality of other similar MOPAs, each operating at a different intermediate wavelength are implemented between MOPA 351, 355 and MOPA 356, 360, and all the output beams are somewhat collimated and directed to grating $G_1$ 311 at corresponding angles to those of grating $G_0$ 310 and spectrally combined into a single output beam 290. In some embodiments, a larger v while a smaller spot is used on grating $G_1$ 311 in order that fewer grating lines are used and a wider bandwidth is obtained.

FIG. 3F is a schematic plan view of a MOPA spectral-beam-combiner laser system 306. System 306 is substantially identical to system 305 described above, but with the addition of a concave astigmatic mirror 369 (one having a negative cylindrical shape, wherein the curved cross section is a parabola or other shape useful for re-collimating the chromatic dispersion) used with convex astigmatic mirror 368 (one having a positive cylindrical shape, wherein the curved cross section is a parabola or other shape useful for re-collimating the chromatic dispersion) together used to re-collimate the linewidth-dispersion angle and maintain a better (lower) $M^2$ value.

FIG. 3G is a schematic plan view of a MOPA spectral-beam-combiner laser system 307 with wavelength-dispersion compensation. In some embodiments, a plurality of laser sources (such as $MOPA_1$–$MOPA_N$) are provided in a manner similar to FIG. 3F, except that lens 361 $F_1$ forms substantially parallel intermediate collimated beams directed to grating(s) 311, and, in some embodiments, a plurality of separate gratings 311 are provided, each parallel to output grating 312, but each of the plurality of separate gratings 311 located at a distance from output grating 312 such that the beam(s) it directs are substantially the same size on output grating 312 after linewidth spreading. (Otherwise, the beams that intersect grating 312 centered on the same spot, but with different amounts of spectral spreading due to the different distances for the beams and different angles on intersection at grating 312.)

FIG. 3H is a schematic plan view of a MOPA spectral-beam-combiner laser system 308 with wavelength-dispersion compensation. System 308 is similar to system 307. In some embodiments, a plurality of laser sources (such as $MOPA_1$–$MOPA_N$) are provided in a manner similar to FIG. 3G, except that a plurality of separate lenses 368 $F_1$–$F_N$ form substantially parallel intermediate collimated beams directed to grating(s) 311.

Certain experiments have been performed. In some embodiments, lasers used in these experiments are commercial fiber lasers with a maximum output power of 30 W. In some embodiments, the Yb-doped double-clad fibers are pumped by fiber-coupled LDs via star-couplers. In some embodiments, the fibers are polarization-maintaining single mode fibers with a mode-field-diameter of 6.5 μm. In some embodiments, each fiber laser has a high-reflection fiber-Bragg reflector (FBG) with reflection >99% attached as the rear reflector and has a bandwidth of 7 nm at a central wavelength of 1078 nm. On the output side, the fibers are angle-polished and mounted on nano-positioning stages to construct the SBC cavity.

The results obtained in this study show that in some embodiments, SBC is a promising method for beam combination of high-power fiber lasers. Based on the model, in some embodiments, control of laser linewidth and avoiding grating heating distortion are the keys to achieving diffraction-limited beam quality. The laser linewidths of the fiber lasers in a single-grating configuration must be somewhat narrower than the resolution of the SBC cavity. Because commercial high power fiber lasers have broad linewidth, a new SBC configuration with two or three gratings is needed to combine them to achieve very high power and preserve beam quality. Furthermore, a high-efficiency diffraction grating with high damage threshold and ultra-low thermal distortion will be needed in any configuration. If these issues are properly addressed, power scaling to the multi-kilowatt regime using many fiber lasers will be feasible.

FIG. 3I is a schematic plan view of a spectral-beam-combiner laser system 330 with wavelength-dispersion compensation. System 330 uses substantially the same output SBC as system 304 of FIG. 3D (see description for FIG. 3D above for those aspects), but uses a different method and apparatus for setting successively different lasing wavelengths of the lasers. In some embodiments, system 330 includes three gratings ($G_0'$ 309, $G_1$ 311, and $G_2$ 312), a fiber-laser array, and cavity mirrors $M_f$, which together form power oscillator system 318. In some embodiments, system 330 includes a plurality of lasers (323, 324, and the like, each operating at a slightly different peak wavelength) that each cross grating $G_0'$ 309 at a slightly different angle (grating $G_0'$ 309 is a single grating or single grating-forming process that is used to set each of the different wavelengths), wherein grating $G_0'$ 309 forms a highly reflective Bragg reflection grating on each fiber to reinforce the various wavelengths to their respective laser fibers. In some embodiments, system 330 includes a plurality of active-gain-media optical fibers 336 . . . 339 each capable of lasing across a range of wavelengths, but each forced to lase at one of a plurality of slightly different wavelength $\lambda_1$ 386 . . . $\lambda_N$ 389, respectively, as set by different angles of each fiber to grating $G_0'$ 309.

Each fiber laser (323, 324, and the like) of the plurality includes a laser cavity having the fiber laser gain medium (336, 339 and the like) having a partially reflecting reflector and output coupler (front-side mirror) $M_f$ (332, 333, and the like). Each uses a wavelength-determining highly reflective Bragg reflection grating $G_0'$ 309, wherein the different angles of each fiber to grating $G_0'$ 309 determine the operating wavelengths of each fiber laser in the fiber-laser array. For example, the first laser 323 operates at wavelength $\lambda_1$ and the $N^{th}$ laser 324 operates at wavelength $\lambda_N$. In some embodiments, each fiber laser (323, 324, and the like) receives wavelength-selective feedback from the backside Bragg reflection grating $G_0'$ 309 that forces its operation at a wavelength such that its output beam, after diffraction by gratings 311 and 312, spatially overlaps the beams of the other fiber lasers (323, 324, and the like) to form combined output beam 390, and has a wavelength that is spectrally next to the wavelengths of the lasers to either side. On the output side, there are two identical gratings $G_1$ 311 and $G_2$ 312 as well as a collimating lens array $f_1$–$f_N$ 341.

The multiple laser beams from the laser array are collimated by the lens array $f_1$–$f_N$ 341 into substantially parallel beams that illuminate the face of the first grating $G_1$ at the same incident angle, as described above for FIG. 3D. Further, in some embodiments, unlike system 300 of FIG. 3A in which the chromatic dispersion angle of the output beam increases if the linewidths of the individual lasers are broadened (or decreases if the linewidths of the individual lasers are narrowed), the individual lasers 327–328 of FIG. 3D can each have quite broad linewidths and the compensating gratings prevent any increase in chromatic dispersion. Therefore, the device can increase the total laser power by a factor of N if there are N laser gain media in the system.

In other embodiments, other types of lasers (such as optically pumped semiconductor lasers (OPSLs), optically pumped photonic-crystal fiber, rod, or rod-like fiber lasers, and the like) are substituted for fiber lasers (323, 324, and the like) in system 330 (i.e., while the rest of the apparatus remains substantially the same, the fiber-gain medium 336, 339, and the like are replaced with semiconductor gain media, photonic-crystal fiber gain media, and the like).

FIG. 4 is a schematic block diagram of a spectral-beam-combiner (SBC) laser system 400. In some embodiments, system 400 includes a plurality of seed lasers (master oscillators) whose output wavelength, line width, power, pulse width, pulse timing, and the like can be individually and/or collectively controlled by power supplies, diagnostic, and control module 450. The outputs of the master oscillators 410 are amplified by optical power amplifiers 420, such that blocks 410 and 420 together form an array of MOPAs. The outputs of the power amplifiers 420 are combined into one or more single beams by one or more spectral beam combiners 430. The one or more single beams are then optionally pointed by one or more output-beam directional pointers 440 into one or more output beams 441. In some embodiments, one or more signals or beam information data 461 are obtained from the output beam and returned as inputs to block 460. In some embodiments, the output beam(s) 441 are very high power (e.g., where the SBC 430 is used to achieve higher powers than otherwise available) and used for military purposes such as antiaircraft, antitank, antiship, antisatellite, antipersonnel, antistructure, and the like. In some such embodiments, block 460 represents a circuit that does automatic threat analysis, target identification, and countermeasures control, and block 440 provides beam direction control.

In other embodiments, the output beam(s) 441 are very high power and used for industrial purposed such as welding or cutting of metal, glass, ceramic or plastic, cutting of wood or fabric, annealing of materials such as metal, semiconductors and the like, and other industrial purposes. In some such embodiments, block 460 represents a circuit that does pattern and material analysis (determining what has been cut or welded and what needs to be cut or welded), and block 440 provides beam direction and/or work-piece-movement control.

In yet other embodiments, the output beam(s) 441 are relatively low power and used for machine vision or medical illumination and/or scanning purposes (e.g., where the SBC 430 is used to achieve broader optical spectra with laser-source-type intensities than otherwise available), such as optical coherence tomography (for example, as described in U.S. Pat. No. 6,950,692 entitled "Optical coherence tomography apparatus, optical fiber lateral scanner and a method for studying biological tissues in vivo", U.S. Pat. No. 6,950,692 entitled "Optical coherence tomography apparatus, optical fiber lateral scanner and a method for studying biological tissues in vivo" and U.S. Pat. No. 6,882,431 entitled "Quantum optical coherence tomography data collection apparatus and method for processing therefor," each of which is incorporated herein by reference).

In still other embodiments, the output beam(s) 441 are relatively low power and used for telecommunications purposes such as wavelength-division multiplexing (WDM) or dense wavelength-division multiplexing (DWDM) (e.g., where the SBC 430 is used to either combine a large plurality of narrow linewidth different wavelength modulated signals, and the system also optionally includes an SBC with wavelength-dispersion compensation that is used to separate a single incoming optical communications signal beam into a plurality of separate beams of the different component signals).

FIG. 5A is a schematic plan view of an optical power-amplifier system 500 for use in a MOPA-SBC system. In some embodiments, system 500 includes a plurality of seed lasers 550 (e.g., each outputting 5 ns pulses at a repetition rate of 10 MHz (i.e., a repeating series of 5 ns on, 95 ns off)) as the master oscillators, where the output beams are collimated by respective lenses 511 (one for each master oscillator, in some embodiments), are isolated by one or more one-way optical isolators 514 and optionally 515, and enter the corresponding power amplifier 532 through dichroic beamsplitter 520 and focusing lens 530. In some embodiments, power amplifier fiber 532 is a large-mode-area, dual-clad fiber amplifier that is pumped by one or more arrays of pump laser diodes (LDs, not shown) whose light (in some embodiments, about 400 watts or more) enters through fiber 528 to fiber end 526, and through objective lens 524 and off highly reflective mirror 522 towards and reflected by dichroic beamsplitter 520 into the power amplifier fiber 532. The output signal beam and residual pump light exit the fiber 523 towards the right, and are collimated by lens 534 towards dichroic beamsplitter 536, where the residual waste pump light 538 is reflected downward, and the signal 540 is transmitted. In some embodiments, a power-amplifier system 500 is used for each of the power amplifiers 420 of FIG. 4.

In some embodiments, realizing diffraction-limited Spectral Beam Combining (SBC) of multiple high-power fiber lasers requires that each laser possess a spectral width on the order of a few GHz (i.e., a very narrow linewidth; see, e.g., A. Liu, R. Mead, T. Vatter, A. Henderson and R. Stafford, "Spectral beam combining of high power fiber lasers," in Proceedings of SPIE, vol. 5335, 81–88 (2004), incorporated herein by reference) and exhibit diffraction-limited spatial output. Obtaining high-efficiency beam combining and ensuring amplitude stability for the combined beam additionally requires, due to the polarization sensitivity typical of high-power diffraction gratings (see, e.g., M. D. Perry, R. D. Boyd, J. A. Britten, D. Decker, B. W. Shore, C. Shannon, E. Shults, and L. Li, "High-efficiency multilayer dielectric diffraction gratings," Opt. Lett., vol. 20, 940–942 (1995) (and U.S. Pat. No. 5,907,436 entitled "Multilayer dielectric diffraction gratings" issued May 25, 1999 to Perry et al., which are incorporated herein by reference); and Karl Hehl, J. Bischoff, U. Mohaupt, M. Palme, B. Schnabel, L. Wenke, R. Bodefeld, W. Theobald, E. Welsch, R. Sauerbrey and H. Heyer, "High-efficiency dielectric reflection gratings: design, fabrication, and analysis," Appl. Opt., vol. 38, 6257–6271 (1999); incorporated herein by reference) that each laser in the SBC array have a polarization extinction ratio (PER)>>1 and a stable polarization orientation with respect to time. One architecture for MOPAs developed at Aculight (assignee of the present invention) to meet these needs is illustrated in FIG. 5A. In some embodiments, the power amplifier 500 includes a polarization-maintaining (PM), large-mode area (LMA) fiber 532 that is pumped at 976 nm with up to 400 W of power (e.g., supplied by a laser-diode array, in some embodiments); the pump-delivery fiber 528 has a core diameter of 600 microns (in some embodiments, having a numeric aperture of 0.22=NA). In some embodiments, LMA fiber 532 is double-clad, with a core diameter of 20 microns (in some embodiments, having a numeric aperture of 0.06=NA) and an inner cladding diameter of 400 microns (in some embodiments, having a numeric aperture of 0.46=NA). In some embodiments, LMA fiber 532 is wound on a water-cooled mandrel for cooling the LMA fiber 532. In some embodiments, the seed beam 521 and pump beam 523 are both coupled (in a direction left-to-right in FIG. 5A) via free-space optics 530 into the input facet 531 of the LMA fiber 532, leaving each output end 533 free to be spatially arrayed as required for input to the multi-channel SBC (e.g., 430 of FIG. 4). In some embodiments, the LMA fiber input facet 531 is held in a water-cooled chuck that is mounted on a 5-axis, XYZ, tip/tilt stage; both ends of the fiber 532 have 8-degree angle polishes. In some embodiments, two free-space isolators 514 and 515 protect the seed laser 550 from back-propagating signals generated by the power amplifier 532. Table 1 provides a detailed list of components for one embodiment of the system illustrated in FIG. 5A.

TABLE 1

List of components illustrated in FIG 5A. All lenses are anti-reflection coated

| Component | Vendor | Part No. | Description |
|---|---|---|---|
| Objective 1 | ThorLabs | C110TM-B | 6.24 mm focal length molded glass aspheric lens |
| Objective 2 | Special Optics | 54-15-15-980-1080 | 15 mm focal length, fused silica multi-element objective |
| Objective 3 | Special Optics | 54-17-30-980-1080 | 30 mm focal length, fused silica, multi-element objective |
| Isolators | Electro-Optic Technologies | 8I1055-WP | Broadband (1030–1080 nm), free-space optical isolators, >30 dB isolation Two isolators in series |
| Dichroic beamsplitter | Semrock | ACUL-0002 | Beamsplitter that transmits 1040–1080 nm and reflects 980 nm |

Figure 5B:
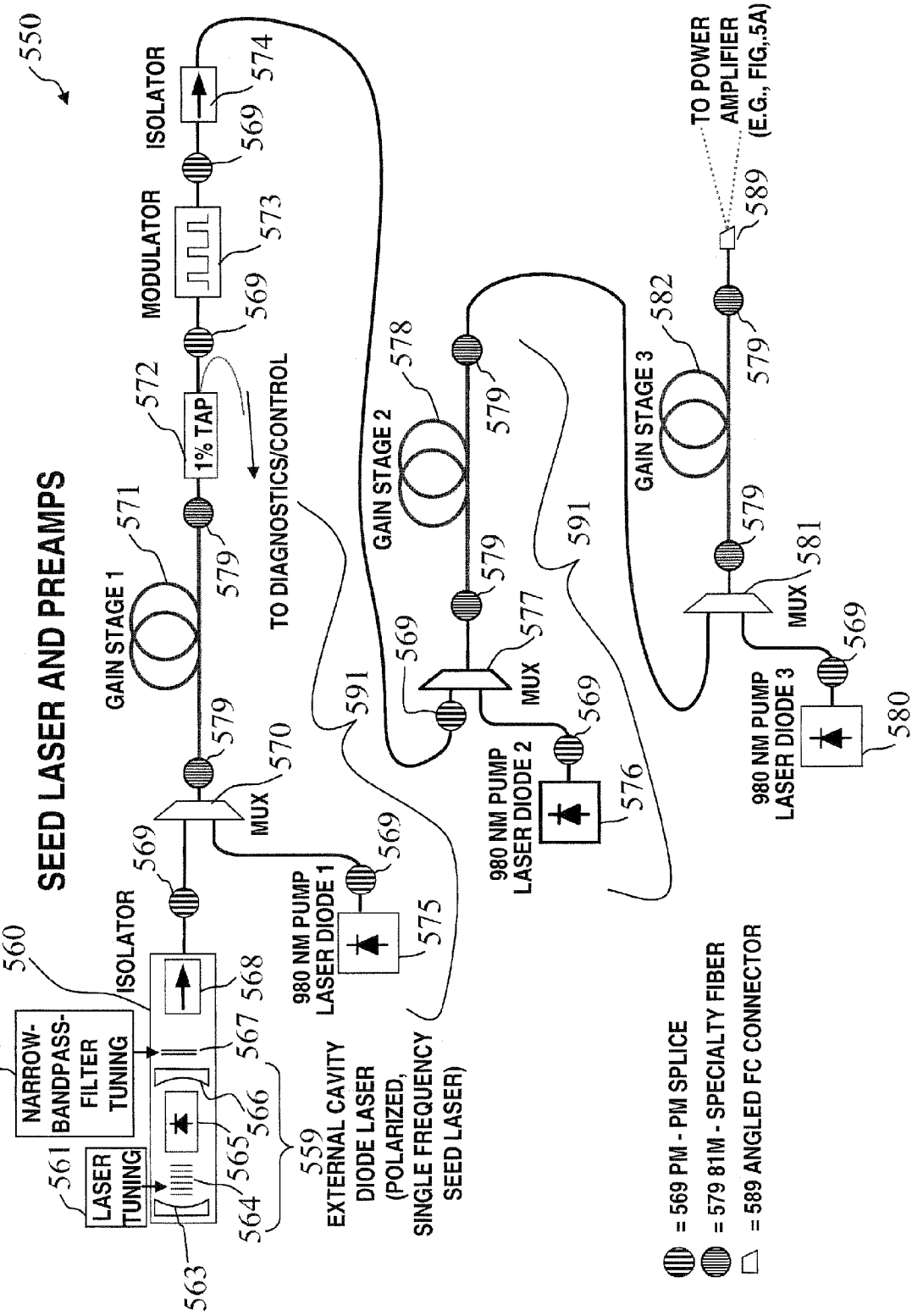
FIG. 5B is a schematic plan view of an optical master oscillator system 550 for use in an SBC system.

FIG. 5B is a schematic plan view of a low-power optical master oscillator system 550 for use in a MOPA-SBC system. In some embodiments, the output is pulsed (5 ns pulses @ 10 MHz repetition rate, in order to suppress SBS) and contains >300 mW of average power with a spectral purity of >99.9% and a spectral bandwidth of about 100 MHz. The wavelength is tunable over nearly the entire Yb-gain spectrum. In some embodiments, the seed input 521 to the LMA amplifier 532 of FIG. 5A is provided by the polarized, low-power front-end laser depicted in FIG. 5B. In some embodiments, the seed laser 550 includes a tunable, narrowband oscillator 560 (in some embodiments, a Littman-Metcalf external-cavity diode laser (ECDL) having cavity reflectors 563 and 566, a laser tuning mechanism 564 to tune the central wavelength, a laser diode 565, a narrow bandpass tunable filter 567, and one or more serially connected optical isolators 568), a Mach-Zehnder modulator 573, and a series of single-mode PM gain stages. The ECDL output is delivered to gain stage 1 via single-mode PM fiber through a PM—PM splice 569. An isolator 568 is integrated into the ECDL housing to protect the laser 560 from optical feedback. In some embodiments, gain stage 1 includes a first pump laser diode 575 connected to one input of multiplexer 570 through a PM—PM splice 569, where the other input to multiplexer 570 through a PM—PM splice 569 is laser 560. The output of multiplexer 570 is connected to gain fiber 571 through a PM-Specialty Fiber splice 579, and the output of gain fiber 571 is connected through a PM-Specialty Fiber splice 579 to a 1% tap 572 that extracts 1% of the signal to be used for diagnostics and/or control (e.g., to control wavelength drift). The output of the 1% tap is coupled through a PM—PM splice 569 to Mach-Zehnder modulator 573, which converts the continuous-wave (cw) optical output from stage 1 to a quasi-cw pulse train (5 ns pulses @ 10 MHz repetition rate) that is designed to suppress Stimulated Brillouin Scattering (SBS) in the LMA power amplifier 500 by providing the narrowband seed on time scales that are short compared to the about 10 ns SBS build-up time (see G. P. Agrawal, Nonlinear Fiber Optics, 3rd ed. (Academic, New York, 2001)).

Subsequent amplification in gain stages 2 and 3 then increases the average signal power to >300 mW. In some embodiments, the output of modulator 573 is connected through a PM—PM splice 569 to optical isolator 574, and then through a PM—PM splice 569 to one input of multiplexer 577 through a PM—PM splice 569, where the other input to multiplexer 577 is connected to a second pump laser diode 576 through a PM—PM splice 569. The output of multiplexer 577 is connected to gain fiber 578 through a PM-Specialty Fiber splice 579, and the output of gain fiber 578 is connected through a PM-Specialty Fiber splice 579 to one input of multiplexer 581, where the other input to multiplexer 581 is connected to the output of a third pump laser diode 580 through a PM—PM splice 569. The output of multiplexer 581 is connected to gain fiber 582 through a PM-Specialty Fiber splice 579, and the output of gain fiber 582 is connected through a PM-Specialty Fiber splice 579 to output coupling 589, which couples the light to power amplifier 500. The 1% tap coupler 572, inserted between gain stage 1 and the Mach-Zehnder modulator 574, taps a portion of the signal to be used to monitor and/or control the ECDL fiber coupling and the frequency stability of the ECDL output. Table 2 provides a detailed list of the components used for some embodiments of the front-end seed laser.

| Component | Vendor | Part No. | Description |
|---|---|---|---|
| External Cavity Diode Laser (ECDL) 559 | Sacher Lasertechnik | SYS-500-1060-30 | 1055 nm center wavelength ±20 nm tuning range 30 mW power, CW, linear polarization |
| ECDL fiber coupling module | Sacher Lasertechnik | FC-SMF-BCO | Single-mode fiber coupling with anamorphic beam correction Integrated into ECDL housing |
| ECDL optical isolator 568 | Sacher Lasertechnik | ISO-35-1060 | 35 dB optical isolator Integrated into ECDL housing |
| 980-nm 1$^{st}$ pump diode 575 | JDS Uniphase | 26-7602-180 | 180 mW fiber-coupled diode laser @ 976 nm |
| 980-nm 2$^{nd}$ pump diode 576 | JDS Uniphase | 29-7602-400 | 400 mW, fiber-coupled diode laser @ 976 nm |
| 980-nm 3$^{rd}$ pump diode 580 | JDS Uniphase | 29-7602-500 | 500 mW, fiber-coupled diode laser @ 976 nm |
| MUX 570, 577, 581 | Novawave | PMFWDM-9806-N-B-Q | Polarization maintaining wavelength division multiplexer, 980 pass/1060 reflect |
| 1% Tap 572 | Novawave | PMFC-06-1-01-N-B-P-Q-F | Polarization maintaining 1% tap coupler |
| Modulator 573 | The Cutting Edge | AM.10.03.H.PP.B.A | Polarization maintaining, Electro-optic amplitude modulator |
| Isolator 574 | Novawave | PMI-1-06-P-N-B-Q | 1064 nm polarization maintaining optical isolator |
| 1$^{st}$ Gain Stage 571 | INO | YB 500 | Polarization maintaining, single-mode, Yb-doped optical fiber, 5 meters long |
| 2$^{nd}$ Gain Stage 578 | INO | YB 500 | Polarization maintaining, single-mode, Yb-doped optical fiber, 10 meters long |
| 3$^{rd}$ Gain Stage 582 | INO | YB 500 | Polarization maintaining, single-mode, Yb-doped optical fiber, 2 meters long |

The wavelength tuning range for the front-end output is set by the tuning range for the ECDL, which, in some embodiments, provides single longitudinal mode output for wavelengths spanning about 1040 nm to about 1080 nm (corresponding to a significant fraction of the Yb gain bandwidth). This feature utilizes one of the primary strengths for SBC, namely the ability to combine a large number of channels spanning a broad range of wavelengths.

Broad range (>200 nm) spectral measurements of the front-end seed-laser output for some embodiments indicate that about 97.5% of the output power is contained in the narrowband signal, with the remaining about 2.5% emitted as broadband amplified spontaneous emission (ASE). To ensure a spectrally clean seed for the LMA power amplifiers, in some embodiments, the unwanted ASE component is removed with a custom interference filter 567 (in some embodiments, this provides 0.7 nm full-width at half-maximum spectral bandwidth, such as a device available from BARR Associates Inc, quotation no. 0507-1028CQ) placed immediately after the front-end output. The center wavelength for the filter can be angle tuned from less than 1055 nm to more than 1080 nm, leads to negligible signal loss over this range, and improves the front-end spectral purity to more than 99.9%. The resulting output spectrum is shown in FIG. 6A.

Figure 6A:
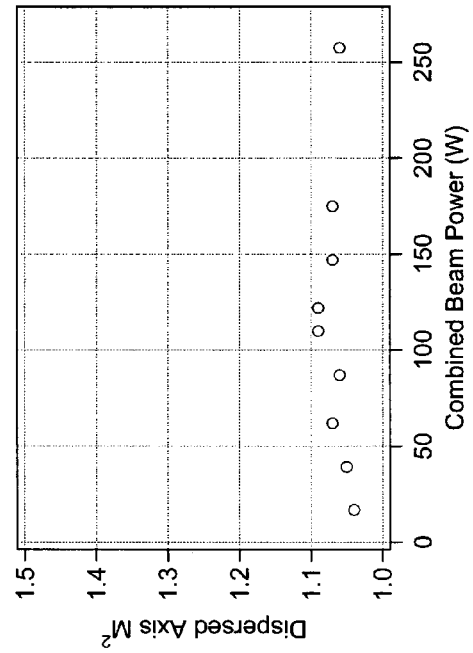
FIG. 6A is a graph of an output spectrum of a seed laser beam filtered using an angle-tuned filter.

FIG. 6A is a graph of an output spectrum of a seed laser beam filtered using an angle-tuned filter.

Figure 6B:
FIG. 6B is a graph that shows high-resolution spectral measurements of the front-end output obtained with a scanning Fabry-Perot etalon.

FIG. 6B is a graph that shows high-resolution spectral measurements of the front-end output obtained with a scanning Fabry-Perot etalon with a 8 GHz free-spectral range and a finesse of about 250 (corresponding to a spectral resolution of about 30 MHz). As shown in FIG. 6B, in some embodiments, the signal linewidth is about 100 MHz.

Figure 6C:
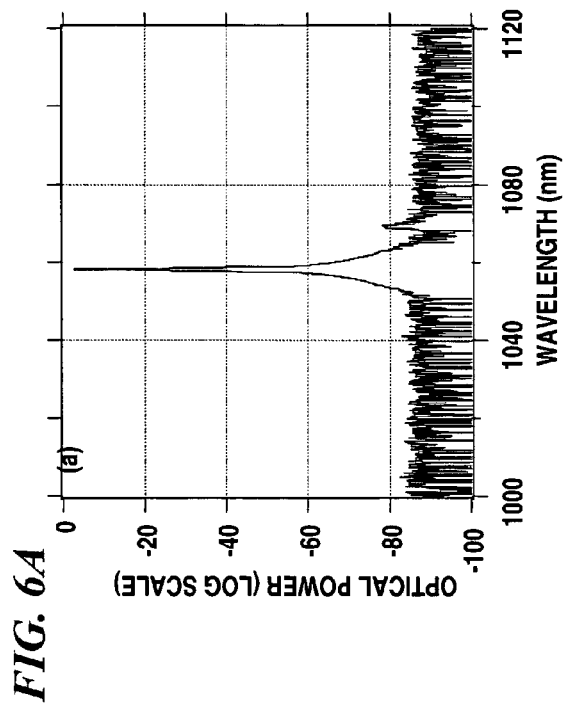
FIG. 6C is a graph of measured values for one embodiment of the LMA power amplifier's 1-micron-signal output versus power exiting the pump-delivery fiber.

FIG. 6C is a graph of measured values for one embodiment of the LMA power amplifier's 1-micron-signal output versus power exiting the pump-delivery fiber. In all cases, the pump wavelength is temperature-tuned to about 976 nm. Key points from the data include:

(1) the amplifier's slope efficiency with respect to the launched pump power is about 73% (i.e., 52% with respect to power from pump fiber), and (2) the maximum output power of 208 W is limited by the available pump power. Measurements of the amplified signal PER and polarization stability with respect to time for amplified signals in excess of 100 W indicate the PER is greater than 20 dB and the polarization is stable at the level of ±2% over time scales of several minutes. Moreover, again for amplified signals in excess of 100 W, the measured amplified signal spectral purity is greater than 99%, and the full-width-half-maximum spectral bandwidth is less than 1 GHz.

The beam quality for the 1-micron signal (i.e., a signal having wavelengths of about 1000 nanometers, for example, a signal having wavelengths in the range of about 1000 nm to about 1100 nm, in some embodiments) at the LMA amplifier's output, at signal powers relevant to high power SBC, has also been characterized for some embodiments. For these measurements, the 1-micron signal is first collimated with a multi-element objective and then passed through a fused silica wedge. The first-surface reflection from the wedge is then focused to a waist with an f=10-cm singlet lens and $M^2$ for the amplified signal is determined via the knife-edge technique.

FIG. 6D is a graph of representative $M^2$ measurements along the horizontal-direction transverse beam axis of the 1-micron signal, collected at an amplified average power of 100 W.

FIG. 6E is a graph of representative $M^2$ measurements along the vertical-direction transverse beam axis of the same 1-micron signal. Open circles in FIGS. 6D and 6E give measured $1/e^2$ beam radii, while solid lines in FIGS. 6D and 6E are the algebraic fits to the standard expression:

$$\omega(z) = \omega_0 \sqrt{1 + \left(\frac{M^2 \lambda (z - z_0)}{\pi \omega_0^2}\right)^2} \quad \text{EQ. (13)}$$

where $\omega(z)$ is the $1/e^2$ beam radius (the "beam waist") at position z, $\omega_0$ is the $1/e^2$ beam radius at position $z_0$, and $\lambda$ is the laser wavelength. Fitting this expression to the data in FIGS. 6D and 6E gives $M^2$=1.06 for both the horizontal and vertical beam axes, clearly indicating nearly diffraction-limited beam propagation.

As a first step toward demonstrating the ability to obtain greater than 100 kW of high-quality 1-micron light via spectral-beam combining of outputs of multiple Yb fiber lasers, some embodiments have used MOPAs with the characteristics outlined above to demonstrate:

(1) two-channel fiber laser SBC with a power-combining efficiency of 93%, a combined beam power of 258 W, and a dispersed beam axis $M^2$ of 1.06, and (2) three-channel fiber laser SBC with a power-combining efficiency of 93%, a combined beam power of 90 W, and a dispersed axis $M^2$ of 1.01.

Figure 6Q:
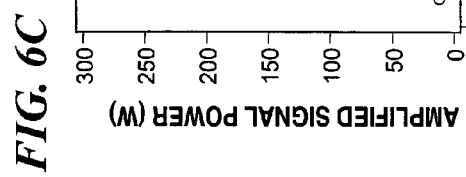
FIG. 6Q is a graph of the dispersed-axis M$^2$ for the two-channel SBC-combined beam versus combined beam power.
Figure 6I:
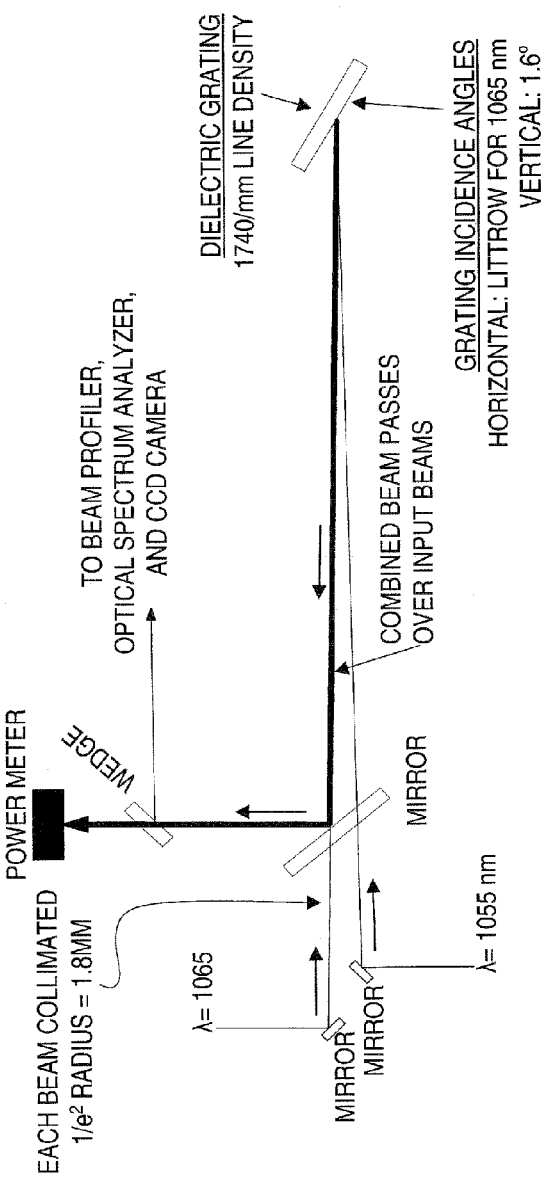
FIG. 6I is a schematic diagram of the layout used for a two-channel demonstration.
Figure 6J:
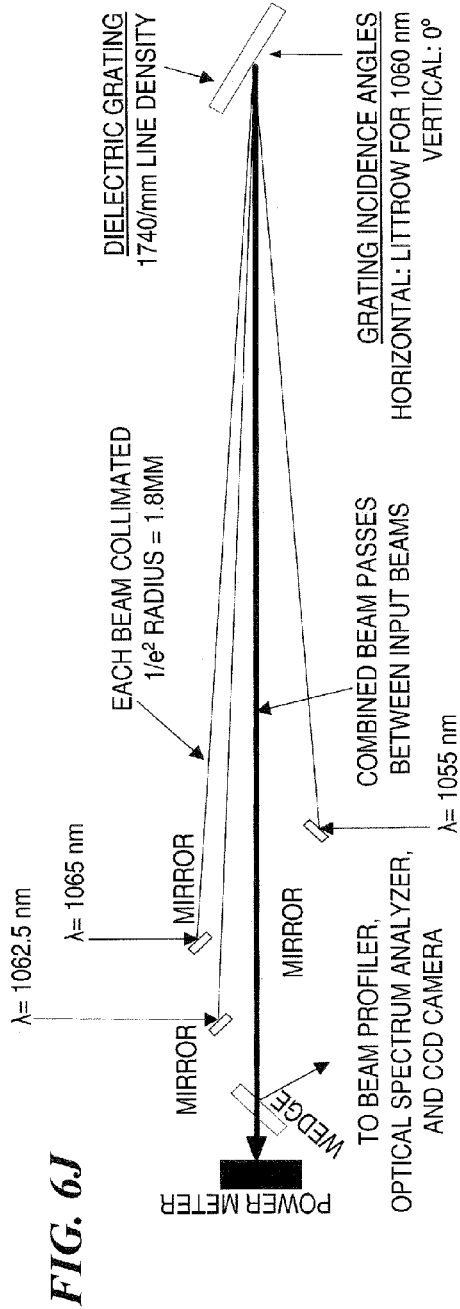
FIG. 6J is a schematic diagram of the layout used for a three-channel demonstration.

FIG. 6I is a schematic diagram of the optical layout utilized for the two-channel demonstration. The optical layout utilized for the three-channel demonstration is depicted in FIG. 6J. In both cases, SBC is performed with a method more akin to wavelength-division multiplexing (such as shown in FIG. 3A and described above) than standard spectral beam combining (see S. J. Augst, A. K. Goyal, R. L. Aggarwal, T. Y. Fan and A. Sanchez, "Wavelength beam combining of ytterbium fiber lasers," Opt. Lett., vol. 28, 331–333 (2003), and T. Y. Fan, "Laser Beam Combining for High-Power, High Radiance Sources," IEEE Journal of Selected Topics in Quantum Electronics, vol. 11, 567–577 (2005)) but where the MOPA wavelengths used as inputs for FIG. 6I and FIG. 6J are individually controlled (as shown in FIG. 5B, FIG. 7A or FIG. 7C) rather than set with a common external cavity (as shown in FIG. 3A, FIG. 3D) or a commonly applied fiber grating formation (as shown in FIG. 3F). As shown in FIG. 6I and FIG. 6J, in some embodiments, the individual MOPA outputs are separately collimated with f=30 mm multi-element objectives (Special Optics Part No. 54-17-30-980-1080) and then directed via free-space mirrors (CVI Laser Optics Part No. Y1-1037-45-P-UV) to a multi-layer dielectric diffraction grating (in some embodiments, made by methods described in, e.g., M. D. Perry et al., "High-efficiency multilayer dielectric diffraction gratings," Opt. Lett., vol. 20, 940–942 (1995) (and U.S. Pat. No. 5,907,436 entitled "Multilayer dielectric diffraction gratings" issued May 25, 1999 to Perry et al.); and Karl Hehl et al., "High-efficiency dielectric reflection gratings: design, fabrication, and analysis," Appl. Opt., vol. 38, 6257–6271 (1999)) with a groove density of 1740/mm. Images acquired with a charge-coupled device (CCD) camera are then used to overlap the beams both on the grating and in the far field.

For the two-channel demonstration, the grating was aligned for Littrow reflection at 1065 nm in the horizontal plane (the grating-dispersion plane) and tipped by 1.7 degrees in the vertical direction. For the three-channel demonstration, the grating was aligned for Littrow reflection at 1060 nm in the horizontal plane and tipped by 0 degrees (i.e., not tipped) in the vertical direction. To ensure optimum first-order diffraction efficiency, zero-order half-wave plates (CVI Laser Optics part no. QPM-1064-10-2) are used, in some embodiments, to orient the separate beam polarizations on the grating. The measured first-order efficiency at all three wavelengths is about 94%. The SBC power-combining efficiency, defined as the combined beam power divided by the sum of the individual MOPA output powers, is about 93%. The combined beam then passes between the input beams and onto an optical power meter. Roughly 1% of the two-channel (or 5% of the three-channel) combined beam power incident on the power meter is directed, with a fused silica wedge, to an optical spectrum analyzer (OSA), a beam propagation analyzer, and the CCD camera. The OSA is used to determine the spectral content of the combined beam over a broad spectral range while the beam propagation analyzer is used to determine the combined beam quality along both the dispersed and non-dispersed beam axes.

Obtaining high-quality SBC-combined beams requires the dispersive beam-combining element to remain nearly distortion free when irradiated by the full output power from the fiber MOPAs. To test the power-handling capabilities of the diffraction grating, some embodiments have performed interferometric measurements of the grating surface distortion induced by high irradiance optical loads.

FIG. 6F is a schematic diagram of the basic test setup to test the power-handling capabilities of a diffraction grating. The grating is inserted into the sample arm of a Michelson interferometer probed by a 633 nm beam and aligned for Littrow reflection at 633 nm; hence the quality of the diffracted order is probed directly. The optical load, or heating beam, is provided by a 1080 nm Yb fiber MOPA. The heating beam's polarization is aligned for maximum first-order diffraction efficiency.

FIG. 6G shows an interferogram recorded when the heating beam is off.

FIG. 6H shows an interferogram recorded when the heating beam peak irradiance on the grating surface is 1.5 kW/cm$^2$. The latter case employed 70 W of 1080-nm power. The image in FIG. 6H indicates that 1.5 kW/cm$^2$ optical loads generate about 0.2-wave distortion at 633 nm; roughly equivalent to 0.1-wave distortion at 1-micron wavelengths. This level of distortion is expected to have a negligible impact on the SBC-combined beam quality.

Figure 6K:
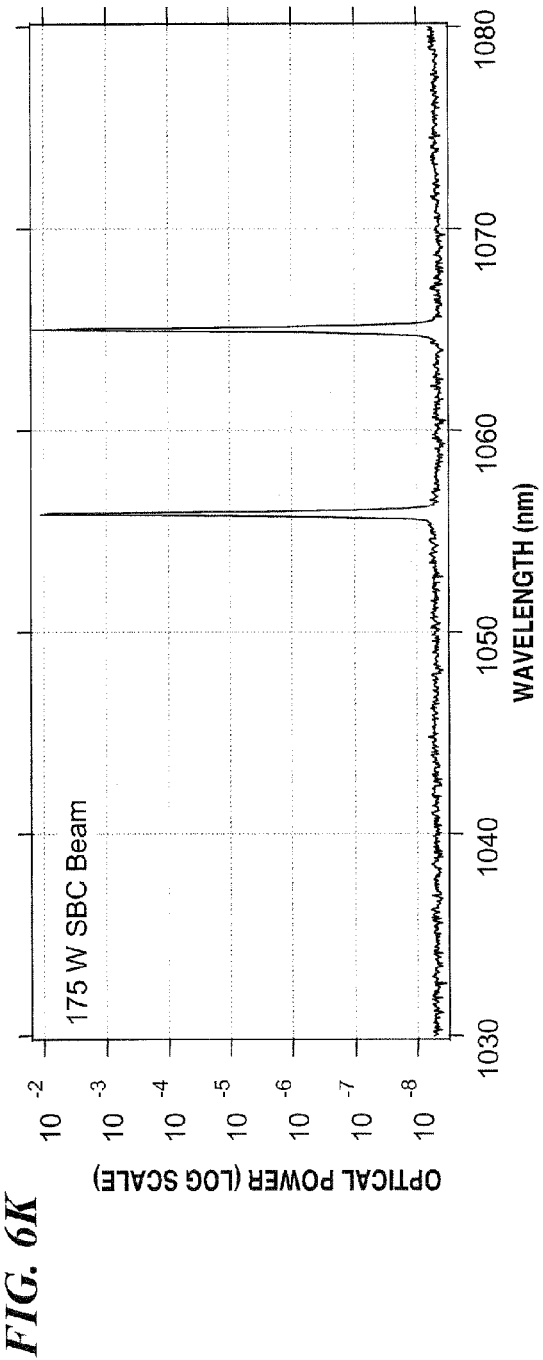
FIG. 6K is a graph of a spectrum for the 175-W two-channel SBC-combined beam

FIG. 6K is a graph of an optical spectrum for the 175-W two-channel SBC-combined beam with 93 W at 1065-nm wavelength and 82 W at 1055-nm wavelength. The signal-to-noise ratio for the combined beam is greater than 50 dB, clearly indicating that optical power outside the signal wavelengths (due, for example, to amplified spontaneous emission) makes a negligible contribution to the combined beam power.

Figure 6L:
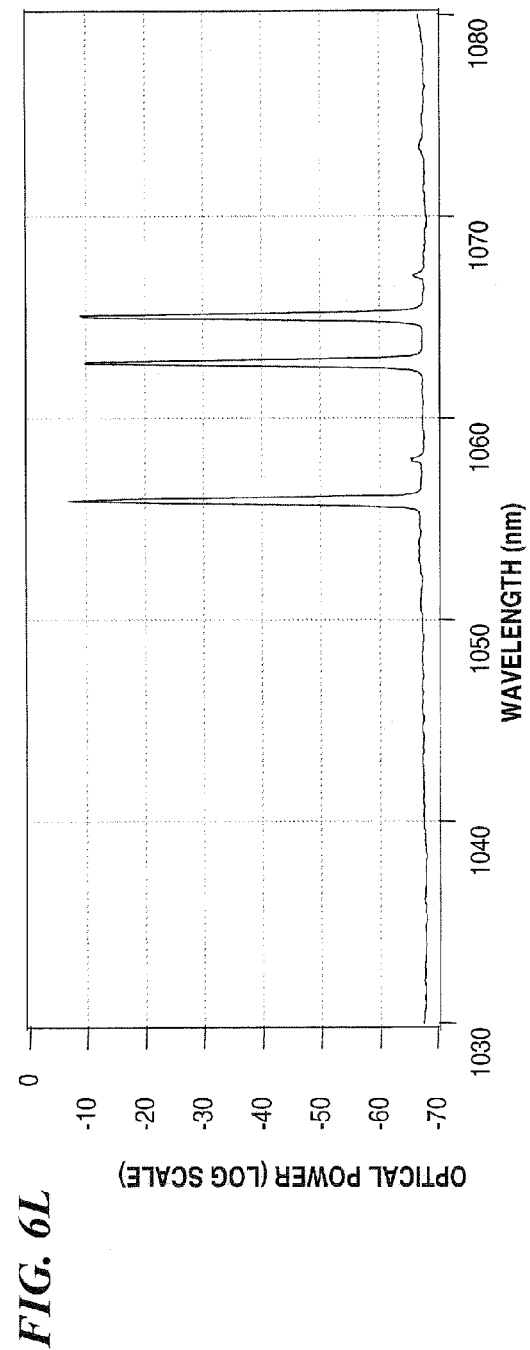
FIG. 6L is a graph of a spectrum for the 90-W three-channel SBC-combined beam.

FIG. 6L is a graph of an optical spectrum for the 90-W three-channel SBC-combined beam (with about 30 W each at 1055 nm, 1062.5 nm, and 1065 nm). The combined beam signal-to-noise is greater than 50 dB, again clearly indicating that optical power outside the signal wavelengths makes a negligible contribution to the combined beam power. (The high signal-to-noise ratio is observed for all power levels observed to date, including the maximum two-channel value of 258 W for some embodiments.) The measurements for FIG. 6K and FIG. 6L were performed with a single-mode fiber-coupled OSA (having 0.2 nm resolution bandwidth).

Figure 6M:
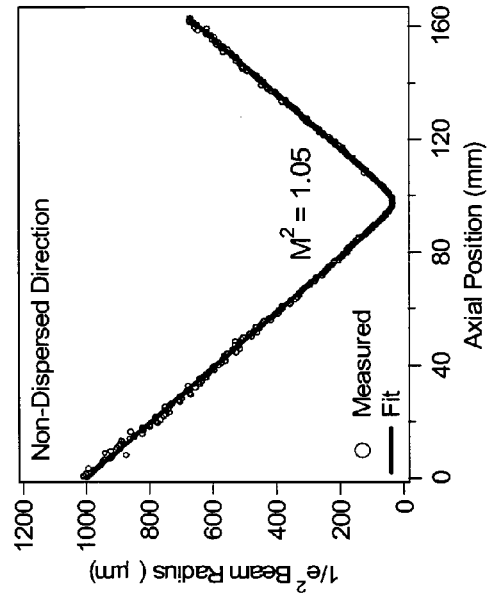
FIG. 6M is a graph of M$^2$ measurements along the dispersed direction of the 175-W two-channel SBC-combined beam.
Figure 6N:
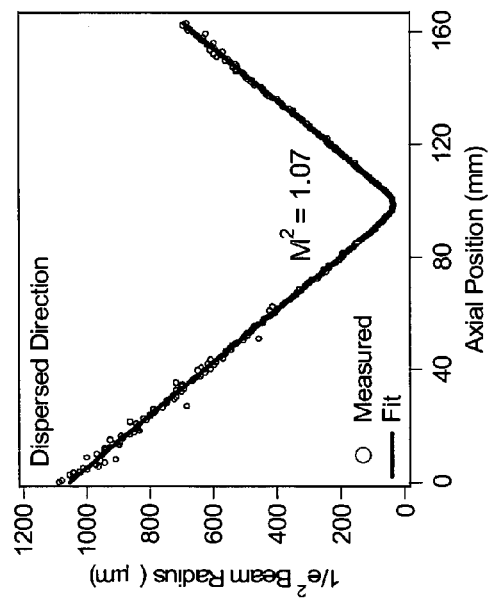
FIG. 6N is a graph of M$^2$ measurements along the non-dispersed direction of the 175-W two-channel SBC-combined beam.

FIG. 6M is a graph of M$^2$ measurements along the dispersed direction transverse beam axis for a 175-W two-channel SBC-combined beam (93 W at 1065 nm, 82 W at 1055 nm). FIG. 6N is a graph of M$^2$ measurements along the non-dispersed direction transverse beam axis for the same combined beam. Measurements were performed with a Coherent Modemaster beam profiler. For the two channel demonstration, the peak intensity on the diffraction grating is about 450 W/cm$^2$.

Figure 6O:
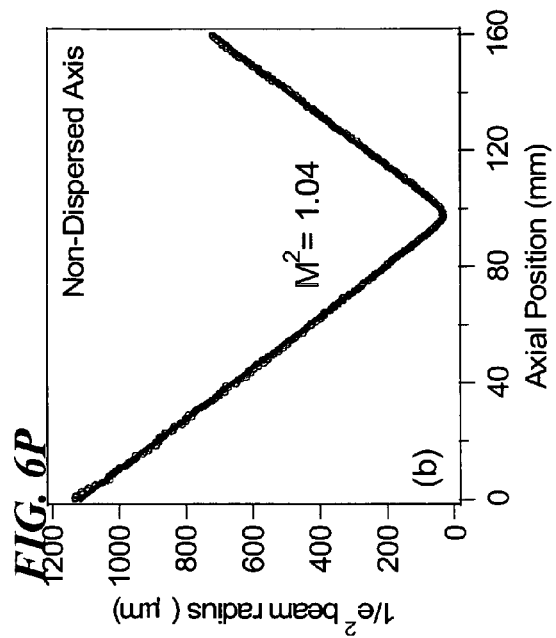
FIG. 6O is a graph of M$^2$ measurements along the dispersed direction for the 90-W three-channel SBC-combined beam.
Figure 6P:
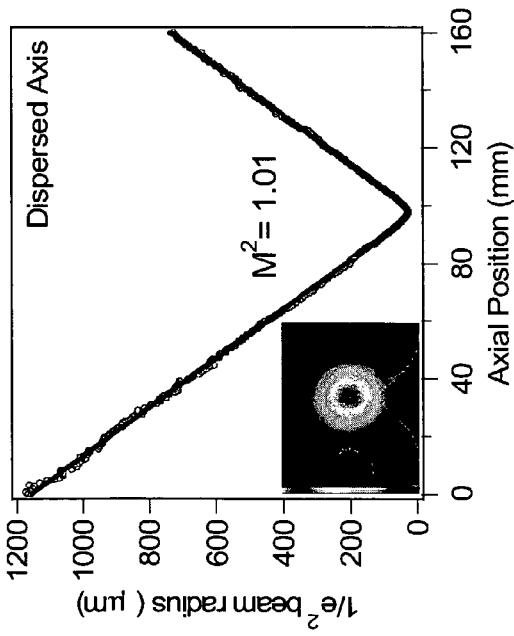
FIG. 6P is a graph of M$^2$ measurements along the non-dispersed direction transverse beam axis for the 90-W three-channel SBC-combined beam.

FIG. 6O is a graph of M$^2$ measurements along the dispersed direction transverse beam axis for the 90-W three-channel SBC-combined beam (roughly 30 W each at 1055 nm, 1062.5 nm, and 1065 nm). FIG. 6P is a graph of M$^2$ measurements along the non-dispersed direction transverse beam axis for the same combined beam. Measurements here were also performed with a Coherent Modemaster beam profiler. For the three-channel demonstration, the peak intensity on the diffraction grating is about 230 W/cm$^2$. For FIG. 6M, FIG. 6N, FIG. 6O and FIG. 6P, the open circles give measured 1/e$^2$ beam radii while the solid lines are fits to EQ. 13.

In both cases (the 175-W two-channel SBC-combined beam and the 90-W three-channel SBC-combined beam), the beam quality along the dispersed and non-dispersed beam axes is essentially identical to the beam quality for the direct output from a single-fiber MOPA. This result clearly indicates that the combined beam quality is not significantly influenced by either the spectral bandwidth for the individual MOPAs or surface distortion of the grating.

FIG. 6Q is a graph of the dispersed-axis M$^2$ for the two-channel SBC-combined beam versus combined beam power. In all cases, the combined beam contains roughly equal amounts of power at 1055 nm and 1065 nm. As shown by FIG. 6Q, this trend continues all the way to combined beam powers of 258 W, where each MOPA contributes about 130 W to the combined beam and the peak intensity on the grating is about 650 W/cm$^2$. Moreover, the FIG. 6Q data are essentially flat with respect to the combined beam power, a result that strongly suggests combined beam powers in excess of 260 W can be obtained with similarly excellent beam quality.

FIG. 7A is a schematic plan view of a spectral-beam-combiner laser system 700 with wavelength-dispersion compensation. In some embodiments, system 700 includes a plurality of MOPA fiber lasers, each having a master oscillator seed laser 550 tuned to a different wavelength followed by its own fiber power amplifier 500. The laser-beam outputs of the plurality of MOPA lasers are combined into a single beam using a spectral beam combiner 130, as described above. In some embodiments, each laser is pulsed on a schedule controlled by pulse-timing circuit 781, while in other embodiments, continuous-wave (CW) lasing is used. In some embodiments, the pump lasers are supplied by one or more pump-laser-diode power supplies 794 and 782. In some embodiments, the fibers of the power amplifiers are wound around a water-cooled mandrel cooled by fiber-cooling water supply 783. In other embodiments, other suitable cooling mechanisms are used, such as air cooling, or refrigerant cooling.

Note that, in general, if the two gratings of the SBC are kept parallel, then each component of the output beam 90' will be parallel to its respective input beam from one of the power amplifiers 500, and thus as a laser's wavelength drifts (i.e., changes over time due to, e.g., temperature changes of the linewidth-narrowing filter) the portion of output beam 90' due to that laser, while remaining parallel to the main output beam 90', will move off center of main output beam 90'. In some embodiments, a real-time diagnostic-and-adjustment unit 709 is used to dynamically adjust the wavelengths of the individual lasers in order that every laser's beam is centered in the single output beam 90'.

In some embodiments, beam centering is accomplished by detecting whether the particular beam is parallel but not aligned (i.e., the beam does not hit the single spot on the second diffraction grating to which the other beams are directed) into the single output beam 90', for example, using a detector 711 (e.g., that receives light only if a beam is too high) and a detector 712 (e.g., that receives light only if a beam is too low), both of which are connected to off-axis circuit 732. In some embodiments, off-axis circuit 732 includes an output 736 that is connected to and analyzed by real-time wavelength-drift diagnostic circuit 786, whose output 735 controls individual wavelength adjustment circuits 787 (e.g., in some embodiments, these control, for example, the resonant wavelength of the initial seed laser or its output filter) for each laser output. In some embodiments, circuit 786 has one or more inputs 784 that are connected to receive pulse timing information (e.g., from pulse timing circuit 785), in order to determine which laser needs its wavelength adjusted. In some embodiments, circuit 786 has outputs (not shown) that are connected to transmit pulse timing information (e.g., to pulse timing circuit 785), in order to control pulse timing and/or laser power, in order to determine which laser needs its wavelength adjusted.

Thus, if the wavelength of one of the seed lasers drifts, its output, while remaining parallel, will also drift off center, and real-time diagnostic-and-adjustment unit 709 detects which of the lasers is off-center and automatically adjusts its wavelength until its portion of the output beam is again centered. In some embodiments, off-axis circuit 732 optionally includes an output 734 that controls individual positioners (e.g., in some embodiments, five-degrees-of-freedom positioners that control, for example, X, Y, Z, pitch angle, and yaw angle) for each laser's output (the input to SBC 130). In some embodiments, a combination of wavelength control and positioning control is used to keep all beams parallel and aligned into the single output beam 90' by iteratively adjusting angle (using five-degrees-of-freedom positioners) and position (using laser wavelength and/or the five-degrees-of-freedom positioners) on each beam.

Note that, if the two gratings of the SBC are kept parallel, then each component of the output beam 90' will be parallel to its respective input beam from one of the power amplifiers 500, so if one of the input beams is not parallel (i.e., that beam strikes the first diffraction grating at an angle different than the angle of the other input beams), its portion of the output beam will also not be parallel and will diverge at an angle from the main output beam 90' corresponding to the angle error of the input beam and a correction will be needed. In some embodiments, this is accomplished by detecting whether the particular beam is initially aligned into the single spot on the second grating, but is angled too high, for example, using detector 713 (e.g., that receives light only if a beam is angled too high) and detector 714 (e.g., that receives light only if a beam is angled too low), both of which are connected to off-angle (angle positioning) detector and diagnostic circuit 731, which detects which input laser beam is off-angle, and whose output 733 controls the individual positioners (e.g., in some embodiments, five-degrees-of-freedom positioners that control, for example, X, Y, Z, pitch angle, and yaw angle) for each laser's output (the input to SBC 130). In some embodiments, off-angle (angle positioning) detector and diagnostic circuit 731 also includes an output signal 737 that is used in combination with the other inputs by diagnostic circuit 786 to control the wavelengths of the seed lasers. In some embodiments, circuit 731 has inputs (not shown) that are connected to receive pulse timing information (e.g., from pulse timing circuit 785), in order to determine which laser needs its angle adjusted. In some embodiments, circuit 731 has outputs (not shown) that are connected to transmit pulse timing information (e.g., to pulse timing circuit 785), in order to control pulse timing and/or laser power, in order to determine which laser needs its angle adjusted.

In some embodiments, the other beams (those not being adjusted) can be fully on (either CW or at their normal pulse schedule) while the adjustments are made to the particular beam of interest. In some embodiments, the particular beam of interest is turned on or off, or its power is increased or decreased, and the detection circuits 731 and/or 732 detect whether a corresponding change in the off-axis or off-angle signal is observed. This is a major advantage of the present invention for those circumstances where it is desired to adjust the laser system's parameters (i.e., the wavelength of one or more beams) while keeping all of the other beams operating and thus maintaining nearly full output power of the combined beam 90'. The flowchart of one such process according to the present invention is shown in FIG. 7B.

FIG. 7B is a flowchart of a real-time diagnostic and adjustment process 770 according to some embodiments of the invention. In some embodiments, the process starts at block 771, and at block 772, the process detects that one or more beams is off-axis and/or off-angle. At block 773, one of the plurality of lasers is selected, and that laser is turned on or off, and/or its power is increased or decreased, and at decision-block 774 the process either: if no change was detected in the off-axis and/or off-angle signal, then branches back to block 773 to select the next laser and that laser is turned on or off, and/or its power is increased or decreased; or if a corresponding change was detected in the off-axis and/or off-angle signal, then branches to block 775, where the wavelength and/or position of the selected laser is adjusted and control passes to block 776 and this laser is again turned on or off, and/or its power is increased or decreased and control passes again to decision block 774 to iterate until the selected laser is adjusted and aligned. This entire process is repeated for every laser beam. If process 770 detects that two or more beams are off-axis and/or off-angle (e.g., if the on-off action is performed for each single laser and the off-axis and/or off-angle signal does not detect a change (e.g., the off-axis and/or off-angle signal stays on of two lasers are off-axis and/or off-angle, since when one laser is cycled on and off, the other laser remains on and saturates the detectors 711–714), then the process turns off one or more of the other lasers while testing the particular selected laser until a single off-axis and/or off-angle beam can be adjusted by itself, whereupon one of the other lasers can be turned back on and the adjustment process continued. In some embodiments, the process of FIG. 7B is performed for any of the embodiments described herein, including (but not limited to) those of FIG. 7A and FIG. 7C.

FIG. 7C is a schematic plan view of a spectral-beam-combiner laser system 701 with wavelength-dispersion compensation. System 701 is substantially similar to system 700 of FIG. 7A, except that a separate off-wavelength detector/adjuster 708 is used on laser beams of a plurality of the master oscillators 550 before the power amplifiers, in order that the wavelengths of the master oscillators 550 (the seed lasers) can be continuously monitored and adjusted without or before turning on the power amplifiers, in order that when the power amplifiers are turned on, all of the wavelengths will be stable and aligned to the desired wavelengths. In some embodiments, each laser is activated during only one pulse of a stream of pulses (e.g., if one hundred lasers each having a different wavelength are provided, and each laser is active for a $\frac{1}{100}$ duty cycle that is staggered with the other lasers, then a substantially continuous output laser beam can be provided). For example, if a first laser (A) is activated during the third pulse 722 of a pulse stream 721 and its pulse corresponds to a pulse detected by lower detector 712, then its wavelength will be adjusted (e.g., by shortening the wavelength) until its beam is again aligned with the main beam and not detected by lower detector 712. Similarly, for example, if a second laser (B) is activated during the ninth pulse 723 of pulse stream 721 and its pulse corresponds to a pulse detected by upper detector 711, then its wavelength will be adjusted (e.g., by lengthening the wavelength) until its beam is again aligned with the main beam and not detected by upper detector 711. In some embodiments, circuit 701 also includes off-angle and/or off-axis detectors and diagnostic circuits associated with its output beam 90' as shown in FIG. 7A.

The following description is more completely described in U.S. Provisional Patent Application 60/703,824 filed on Jul. 29, 2005, titled "PERIODIC FIBER TO SUPPRESS NONLINEAR EFFECTS IN RARE-EARTH-DOPED FIBER AMPLIFIERS AND LASERS" which is hereby incorporated by reference in its entirety, wherein power-amplifier fibers having low-NA large mode area (LMA) straight sections are connected using high-NA corner sections of fiber, in order to obtain a more compact high-power fiber amplifier.

Another element of the invention involves the use of dielectric-coated gratings as one or more of the dispersive beam-combining elements in the system. Common gratings are typically coated with a metallic reflective surface, for example, gold or aluminum. Such materials absorb a few percent of the light impinging upon them. This causes heating of the grating surface, which can lead to optical distortions, and at sufficiently high power levels, to optical damage of the grating. Recently, progress has been made in grating technology, which allows gratings with coatings related to those used in dielectric mirrors to be produced. These gratings allow the beam-combined fiber laser system to operate at very high power levels.

Further, some embodiments provide diagnostic circuits and/or processes to properly set the operating wavelengths of the various fiber oscillator/amplifiers in the system so their beams will be overlapped in the far field, producing a single high-quality, focusable beam. By utilizing a time-gated beam position diagnostic synchronized to the pulsing of one or more of the laser oscillators, and/or staggering the firing of the laser oscillators, the present invention easily differentiates among the laser oscillators and thus provides control signals to the correct oscillator as selected by the diagnostics.

In general, fiber nonlinear effects are directly proportional to the effective power intensity in the core and inversely proportional to effective fiber length. Either increasing fiber core diameter or reducing fiber length in a fiber amplifier/laser will mitigate nonlinear effects. To maximize power handling of the fiber amplifier/laser, the large core section can have a core diameter tens of times larger than that of a conventional LMA (large mode area) fiber, but still provide very good beam quality if the NA (numerical aperture) is kept low enough. Furthermore, increasing core diameter not only reduces signal power intensity (thus reducing non-linear effects), but also increases the fiber's pump absorption if the pump cladding outer diameter is unchanged along the length (since the pump light confined and bouncing around in the inner cladding is more likely to intercept the larger core). As a result, in some embodiments, an increase in the core diameter by a factor of two increases the threshold of nonlinear effects by a factor of sixteen. This is because the area of the fiber core increases by a factor of four, and the fiber length can be decreased by a factor of four due to increased pump absorption by the large core.

In some embodiments, the optical-fiber power amplifiers include a plurality of large core area (and thus LMA), low NA straight sections serially connected to one another by short, small-core, high NA curved sections to form a "periodic" fiber. In some embodiments, the small-diameter core sections are much shorter than the large-diameter core sections, so nonlinear effects do not have enough gain to reach threshold in the small core sections. Furthermore, the unique structure of the fiber will also reduce fiber nonlinear effects through multiple mechanisms. For example, the change of core NA broadens the SBS gain spectrum due to nonhomogeneous broadening of SBS so that the SBS threshold is increased. In some embodiments, the change of core diameter may also affect fiber chromatic dispersion so that it increases thresholds of some nonlinear effects, which require phase-matching, such as four-wave mixing.

The unique structure will also simplify system configuration for using mode-matching techniques to achieve good beam quality for slightly multimode fiber amplifiers. For a rare-earth (RE)-doped multimode fiber, the signal launch condition plays an important role in mode selection, as described in U.S. Pat. No. 5,818,630 (incorporated herein by reference). Even though the RE-doped core supports several different modes, the high beam quality of a single-mode source can be preserved in the multimode amplifier if the mode-field-diameter (MFD) of the source is matched with that of the fundamental mode of the multimode fiber. As a result, a RE-doped multimode fiber amplifier can achieve diffraction-limited beam quality. An elegant method for achieving such mode matching in the fiber structure of the present invention involves designing the small core section to have the same core diameter and NA as that of the signal fiber from the seed source. Then, by cleaving or otherwise cutting the fiber in the small-core section (and preparing the fiber end by techniques well-known to those skilled in the art) and injecting the mode to be amplified, the required mode-matching is achieved by the hybrid fiber itself. There is no need to use additional components to match MFDs between the signal fiber and the amplifier fiber.

In some embodiments, the periodic fiber can be bent at the small-core sections, enabling it to be packaged in a compact enclosure. Unlike a conventional LMA fiber, a very large core, extremely low-NA uniform fiber must be kept straight, or be coiled at a large radius, whereas the periodic fiber structure described here has much more flexibility in terms of packaging. The small-core sections can be designed to be very short with a small core diameter and large NA, so that they can be bent in a small diameter with negligible bending loss. The locations of the small-core sections can be periodic for packaging simplicity, or with a varied period to meet a certain packaging requirement.

Figure 8A:
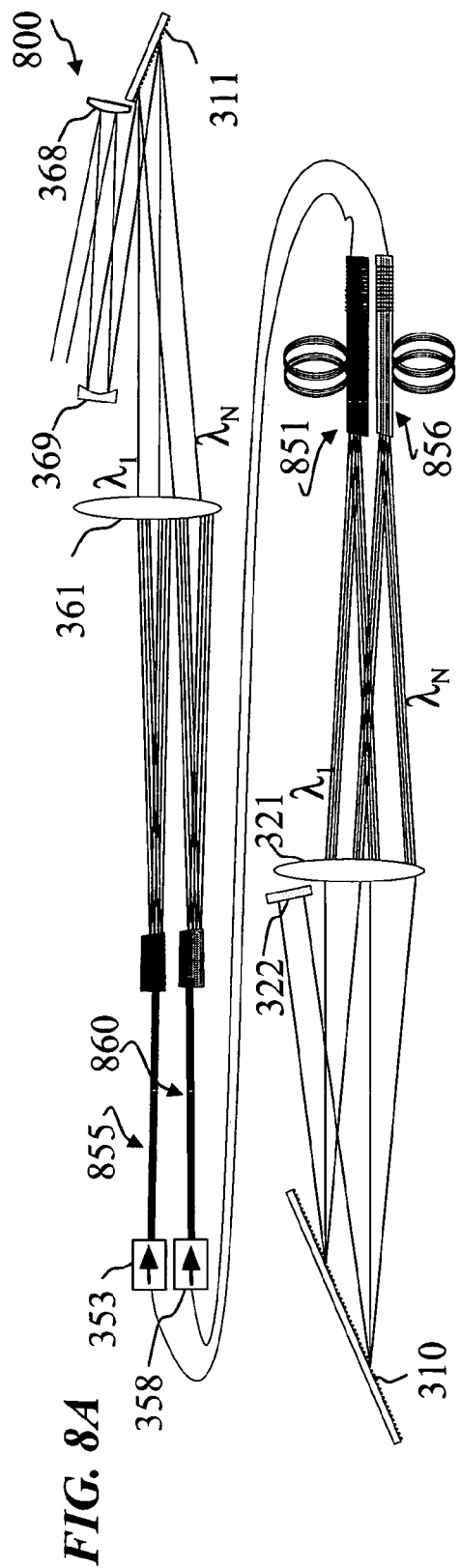
FIG. 8A is a schematic plan view of a ribbon-fiber MOPA spectral-beam-combiner laser system 800.

FIG. 8A is a schematic plan view of a ribbon-fiber MOPA spectral-beam-combiner laser system 800. System 800 is substantially identical to system 306 if FIG. 3F described above, but with the substitution of a one or more ribbon fibers used for amplifiers 855 and 860 and laser active media 851 and 856 in order to obtain very close center-to-center spacings of the core ends (for example, in some embodiments, ribbon fibers such as described in the paper by L. J. Cooper et al., High-power Yb-doped multicore ribbon fiber laser, Optics Letters Vol. 30, No. 21, Nov. 1, 2005, which is incorporated herein by reference), each having a plurality of doped cores within an inner core used to carry pump light and inject it into the cores (e.g., Yb doped silica cores arranged side-by-side along a straight cross-section line within a substantially pure silica inner cladding having a width substantially larger than its height, and a polymer outer cladding for keeping the pump light contained). In some embodiments, each power amplifier core in fiber ribbons 855 and 860 is a large-diameter (e.g., about 40 to 50 microns or larger) designed to have a low NA large mode area and operated in substantially only its lowest-order mode (LP01). In some embodiments, a photonic-crystal configuration is used to define the boundaries of the cores, in order to obtain a well-controlled very low NA for each core, for example, as described for FIG. 8B below. In other embodiments, individually formed inner-cladding fibers, each having one core, are held within a single outer polymer cladding in a similar configuration. In still other embodiments, each power amplifier fiber, rod, rod-like fiber, or ribbon fiber has a portion of its outer section shaved or ground away, in order to obtain very close center-to-center spacings of the core ends.

Figure 8B:
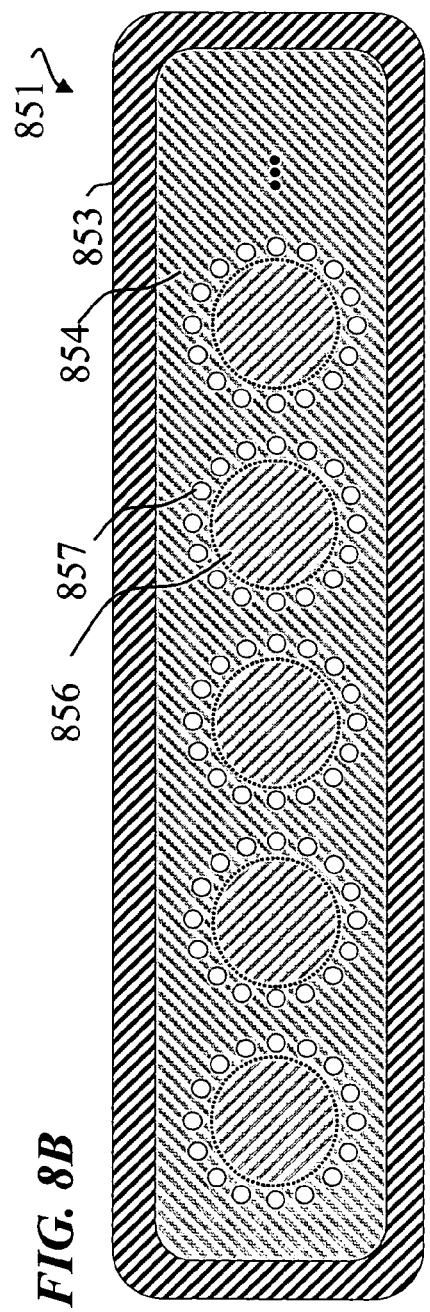
FIG. 8B is a schematic cross-section view of a photonic-crystal ribbon-fiber 851.

FIG. 8B is a schematic cross-section view of a photonic-crystal (PC) ribbon-fiber 851. In some embodiments, PC ribbon-fiber 851 has a plurality of active amplifying cores 856 (e.g., Yb-doped silica or aluminosilicate) within an inner cladding 854 (e.g., silica) surrounded by outer cladding 853 (e.g., polymer); each core 856 surrounded by a plurality of longitudinally-oriented holes (e.g., air-filled) or similarly shaped regions of lower index of refraction, in order to well define a very low NA core in order to support a single lowest-order mode (LP01). In some embodiments, the cores, for example, are each 40 to 50 microns diameter or larger with a center-to-center spacing, in some embodiments, of 100 microns or less within a ribbon approximately 250 microns high and 1 mm or more wide.

Some embodiments of the present invention provide a method that includes providing a first laser beam and a second laser beam, introducing a first chromatic dispersion into the first laser beam, introducing a second chromatic dispersion into the second laser beam, introducing a third chromatic dispersion into the first laser beam, wherein the third chromatic dispersion compensates for the first chromatic dispersion, introducing a fourth chromatic dispersion into the second laser beam, wherein the fourth chromatic dispersion compensates for the second chromatic dispersion, and combining the first and second laser beams into a single output beam. In some embodiments, the first compensation includes eliminating substantially all further chromatic dispersion from the first laser beam, and the second compensation includes eliminating substantially all further chromatic dispersion from the second laser beam. In some embodiments, the first and second chromatic dispersions are generated by a first diffraction grating and the compensating third and fourth chromatic dispersions are generated by a second diffraction grating, wherein, for each respective diffracted beam, the angle at which each beam leaves the first grating surface is equal to the angle at which that beam approaches the second grating surface.

Some embodiments further include providing a first diffractive element, wherein the introducing of the first chromatic dispersion includes diffracting the first laser beam with the first diffractive element, and the introducing of the second chromatic dispersion includes diffracting the second laser beam with the first diffractive element, and providing a second diffractive element, wherein the introducing of the third chromatic dispersion includes diffracting the first laser beam with the second diffractive element, and the introducing of the fourth chromatic dispersion includes diffracting the second laser beam with the second diffractive element, introducing the compensating chromatic dispersions to each respective one of the plurality of diffracted laser beams. In some embodiments, the first and second diffractive elements are separate diffractive-reflection gratings. In some embodiments, these are dielectric gratings wherein the diffractive surface is formed on a top surface of a stack of dielectric layers formed to provide a highly efficient diffractive reflection. In some embodiments, these diffractive gratings are oriented at or near a Littrow angle wherein the diffracted beam is at or near the input beam but in an opposite direction.

In some embodiments, the providing of the first diffractive element and the second diffractive element includes having the same diffractive pattern on both the first diffractive element and the second diffractive element. In some embodiments, the diffractive pattern is about 1740 lines/mm in a direction perpendicular to the input beams. In other embodiments, 1400 lines/mm or 1200 lines/mm, or other suitable line densities are used.

Some embodiments further include positioning of the second diffractive element so a diffractive surface of the second diffractive element is parallel to a corresponding diffractive surface of the first diffractive element. In some embodiments, the first and second diffractive elements are separate diffractive-reflection planar gratings oriented parallel to one another. In other embodiments, the first and second diffractive elements are separate areas on a single planar diffractive-reflection grating, and, after the plurality of input beams are first diffracted from the single diffractive-reflection grating, one or more reflective surfaces are used to redirect the beams to again diffract from the single diffractive-reflection grating into a single combined beam.

Some embodiments further include providing a plurality of Yb-doped singly clad or multiply clad optical fibers including a first fiber and a second fiber, pumping an inner cladding of each of the plurality of fibers with pump light from one or more laser diodes, generating with the first fiber the first laser beam at a first wavelength, and generating with the second fiber the second laser beam at a second wavelength. In some embodiments, a master-oscillator-power-amplifier (MOPA) configuration is used, wherein a plurality of master oscillators are used to each generate a very narrowband (e.g., in some embodiments, each about 10 GHz or less FWHM linewidth) laser seed signal at each of a plurality of different center wavelengths, and each of these narrowband signals is amplified by its respective power amplifier, which includes one or more serial amplification stages, in order to provide a plurality of high-power laser beams that are to be spectrally combined. In some embodiments, each power amplifier includes a plurality of fiber-amplification stages, each stage separately pumped, wherein each stage is separated by a narrowband wavelength filter to prevent amplified stimulated emission (ASE). In some embodiments, each laser seed signal is gated or otherwise controlled to a pulse length sufficiently short to substantially prevent stimulated Brillouin scattering (SBS) buildup. In some embodiments, the pulse length is controlled to be about 10 ns or less. In some embodiments, the pulse length is controlled to be about 9 ns or less. In some embodiments, the pulse length is controlled to be about 8 ns or less. In some embodiments, the pulse length is controlled to be about 7 ns or less. In some embodiments, the pulse length is controlled to be about 6 ns or less. In some embodiments, the pulse length is controlled to be about 5 ns or less. In some embodiments, the pulse length is controlled to be about 4 ns or less. In some embodiments, the pulse length is controlled to be about 3 ns or less. In some embodiments, the pulse length is controlled to be about 2 ns or less. In some embodiments, the pulse length is controlled to be about 1 ns or less. In some embodiments, the pulse length is controlled to be about 0.5 ns or less. In some embodiments, the pulse length is controlled to be about 0.2 ns or less. In some embodiments, the pulse length is controlled to be about 0.1 ns or less. In some embodiments, the pulse length is controlled to be about 0.05 ns or less.

In some embodiments, as the pulse length becomes sufficiently short, the spectral width of the pulse increases (e.g., due to Fourier expansion of the short pulse length). In some embodiments, a two-or more grating spectral beam combiner (for example, such as shown in FIG. 3D or FIG. 3G) is used to reduce or eliminate further spectral spreading after the beams are combined.

Some embodiments include filtering the first laser beam to a full-width half-maximum linewidth of less than about one nanometer, filtering the second laser beam to a full-width half-maximum linewidth of less than about one nanometer, pulsing the first laser beam to a pulse length of less than about ten nanoseconds and sufficiently short to substantially prevent SBS buildup, and pulsing the second laser beam to a pulse length of less than about ten nanoseconds and sufficiently short to substantially prevent SBS buildup. Some embodiments of the method further include tuning the first fiber to generate the first laser beam at the first wavelength, tuning the second fiber to generate the second laser beam at the second wavelength, detecting that one of the laser beams has become misaligned relative to the single combined beam, determining that the first laser beam is the misaligned one, and adjusting the tuning of the first fiber in order that the first laser beam is aligned relative to the single combined beam.

In some embodiments, the detecting of the misaligned beam and the determining that the first laser beam is the misaligned one are based on a timing of a pulse of one of the laser beams.

In some embodiments, the detecting of the misaligned beam and the determining that the first laser beam is the misaligned one are performed while the second beam is active.

In some embodiments, the determining that the first laser beam is the misaligned one is performed during a time when a plurality of the other laser beams are "on" (i.e., actively propagating laser beams), and includes: changing a power value of the first laser beam, detecting a corresponding change in a misaligned beam, and changing a tuning of the first laser based on the detecting of the corresponding change in the misaligned beam.

Some embodiments of the present invention provide a method that includes providing a first diffractive element and a second diffractive element, directing a plurality of light beams to a plurality of locations on the first diffractive element, and positioning the second diffractive element relative to the first diffractive element such that the plurality of light beams diffracted from the plurality of locations on the first diffractive element are directed to a single location on the second diffractive element and are diffracted by the second element into a single combined beam.

Some embodiments of this method further include, with the first diffractive element, introducing a chromatic dispersion to each of the plurality of diffracted light beams, and with the second diffractive element, introducing a compensating chromatic dispersion to each of the plurality of diffracted light beams.

In some embodiments, the providing of the first diffractive element and the second diffractive element includes having the same diffractive pattern on both the first diffractive element and the second diffractive element.

In some embodiments, the positioning of the second diffractive element includes positioning the second diffractive element so a diffractive surface of the second diffractive element is parallel to a corresponding diffractive surface of the first diffractive element.

Some embodiments further include generating a plurality of laser beams for use as the plurality of light beams.

Some embodiments further include providing a plurality of Yb-doped multiply clad optical fibers including a first fiber and a second fiber, pumping an inner cladding of the plurality of fibers with pump light from one or more laser diodes, generating with the first fiber a first laser beam at a first wavelength for one of the plurality of light beams, and generating with the second fiber a second laser beam at a second wavelength for another of the plurality of light beams.

Some embodiments further include tuning the first fiber to generate the first laser beam at the first wavelength, tuning the second fiber to generate the second laser beam at the second wavelength, detecting that one of the laser beams has become misaligned relative to the single combined beam, determining that the first laser beam is the misaligned one, and adjusting the tuning of the first fiber in order that the first laser beam is aligned relative to the single combined beam.

In some embodiments, the detecting of the misaligned beam and the determining that the first laser beam is the misaligned one are based on a timing of a pulse of one of the laser beams.

In some embodiments, the detecting of the misaligned beam and the determining that the first laser beam is the misaligned one are performed while the second beam is active.

In some embodiments, the determining that the first laser beam is the misaligned one is performed while a plurality of the other laser beams are ON, and includes: changing a power value of the first laser beam, detecting a corresponding change in a misaligned beam, and changing a tuning of the first laser based on the detecting of the corresponding change in the misaligned beam.

Some embodiments of the present invention provide an apparatus that includes a first diffractive element and a second diffractive element, and a source of a plurality of light beams directed to plurality of locations on the first diffractive element, wherein the second diffractive element is positioned relative to the first diffractive element such that the plurality of light beams diffracted from the plurality of locations on the first diffractive element are directed to a single location on the second diffractive element and are diffracted by the second element into a single combined beam. In some embodiments, the first and second diffractive elements are separate diffractive gratings. In some embodiments, these are dielectric gratings wherein the diffractive surface is formed on a top surface of a stack of dielectric layers formed to provide a highly efficient diffractive reflection. In some embodiments, these diffractive gratings are oriented at or near a Littrow angle wherein the diffracted beam is at or near the input beam but in an opposite direction. In other embodiments, the first and second diffractive elements are areas on a single diffraction grating, and optical elements are positioned such that beams leaving the grating after the first diffraction are directed to again approach the grating for the compensating diffraction that removes further chromatic dispersion.

In some embodiments, the first diffractive element introduces a chromatic dispersion to each of the plurality of diffracted light beams, and the second diffractive element introduces a compensating chromatic dispersion (one of substantially equal and opposite diffractive amount, in order to stop further chromatic dispersion, and which combines the beams into a single output beam) to each of the plurality of diffracted light beams such that the single combined output beam has substantially no chromatic dispersion.

In some embodiments, the first diffractive element and the second diffractive element have substantially identical diffractive patterns.

In some embodiments, the second diffractive element is positioned so a diffractive surface of the second diffractive element is parallel to a corresponding diffractive surface of the first diffractive element. In other embodiments, one or more optical elements (such as dielectric mirrors having very high reflectivity at the laser wavelengths) are used to reflect the beams on their path between the diffractive surfaces, and the second diffractive grating is placed where the reflected beams converge to a single area, and at an angle selected to remove further chromatic dispersion.

In some embodiments, the source of a plurality of light beams includes a plurality of fiber lasers each tuned to a different wavelength.

Some embodiments further include a plurality of Yb-doped multiply clad optical fibers including a first fiber and a second fiber each having an inner cladding and one or more outer claddings, and one or more laser diodes optically coupled to insert their laser outputs as pump light to the inner claddings of the plurality of fibers, wherein the first fiber generates a first laser beam at a first wavelength for one of the plurality of light beams, and the second fiber generates a second laser beam at a second wavelength for another of the plurality of light beams.

Some embodiments further include a tuner apparatus configured to the first fiber to set the first laser beam at the first wavelength, a tuner apparatus configured to the second fiber to set the second laser beam at the second wavelength, a detector configured to detect whether one of the laser beams has become misaligned relative to the single combined beam, a diagnoser configured to determine whether the first laser beam is the misaligned one and if so, to adjust the tuning of the first fiber in order that the first laser beam is aligned relative to the single combined beam.

In some embodiments, the detector and the diagnoser base the determination of whether the first laser beam is the misaligned one based on a timing of a pulse of one of the laser beams.

In some embodiments, the detector and the diagnoser are operable to determine that the first laser beam is the misaligned one and tune the wavelength of the first laser while the second beam is active in the single combined beam.

In some embodiments, the detector and the diagnoser are operable to determine that the first laser beam is the misaligned one while a plurality of the other laser beams are ON, and wherein the diagnoser determines a timing of a change in a power value of the first laser beam, the detector detects a corresponding change in a misaligned beam, and the first tuner changes a tuning of the first laser based on the detection of the corresponding change in the misaligned beam.

Some embodiments of the present invention provide an apparatus that includes means for sourcing a plurality of light beams, and diffractive means for spectrally combining light from the plurality of light beams into a single combined beam and, in some embodiments, for removing some chromatic dispersion from the single combined beam.

In some embodiments, the diffractive means includes a plurality of diffractive surfaces and the light from the plurality of light-beam sources interacts with the plurality of diffractive surfaces serially.

In some embodiments, the diffractive means includes a first diffractive surface and a second diffractive surface having the same diffractive pattern.

In some embodiments, the diffractive means for spectrally combining includes positioning the second diffractive surface so a diffractive surface of the second diffractive element is parallel to the first diffractive surface.

In some embodiments, the means for sourcing a plurality of light beams includes means for generating a plurality of laser beams for use as the plurality of light beams.

Some embodiments further include a plurality of Yb-doped multiply clad optical fibers including a first fiber and a second fiber, means for pumping an inner cladding of the plurality of fibers with pump light from one or more laser diodes, means for generating with the first fiber a first laser beam at a first wavelength for one of the plurality of light beams, and means for generating with the second fiber a second laser beam at a second wavelength for another of the plurality of light beams.

Some embodiments further include means for tuning the first fiber to generate the first laser beam at the first wavelength, means for tuning the second fiber to generate the second laser beam at the second wavelength, means for detecting that one of the laser beams has become misaligned relative to the single combined beam, means for determining that the first laser beam is the misaligned one, and means for adjusting the tuning of the first fiber in order that the first laser beam is aligned relative to the single combined beam.

In some embodiments, the means for detecting of the misaligned beam and the means for determining that the first laser beam is the misaligned one are based on a timing of a pulse of one of the laser beams.

In some embodiments, the means for detecting of the misaligned beam and the means for determining that the first laser beam is the misaligned one perform these functions while the second beam is active.

In some embodiments, the means for determining that the first laser beam is the misaligned one perform this function while a plurality of the other laser beams are ON, and includes: means for changing a power value of the first laser beam, means for detecting a corresponding change in a misaligned beam, and means for changing a tuning of the first laser based on the detecting of the corresponding change in the misaligned beam.

Some embodiments of the present invention provide a method that includes providing a plurality of laser beams including a first laser beam and a second laser beam, spectrally combining the plurality of laser beams into a single output beam, wavelength tuning the first fiber to generate the first laser beam at the first wavelength, wavelength tuning the second fiber to generate the second laser beam at the second wavelength, detecting that one of the laser beams has become misaligned relative to the single combined beam, determining that the first laser beam is the misaligned one, and adjusting the wavelength tuning of the first fiber in order that the first laser beam is aligned relative to the single combined beam.

In some embodiments, the spectrally combining further includes providing a first diffractive element, introducing a first chromatic dispersion into the first laser beam with the first diffractive element, introducing a second chromatic dispersion into the second laser beam with the first diffractive element, and providing a second diffractive element, and introducing a third chromatic dispersion into the first laser beam with the second diffractive element, wherein the third chromatic dispersion is a compensating dispersion that negates at least a portion of the first chromatic dispersion from the first laser beam, and introducing a fourth chromatic dispersion into the second laser beam with the second diffractive element, wherein the fourth chromatic dispersion is a compensating dispersion that negates at least a portion of the second chromatic dispersion from the second laser beam.

In some embodiments, the providing of the first diffractive element and the second diffractive element includes providing dielectric diffractive gratings having the same diffractive pattern on both the first diffractive element and the second diffractive element.

Some embodiments further include positioning of the second diffractive element so a diffractive surface of the second diffractive element is parallel to a corresponding diffractive surface of the first diffractive element.

Some embodiments further include providing a plurality of Yb-doped multiply clad optical fibers including a first fiber and a second fiber, pumping an inner cladding of each of the plurality of fibers with pump light from one or more laser diodes, amplifying, with the first fiber, the first laser beam at a first wavelength, and amplifying, with the second fiber, the second laser beam at a second wavelength.

Some embodiments further include filtering the first laser beam to a full-width half-maximum linewidth of about one nanometer or less, filtering the second laser beam to a full-width half-maximum linewidth of about one nanometer or less, pulsing the first laser beam to a pulse length of about ten nanoseconds or less, and sufficiently short to substantially prevent SBS buildup in the amplifying of the first laser beam, and pulsing the second laser beam to a pulse length of about ten nanoseconds or less, and sufficiently short to substantially prevent SBS buildup in the amplifying of the second laser beam.

Some embodiments further include detecting that one of the laser beams has become angularly misaligned relative to the single combined beam, determining which laser beam is the angularly misaligned one, and adjusting an angle of the angularly misaligned laser beam in order to align it relative to the single combined beam, wherein the detecting of the angularly misaligned beam and the determining of which laser beam is the angularly misaligned one are based on a timing of a pulse of one of the laser beams.

Some embodiments further include detecting that one of the laser beams has become angularly-misaligned relative to the single combined beam, determining which laser beam is the angularly misaligned one, and adjusting an angle of the angularly misaligned laser beam in order to align it relative to the single combined beam.

In some embodiments, the detecting of the angularly misaligned beam and the determining of which laser beam is the angularly misaligned one are performed while one or more of the other beams are active.

In some embodiments, wherein the determining of which laser beam is the angularly misaligned one is performed during a time when a plurality of the other laser beams are on, and includes changing a power value of a first laser beam, detecting a corresponding change in a misaligned beam, and changing the angle of the first laser based on the detecting of the corresponding change in the misaligned beam.

Some embodiments provide an apparatus that includes an output diffractive element, and a source of a plurality of substantially monochromatic light beams directed from different angles to a single location on the output diffractive element, wherein the output diffractive element spectrally combines the plurality of light beams into a single beam, and wherein the plurality of light beams includes a first light beam having a first central wavelength and a second light beam having a second central wavelength, a first adjustment apparatus configured to set an adjustable characteristic of the first light beam, a second adjustment apparatus configured to set an adjustable characteristic of the second light beam, a detector configured to detect whether one of the light beams has become misaligned relative to the single combined beam, a diagnoser configured to determine whether the first light beam is the misaligned one and if so, to control the first adjustment apparatus to adjust the adjustable characteristic of the first light beam in order that the first light beam becomes aligned relative to the single combined beam.

In some embodiments, the adjustable characteristic of the first light beam is the first central wavelength, wherein the adjustable characteristic of the second light beam is the second central wavelength, and wherein the first adjustment apparatus tunes the first central wavelength and the second adjustment apparatus tunes the second central wavelength.

Some embodiments further include an input diffractive element that introduces a chromatic dispersion to each of the plurality of diffracted light beams, wherein the second diffractive element introduces a compensating chromatic dispersion to each of the plurality of diffracted light beams such that the single combined beam has reduced chromatic dispersion, and wherein the output diffractive element and the input diffractive element have substantially identical diffractive patterns.

In some embodiments, the output diffractive element is positioned so a diffractive surface of the output diffractive element is parallel to a corresponding diffractive surface of the input diffractive element.

In some embodiments, the source of a plurality of light beams includes a plurality of MOPA fiber lasers each tuned to a different wavelength.

Some embodiments further include a plurality of Yb-doped multiply clad optical fibers including a first fiber and a second fiber each having an inner cladding and one or more outer claddings, and one or more laser diodes optically coupled to insert their laser outputs as pump light to the inner claddings of the plurality of fibers, wherein the first light beam is a first laser beam and the second light beam is a second laser beam, and wherein the first fiber amplifies the first laser beam at a first wavelength, and the second fiber amplifies the second laser beam at a second wavelength.

Some embodiments further include a first wavelength filter that filters the first laser beam to a full-width half-maximum linewidth of about one nanometer or less, a second wavelength filter that filters the second laser beam to a full-width half-maximum linewidth of about one nanometer or less, a first amplitude modulator that pulses the first laser beam to a pulse length of about ten nanoseconds or less, and sufficiently short to substantially prevent SBS buildup in the amplifying of the first laser beam, and a second amplitude modulator that pulses the second laser beam to a pulse length of about ten nanoseconds or less, and sufficiently short to substantially prevent SBS buildup in the amplifying of the second laser beam.

In some embodiments, the detector and the diagnoser base the determination of whether the first laser beam is the misaligned one based on a timing of a pulse of one of the laser beams.

In some embodiments, the detector and the diagnoser are operable to determine that the first laser beam is the misaligned one and tune the wavelength of the first laser while the second beam is active in the single combined beam.

In some embodiments, the detector and the diagnoser are operable to determine that the first laser beam is the misaligned one while a plurality of the other laser beams are ON, and wherein the diagnoser determines a timing of a change in a power value of the first laser beam, the detector detects a corresponding change in a misaligned beam, and the first tuner changes a tuning of the first laser based on the detection of the corresponding change in the misaligned beam.

Another aspect in some embodiments, provides an apparatus that includes a source of a plurality of light beams including a first laser beam and a second laser beam, diffractive means for spectrally combining the plurality of laser beams into a single output beam, means for wavelength tuning the first fiber to generate the first laser beam at the first wavelength, means for wavelength tuning the second fiber to generate the second laser beam at the second wavelength, means for detecting that one of the laser beams has become misaligned relative to the single combined beam, means for determining that the first laser beam is the misaligned one, and means for adjusting the means for wavelength tuning of the first fiber in order that the first laser beam is aligned relative to the single combined beam.

In some embodiments, the diffractive means includes a plurality of diffractive surfaces and the light from the plurality of light-beam sources interacts with the plurality of diffractive surfaces serially.

In some embodiments, the diffractive means includes a first diffractive surface area and a second diffractive surface area having the same diffractive pattern.

In some embodiments, the diffractive means includes means for positioning the second diffractive surface parallel to the first diffractive surface.

In some embodiments, the means for sourcing the plurality of light beams includes a plurality of Yb-doped multiply clad optical fibers including a first fiber and a second fiber, means for pumping an inner cladding of the plurality of fibers with pump light from one or more laser diodes, means for amplifying with the first fiber a first seed laser beam at a first wavelength for one of the plurality of light beams, and means for amplifying with the second fiber a second seed laser beam at a second wavelength for another of the plurality of light beams.

Some embodiments further include means for filtering the first laser beam to a full-width half-maximum linewidth of about one nanometer or less, means for filtering the second laser beam to a full-width half-maximum linewidth of about one nanometer or less, means for pulsing the first and second laser beams to a pulse length of about ten nanoseconds or less and sufficiently short to substantially prevent SBS buildup.

Some embodiments further include means for compensating for a chromatic dispersion.

In some embodiments, the means for detecting of the misaligned beam and the means for determining that the first laser beam is the misaligned one perform while the second beam is active.

In some embodiments, the determining that the first laser beam is the misaligned one is performed while a plurality of the other laser beams are ON, and includes means for changing a power value of the first laser beam, means for detecting a corresponding change in a misaligned beam, and means for changing a tuning of the first laser based on the detecting of the corresponding change in the misaligned beam.

In some embodiments, the means for detecting of the misaligned beam and the means for determining that the first laser beam is the misaligned one are based on a timing of a pulse of one of the laser beams.

Another aspect of some embodiments of the present invention provides a method that includes providing a plurality of laser beams including a first laser beam and a second laser beam, wavelength tuning the first fiber to generate the first laser beam at the first wavelength and having a linewidth of about 1 nm or less, wavelength tuning the second fiber to generate the second laser beam at the second wavelength and having a linewidth of about 1 nm or less, and spectrally combining the plurality of laser beams into a single output beam using one or more high-efficiency dielectric diffractive gratings, the output beam having a power-per-unit-area incident to least one grating of about 10 $W/(cm^2$ of grating surface) or more.

In some embodiments, the beam output power/area is about 15 $W/(cm^2$ of grating surface) or more. In some embodiments, the beam output power/area is about 20 $W/(cm^2$ of grating surface) or more. In some embodiments, the beam output power/area is about 50 $W/(cm^2$ of grating surface) or more. In some embodiments, the beam output power/area is about 100 $W/(cm^2$ of grating surface) or more. In some embodiments, the beam output power/area is about 150 $W/(cm^2$ of grating surface) or more. In some embodiments, the beam output power/area is about 200 $W/(cm^2$ of grating surface) or more. In some embodiments, the beam output power/area is about 500 $W/(cm^2$ of grating surface) or more. In some embodiments, the beam output power/area is about 1,000 $W/(cm^2$ of grating surface) or more. In some embodiments, the beam output power/area is about 1,500 $W/(cm^2$ of grating surface) or more. In some embodiments, the beam output power/area is about 2,000 $W/(cm^2$ of grating surface) or more. In some embodiments, the beam output power/area is about 5,000 $W/(cm^2$ of grating surface) or more. In some embodiments, the beam output power/area is about 10,000 $W/(cm^2$ of grating surface) or more. In some embodiments, the beam output power/area is about 15,000 $W/(cm^2$ of grating surface) or more. In some embodiments, the beam output power/area is about 20,000 $W/(cm^2$ of grating surface) or more. In some embodiments, the beam output power/area is about 50,000 $W/(cm^2$ of grating surface) or more. In some embodiments, the beam output power/area is about 100,000 $W/(cm^2$ of grating surface) or more.

In some embodiments, these output power densities are possible by using high-efficiency dielectric gratings where the output beam diffracted from the output grating has 80% or more of the power sum of the input beams, or, in some embodiments, 85% or more, 90% or more, 95% or more, 97% or more, 98% or more, 99% or more, 99.5% or more, 99.7% or more, 99.8% or more, or 99.9% or more, in order to minimize absorption of heat from the diffracted beam(s). In some embodiments, the gratings are high-efficiency dielectric reflection gratings, in order to minimize absorption of heat from the diffracted beam(s). In some embodiments, the gratings are oriented at or close to the Littrow angle (i.e., where the output angle $\beta \approx \alpha$, the input angle, relative to the grating-surface's normal vector) for at least some of the wavelengths used, in order to minimize absorption of heat from the diffracted beam(s).

In some embodiments, the output beam's power is 500 W or more. In some embodiments, the output beam's power is 1,000 W or more. In some embodiments, the output beam's power is 2,000 W or more. In some embodiments, the output beam's power is 5,000 W or more. In some embodiments, the output beam's power is 10,000 W or more. In some embodiments, the output beam's power is 20,000 W or more. In some embodiments, the output beam's power is 50,000 W or more. In some embodiments, the output beam's power is 100,000 W or more. In some embodiments, the output beam's power is 200,000 W or more. In some embodiments, the output beam's power is 500,000 W or more. In some embodiments, the output beam's power is 1,000,000 W or more. In some embodiments, the output beam's power is 2,000,000 W or more. In some embodiments, the output beam's power is 5,000,000 W or more. In some embodiments, the output beam's power is 10,000,000 W or more.

In order to obtain high beam quality, $M^2$, some embodiments control the FWHM linewidth. In some embodiments, the first and second (and optionally other subsequent) laser beams each have a linewidth of about 0.5 nm or less. In some embodiments, the first and laser beam each have a linewidth of about 0.2 nm or less. In some embodiments, the first and second laser beam each have a linewidth of about 0.1 nm or less. In some embodiments, the first and second laser beam each have a linewidth of about 0.05 nm or less. In some embodiments, the first and second laser beam each have a linewidth of about 0.02 nm or less. In some embodiments, the first and second laser beam each have a linewidth of about 0.01 nm or less. In some embodiments, the first and second laser beam each have a linewidth of about 0.005 nm or less. In some embodiments, the first and second laser beam each have a linewidth of about 0.002 nm or less. In some embodiments, the first and second laser beam each have a linewidth of about 0.001 nm or less.

In order to obtain high beam quality, $M^2$, some embodiments control spectral fill (i.e., the ratio of FWHM linewidth/center-to-center wavelength spacing=$\Delta\lambda/(\lambda_{N+1}-\lambda_N)$) relative to the spatial fill (i.e., the ratio of beam-waist width $\omega_0$/beam center-to-center spacing $(X_{N+1}-X_N)$) of successive input beams. In some embodiments, spectral fill $\Delta\lambda/(\lambda_{N+1}-\lambda_N)$ is set to be equal to or less than spatial fill $\omega_0/(X_{N+1}-X_N)$. In some embodiments, $\Delta\lambda/(\lambda_{N+1}-\lambda_N)<\omega_0/(X_{N+1}-X_N)$. In some embodiments, $\Delta\lambda/(\lambda_{N+1}-\lambda_N)<0.9\omega_0/(X_{N+1}-X_N)$. In some embodiments, $\Delta\lambda/(\lambda_{N+1}-\lambda_N)<0.8\omega_0/(X_{N+1}-X_N)$. In some embodiments, $\Delta\lambda/(\lambda_{N+1}-\lambda_N)<0.7\omega_0/(X_{N+1}-X_N)$. In some embodiments, $\Delta\lambda/(\lambda_{N+1}-\lambda_N)<0.6\omega_0/(X_{N+1}-X_N)$. In some embodiments, $\Delta\lambda/(\lambda_{N+1}-\lambda_N)<0.5\omega_0/(X_{N+1}-X_N)$. In some embodiments, $\Delta\lambda/(\lambda_{N+1}-\lambda_N)<0.4\omega_0/(X_{N+1}-X_N)$. In some embodiments, $\Delta\lambda/(\lambda_{N+1}-\lambda_N)<0.3\omega_0/(X_{N+1}-X_N)$. In some embodiments, $\Delta\lambda/(\lambda_{N+1}-\lambda_N)<0.2\omega_0/(X_{N+1}-X_N)$. In some embodiments, $\Delta\lambda/(\lambda_{N+1}-\lambda_N)<0.1\omega_0/(X_{N+1}-X_N)$.

In order to obtain high beam quality, $M^2$, some embodiments reduce the output beam center-to-center spacing $(X_{N+1}-X_N)$ by shaving, grinding or otherwise reducing a diameter of one or more of the output (e.g., final stage of the power amplifier) fibers. Some such embodiments use a plurality of cores spaced side-by-side along a straight transverse line of a "ribbon" fiber, in order to reduce the output beam center-to-center spacing $(X_{N+1}-X_N)$. Some embodiments reduce the center-to-center input spacing $(X'_{N+1}-X'_N)$ by shaving, grinding or otherwise reducing a diameter of one or more of the frequency-setting (e.g., master oscillator) fibers. Some embodiments use a side or star coupler at or near an output end of the output (e.g., final stage of the power amplifier) fibers. Some embodiments use a photonic-crystal fiber, fiber-like rod, or rod as the output or final stage of the power amplifier.

In order to obtain high beam quality, $M^2$, and to also obtain high power, some embodiments operate a large-mode area amplifying fiber, or photonic-crystal fiber, fiber-like rod, or rod, operating substantially on its fundamental mode (i.e., the $LP_{01}$ mode of a fiber, corresponding to a $TEM_{00}$ mode of other lasers).

Some embodiments further include temporally forming the first laser beam into a first serial plurality of pulses and temporally forming the second laser beam into a second serial plurality of pulses, each such pulse having a pulse length of about 10 ns or less. In some embodiments, the pulse lengths are about 9 ns or less. In some embodiments, the pulse lengths are about 8 ns or less. In some embodiments, the pulse lengths are about 7 ns or less. In some embodiments, the pulse lengths are about 6 ns or less. In some embodiments, the pulse lengths are about 5 ns or less. In some embodiments, the pulse lengths are about 5 ns or less. In some embodiments, the pulse lengths are about 4 ns or less. In some embodiments, the pulse lengths are about 3 ns or less. In some embodiments, the pulse lengths are about 2 ns or less. In some embodiments, the pulse lengths are about 1 ns or less. In some embodiments, the pulse lengths are about 0.5 ns or less.

In some embodiments, pulses of the first serial plurality of pulses are alternated with pulses of the second serial plurality of pulses.

Some embodiments further include detecting that one of the laser beams has become misaligned relative to the single combined beam, determining that the first laser beam is the misaligned one, and adjusting the wavelength tuning of the first fiber in order that the first laser beam is aligned relative to the single combined beam.

In some embodiments, the spectrally combining further includes: providing a first diffractive element, introducing a first chromatic dispersion into the first laser beam with the first diffractive element, providing a second diffractive element, introducing a second chromatic dispersion into the second laser beam with the second diffractive element, and providing a third diffractive element, and spectrally combining the first and second laser beams and introducing a third chromatic dispersion into the first laser beam with the third diffractive element, wherein the third chromatic dispersion is a compensating dispersion that negates at least a portion of the first chromatic dispersion from the first laser beam, and introducing a fourth chromatic dispersion into the second laser beam with the second diffractive element, wherein the fourth chromatic dispersion is a compensating dispersion that negates at least a portion of the second chromatic dispersion from the second laser beam.

In some embodiments, the providing of the first diffractive element and the second diffractive element includes providing dielectric diffractive gratings having the same diffractive pattern on both the first diffractive element and the second diffractive element, and positioning the second diffractive element so a diffractive surface of the second diffractive element is approached by the laser beams at an angle corresponding to an angle the beams left the first diffractive element.

Some embodiments further include providing a plurality of Yb-doped large-mode-area (LMA) optical-amplification fibers operating substantially on the fundamental mode, including a first fiber and a second fiber, pumping of each of the plurality of fibers with pump light from one or more laser diodes, amplifying, with the first fiber, the first laser beam at a first wavelength, and amplifying, with the second fiber, the second laser beam at a second wavelength.

Some embodiments further include filtering the first laser beam to a full-width half-maximum linewidth of about one nanometer or less; filtering the second laser beam to a full-width half-maximum linewidth of about one nanometer or less; pulsing the first laser beam to a pulse length of about ten nanoseconds or less, and sufficiently short to substantially prevent SBS buildup in the amplifying of the first laser beam; and pulsing the second laser beam to a pulse length of about ten nanoseconds or less, and sufficiently short to substantially prevent SBS buildup in the amplifying of the second laser beam. For the filtering, in some embodiments, the full-width half-maximum linewidth is about 0.5 nm or less. In some embodiments, the full-width half-maximum linewidth is about 0.5 nm or less. In some embodiments, the full-width half-maximum linewidth is about 0.3 nm or less. In some embodiments, the full-width half-maximum linewidth is about 0.2 nm or less. In some embodiments, the full-width half-maximum linewidth is about 0.1 nm or less. In some embodiments, the full-width half-maximum linewidth is about 0.05 nm or less. In some embodiments, the full-width half-maximum linewidth is about 0.03 nm or less. In some embodiments, the full-width half-maximum linewidth is about 0.02 nm or less. In some embodiments, the full-width half-maximum linewidth is about 0.01 nm or less. In some embodiments, the full-width half-maximum linewidth is about 0.005 nm or less. In some embodiments, the full-width half-maximum linewidth is about 0.003 nm or less. In some embodiments, the full-width half-maximum linewidth is about 0.002 nm or less. In some embodiments, the full-width half-maximum linewidth is about 0.001 nm or less. In some embodiments, the full-width half-maximum linewidth is about 0.0005 nm or less. In some embodiments, the full-width half-maximum linewidth is about 0.0003 nm or less. In some embodiments, the full-width half-maximum linewidth is about 0.0002 nm or less. In some embodiments, the full-width half-maximum linewidth is about 0.000 nm or less.

Some embodiments further include detecting that one of the laser beams has become angularly misaligned relative to the single combined beam, determining which laser beam is the angularly misaligned one, and adjusting an angle of the angularly misaligned laser beam in order to align it relative to the single combined beam, wherein the detecting of the angularly misaligned beam and the determining of which laser beam is the angularly misaligned one are based on a timing of a pulse of one of the laser beams.

In some embodiments, the detecting of the angularly misaligned beam and the determining of which laser beam is the angularly misaligned one are performed while one or more of the other beams are active. As used herein, two lasers are both ON is defined to mean instantaneously and simultaneously emitting light, whether as when two pulse are simultaneously on, or two cw lasers are both on; whereas two lasers are both ACTIVE is defined to mean operating in their normal mode, which, when pulsed lasers are discussed, means where both lasers are pulsing, whether or not the pulses of one laser are instantaneously and simultaneously emitting light, as well as when two cw lasers are both on.

In some embodiments, the determining of which laser beam is the angularly misaligned one is performed during a time when a plurality of the other laser beams are on, and includes: changing a power value of a first laser beam, detecting a corresponding change in a misaligned beam; and changing the angle of the first laser based on the detecting of the corresponding change in the misaligned beam.

It is specifically contemplated that the present invention includes embodiments having combinations and subcombinations of the various embodiments and features that are individually described herein (i.e., some of the features from one embodiment combined with some of the features of another embodiment. Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
an output diffractive element; and
a source of a plurality of substantially monochromatic light beams directed from different angles to a single location on the output diffractive element, wherein the output diffractive element spectrally combines the plurality of light beams into a single beam, and wherein the plurality of light beams includes a first light beam having a first central wavelength and a second light beam having a second central wavelength;
a first adjustment apparatus configured to set an adjustable characteristic of the first light beam;
a second adjustment apparatus configured to set an adjustable characteristic of the second light beam;
a detector configured to detect whether one of the light beams has become misaligned relative to the single combined beam;
a diagnoser configured to determine whether the first light beam is the misaligned one and if so, to control the first adjustment apparatus to adjust the adjustable characteristic of the first light beam in order that the first light beam becomes aligned relative to the single combined beam.

2. The apparatus of claim 1, wherein the adjustable characteristic of the first light beam is the first central wavelength, wherein the adjustable characteristic of the second light beam is the second central wavelength; and wherein the first adjustment apparatus tunes the first central wavelength and the second adjustment apparatus tunes the second central wavelength.

3. The apparatus of claim 1, further comprising:
an input diffractive element that introduces a chromatic dispersion to each of the plurality of diffracted light beams, wherein the second diffractive element introduces a compensating chromatic dispersion to each of the plurality of diffracted light beams such that the single combined beam has reduced chromatic dispersion; and wherein the output diffractive element and the input diffractive element have substantially identical diffractive patterns.

4. The apparatus of claim 1, wherein the source of a plurality of light beams includes a plurality of MOPA fiber lasers each tuned to a different wavelength.

5. The apparatus of claim 1, wherein the detector includes at least a first detector portion along one side of the single combined beam and a second detector portion along another side of the single combined beam, wherein in normal operation the single combined beam is between the first detector portion and the second detector portion, and wherein when one of the light beams becomes angle-misaligned relative to the single combined beam it will intersect either the first detector portion or the second detector portion.

6. The apparatus of claim 1, wherein the detector includes at least a third detector portion along one side of the single combined beam and a fourth detector portion along another side of the single combined beam, wherein in normal operation the single combined beam is between the third detector portion and the fourth detector portion, and wherein when one of the light beams becomes laterally misaligned relative to the single combined beam it will intersect either the third detector portion or the fourth detector portion.

7. The apparatus of claim 3, wherein the output diffractive element is positioned so a diffractive surface of the output diffractive element is parallel to a corresponding diffractive surface of the input diffractive element.

8. The apparatus of claim 4, wherein the detector and the diagnoser are operable to determine that the first laser beam is the misaligned one and tune the wavelength of the first laser while the second beam is active in the single combined beam.

9. The apparatus of claim 7, wherein the input diffractive element is a reflective diffraction grating, and the output diffractive element is a reflective diffraction grating.

10. The apparatus of claim 8, wherein the detector and the diagnoser are operable to determine that the first laser beam is the misaligned one while a plurality of the other laser beams are ON, and wherein the diagnoser determines a timing of a change in a power value of the first laser beam, the detector detects a corresponding change in a misaligned beam, and the first tuner changes a tuning of the first laser based on the detection of the corresponding change in the misaligned beam.

11. An apparatus comprising:
an output diffractive element; and
a source of a plurality of substantially monochromatic light beams directed from different angles to a single location on the output diffractive element, wherein the output diffractive element spectrally combines the plurality of light beams into a single beam, and wherein the plurality of light beams includes a first light beam having a first central wavelength and a second light beam having a second central wavelength;
a first adjustment apparatus configured to set an adjustable characteristic of the first light beam;
a second adjustment apparatus configured to set an adjustable characteristic of the second light beam;
a detector configured to detect whether one of the light beams has become misaligned relative to the single combined beam;
a diagnoser configured to determine whether the first light beam is the misaligned one and if so, to control the first adjustment apparatus to adjust the adjustable characteristic of the first light beam in order that the first light beam becomes aligned relative to the single combined beam;
a plurality of Yb-doped multiply clad optical fibers including a first fiber and a second fiber each having an inner cladding and one or more outer claddings; and
one or more laser diodes optically coupled to insert their laser outputs as pump light to the inner claddings of the plurality of fibers, wherein the first light beam is a first laser beam and the second light beam is a second laser beam; and wherein the first fiber amplifies the first laser beam at a first wavelength, and the second fiber amplifies the second laser beam at a second wavelength.

12. The apparatus of claim 11, further comprising:
a first wavelength filter that filters the first laser beam to a full-width half-maximum line width of about one nanometer or less;
a second wavelength filter that filters the second laser beam to a full-width half-maximum line width of about one nanometer or less;
a first amplitude modulator that pulses the first laser beam to a pulse length of about ten nanoseconds or less, and sufficiently short to substantially prevent stimulated Brillouin scattering (SBS) buildup in the amplifying of the first laser beam; and
a second amplitude modulator that pulses the second laser beam to a pulse length of about ten nanoseconds or less, and sufficiently short to substantially prevent SBS buildup in the amplifying of the second laser beam.

13. The apparatus of claim 12, wherein the detector and the diagnoser base the determination of whether the first laser beam is the misaligned one based on a timing of a pulse of one of the laser beams.

14. An apparatus comprising:
a source of a plurality of light beams including a first laser beam and a second laser beam, wherein the source includes a plurality of optical fibers including a first fiber and a second fiber;
diffractive means for spectrally combining the plurality of laser beams into a single output beam;
means for wavelength tuning the first fiber to generate the first laser beam at the first wavelength;
means for wavelength tuning the second fiber to generate the second laser beam at the second wavelength;
means for detecting that one of the laser beams has become misaligned relative to the single combined beam;
means for determining that the first laser beam is the misaligned one; and
means for adjusting the means for wavelength tuning of the first fiber in order that the first laser beam is aligned relative to the single combined beam.

15. The apparatus of claim 14, wherein the diffractive means includes a plurality of diffractive surfaces and the light from the plurality of light-beam sources interacts with the plurality of diffractive surfaces serially.

16. The apparatus of claim 15, wherein the diffractive means includes a first diffractive surface area and a second diffractive surface area having the same diffractive pattern.

17. The apparatus of claim 16, wherein the diffractive means includes means for positioning the second diffractive surface parallel to the first diffractive surface.

18. An apparatus comprising:
a source of a plurality of light beams including a first laser beam and a second laser beam, wherein the source includes:

a plurality of Yb-doped multiply clad optical fibers including a first fiber and a second fiber;

means for pumping an inner cladding of the plurality of fibers with pump light from one or more laser diodes;

means for amplifying with the first fiber a first seed laser beam at a first wavelength for one of the plurality of light beams; and means for amplifying with the second fiber a second seed laser beam at a second wavelength for another of the plurality of light beams;

diffractive means for spectrally combining the plurality of laser beams into a single output beam;

means for wavelength tuning the first fiber to generate the first laser beam at the first wavelength;

means for wavelength tuning the second fiber to generate the second laser beam at the second wavelength;

means for detecting that one of the laser beams has become misaligned relative to the single combined beam;

means for determining that the first laser beam is the misaligned one; and means for adjusting the means for wavelength tuning of the first fiber in order that the first laser beam is aligned relative to the single combined beam.

19. The apparatus of claim 18, further comprising:

means for filtering the first laser beam to a full-width half-maximum linewidth of about one nanometer or less;

means for filtering the second laser beam to a full-width half-maximum linewidth of about one nanometer or less;

means for pulsing the first and second laser beams to a pulse length of about ten nanoseconds or less and sufficiently short to substantially prevent SBS buildup.

20. The apparatus of claim 19, further comprising means for compensating for a chromatic dispersion.

21. The apparatus of claim 19, wherein the means for detecting of the misaligned beam and the means for determining that the first laser beam is the misaligned one perform while the second beam is active.

22. The apparatus of claim 21, wherein the determining that the first laser beam is the misaligned one is performed while a plurality of the other laser beams are ON, and includes:

means for changing a power value of the first laser beam;

means for detecting a corresponding change in a misaligned beam; and means for changing a tuning of the first laser based on the detecting of the corresponding change in the misaligned beam.

23. An apparatus comprising:

means for providing a plurality of laser beams including a first laser beam and a second laser beam;

means for wavelength tuning the first fiber to generate the first laser beam at the first wavelength and having a linewidth of about 1 nm or less;

means for wavelength tuning the second fiber to generate the second laser beam at the second wavelength and having a linewidth of about 1 nm or less; and means for spectrally combining the plurality of laser beams into a single output beam having an output power/area of about 10 W/cm$^2$ or more using one or more high-efficiency dielectric diffractive gratings.

* * * * *